(12) United States Patent
Perez et al.

(10) Patent No.: US 9,313,294 B2
(45) Date of Patent: Apr. 12, 2016

(54) METHODS AND APPARATUS TO DE-DUPLICATE IMPRESSION INFORMATION

(71) Applicants: Albert Ronald Perez, San Francisco, CA (US); Mimi Zhang, San Francisco, CA (US)

(72) Inventors: Albert Ronald Perez, San Francisco, CA (US); Mimi Zhang, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 272 days.

(21) Appl. No.: 14/144,149

(22) Filed: Dec. 30, 2013

(65) Prior Publication Data

US 2015/0046579 A1    Feb. 12, 2015

Related U.S. Application Data

(60) Provisional application No. 61/864,902, filed on Aug. 12, 2013.

(51) Int. Cl.
*G06F 15/173* (2006.01)
*H04L 29/08* (2006.01)

(52) U.S. Cl.
CPC .............. *H04L 67/306* (2013.01); *H04L 67/02* (2013.01); *H04L 67/22* (2013.01)

(58) Field of Classification Search
CPC combination set(s) only.
See application file for complete search history.

(56) References Cited

U.S. PATENT DOCUMENTS

| | | |
|---|---|---|
| 5,584,050 A | 12/1996 | Lyons |
| 5,594,934 A | 1/1997 | Lu et al. |
| 5,675,510 A | 10/1997 | Coffey et al. |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |

(Continued)

FOREIGN PATENT DOCUMENTS

| | | |
|---|---|---|
| AU | 2013205736 | 5/2013 |
| CN | 1898662 | 1/2007 |

(Continued)

OTHER PUBLICATIONS

United States Patent and Trademark Office, "Non-Final Office Action," issued in connection with U.S. Appl. No. 14/463,309, Aug. 5, 2015, 62 pages.

(Continued)

*Primary Examiner* — Saket K Daftuar
(74) *Attorney, Agent, or Firm* — Hanley, Flight & Zimmerman, LLC

(57) ABSTRACT

Example methods and apparatus to de-duplicate impression information. An example method includes accessing a first set of cookies and a set of user identifiers, the cookies and user identifiers corresponding to devices accessing media via the Internet, identifying a pattern in the first set of cookies, obtaining impression information from a database proprietor, the impression information comprising a second set of cookies, identifying a subset of the second set of cookies that are associated with a same person based on the pattern, and associating impressions corresponding to the identified subset with the same person.

21 Claims, 19 Drawing Sheets

(56) References Cited

U.S. PATENT DOCUMENTS

| | | |
|---|---|---|
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0166233 A1 | 7/2005 | Beyda et al. |
| 2005/0223093 A1 | 10/2005 | Hanson et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |

(56) References Cited

U.S. PATENT DOCUMENTS

| | | | |
|---|---|---|---|
| 2010/0153544 A1* | 6/2010 | Krassner | G06F 17/2247 709/224 |
| 2010/0161385 A1 | 6/2010 | Karypis et al. | |
| 2010/0191723 A1 | 7/2010 | Perez et al. | |
| 2010/0205057 A1 | 8/2010 | Hook et al. | |
| 2010/0241745 A1 | 9/2010 | Offen et al. | |
| 2010/0262498 A1 | 10/2010 | Nolet et al. | |
| 2010/0268540 A1 | 10/2010 | Arshi et al. | |
| 2010/0268573 A1 | 10/2010 | Jain et al. | |
| 2010/0281178 A1 | 11/2010 | Sullivan | |
| 2010/0299604 A1 | 11/2010 | Blumenau | |
| 2010/0312854 A1 | 12/2010 | Hyman | |
| 2010/0313009 A1 | 12/2010 | Combet et al. | |
| 2010/0325051 A1 | 12/2010 | Etchegoven | |
| 2011/0016482 A1 | 1/2011 | Tidwell et al. | |
| 2011/0041062 A1 | 2/2011 | Singer et al. | |
| 2011/0087519 A1 | 4/2011 | Fordyce, III et al. | |
| 2011/0093327 A1 | 4/2011 | Fordyce, III et al. | |
| 2011/0106620 A1 | 5/2011 | Setiawan et al. | |
| 2011/0131596 A1 | 6/2011 | Amsterdam et al. | |
| 2011/0137733 A1 | 6/2011 | Baird et al. | |
| 2011/0153391 A1 | 6/2011 | Tenbrock | |
| 2011/0157475 A1 | 6/2011 | Wright et al. | |
| 2011/0191184 A1 | 8/2011 | Blackhurst et al. | |
| 2011/0191664 A1 | 8/2011 | Sheleheda et al. | |
| 2011/0191831 A1 | 8/2011 | Chan et al. | |
| 2011/0196735 A1 | 8/2011 | von Sydow et al. | |
| 2011/0202500 A1 | 8/2011 | Warn et al. | |
| 2011/0208860 A1 | 8/2011 | Sim et al. | |
| 2011/0231240 A1* | 9/2011 | Schoen | G06Q 30/0242 705/14.41 |
| 2011/0246297 A1* | 10/2011 | Buchalter | G06Q 30/02 705/14.53 |
| 2011/0246306 A1 | 10/2011 | Blackhurst et al. | |
| 2011/0246641 A1 | 10/2011 | Pugh et al. | |
| 2011/0282730 A1 | 11/2011 | Tarmas | |
| 2011/0288907 A1 | 11/2011 | Harvey et al. | |
| 2012/0005213 A1 | 1/2012 | Hannan et al. | |
| 2012/0030037 A1 | 2/2012 | Carriero | |
| 2012/0042005 A1 | 2/2012 | Papakostas et al. | |
| 2012/0072469 A1 | 3/2012 | Perez et al. | |
| 2012/0109709 A1 | 5/2012 | Fordyce, III et al. | |
| 2012/0109882 A1 | 5/2012 | Bouse et al. | |
| 2012/0110027 A1 | 5/2012 | Falcon | |
| 2012/0110071 A1 | 5/2012 | Zhou et al. | |
| 2012/0143713 A1* | 6/2012 | Dittus | G06Q 30/08 705/26.3 |
| 2012/0151079 A1 | 6/2012 | Besehanic et al. | |
| 2012/0151322 A1 | 6/2012 | Lindsay et al. | |
| 2012/0158490 A1 | 6/2012 | Naumeyer et al. | |
| 2012/0158954 A1* | 6/2012 | Heffernan | H04L 43/04 709/224 |
| 2012/0166520 A1 | 6/2012 | Lindsay et al. | |
| 2012/0173701 A1 | 7/2012 | Tenbrock | |
| 2012/0185274 A1 | 7/2012 | Hu | |
| 2012/0192214 A1 | 7/2012 | Hunn et al. | |
| 2012/0206331 A1 | 8/2012 | Gandhi | |
| 2012/0209920 A1 | 8/2012 | Neystadt et al. | |
| 2012/0215621 A1* | 8/2012 | Heffernan | H04L 43/04 705/14.41 |
| 2012/0239407 A1 | 9/2012 | Lynch et al. | |
| 2012/0239809 A1 | 9/2012 | Mazumdar et al. | |
| 2012/0265606 A1 | 10/2012 | Patnode | |
| 2012/0302222 A1 | 11/2012 | Williamson et al. | |
| 2012/0310729 A1* | 12/2012 | Dalto | G06Q 30/02 705/14.43 |
| 2012/0311017 A1 | 12/2012 | Sze et al. | |
| 2013/0007794 A1 | 1/2013 | Besehanic et al. | |
| 2013/0013308 A1 | 1/2013 | Cao et al. | |
| 2013/0014144 A1 | 1/2013 | Bhatia et al. | |
| 2013/0019262 A1 | 1/2013 | Bhatia et al. | |
| 2013/0046615 A1 | 2/2013 | Liyanage | |
| 2013/0060629 A1 | 3/2013 | Rangsikitpho et al. | |
| 2013/0066713 A1 | 3/2013 | Umeda | |
| 2013/0080263 A1 | 3/2013 | Goldman et al. | |
| 2013/0097311 A1 | 4/2013 | Mazumdar et al. | |
| 2013/0097312 A1 | 4/2013 | Mazumdar et al. | |
| 2013/0117103 A1 | 5/2013 | Shimizu et al. | |
| 2013/0124628 A1 | 5/2013 | Weerasinghe | |
| 2013/0138506 A1 | 5/2013 | Zhu et al. | |
| 2013/0138743 A1 | 5/2013 | Amento et al. | |
| 2013/0145022 A1* | 6/2013 | Srivastava | G06Q 30/0241 709/224 |
| 2013/0159499 A1 | 6/2013 | Besehanic | |
| 2013/0198125 A1 | 8/2013 | Oliver et al. | |
| 2013/0204694 A1 | 8/2013 | Banister et al. | |
| 2013/0212188 A1 | 8/2013 | Duterque et al. | |
| 2013/0246389 A1 | 9/2013 | Osann, Jr. | |
| 2013/0246609 A1 | 9/2013 | Topchy et al. | |
| 2013/0282898 A1 | 10/2013 | Kalus et al. | |
| 2013/0290070 A1 | 10/2013 | Abraham et al. | |
| 2013/0297411 A1 | 11/2013 | Van Datta et al. | |
| 2013/0325588 A1 | 12/2013 | Kalyanam et al. | |
| 2013/0331971 A1 | 12/2013 | Bida et al. | |
| 2013/0332604 A1* | 12/2013 | Seth | H04L 67/22 709/224 |
| 2014/0033317 A1 | 1/2014 | Barber | |
| 2014/0075004 A1 | 3/2014 | Van Dusen et al. | |
| 2014/0108130 A1 | 4/2014 | Vos et al. | |
| 2014/0122703 A1 | 5/2014 | Pugh et al. | |
| 2014/0156761 A1 | 6/2014 | Heffernan et al. | |
| 2014/0279074 A1 | 9/2014 | Chen et al. | |
| 2014/0298025 A1 | 10/2014 | Burbank et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2015/0019322 A1 | 1/2015 | Alla et al. | |
| 2015/0019327 A1 | 1/2015 | Mazumdar et al. | |
| 2015/0186403 A1 | 7/2015 | Srivastava et al. | |
| 2015/0189500 A1 | 7/2015 | Bosworth et al. | |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20120091411 | 8/2002 |
| KR | 20090020558 | 2/2009 |
| KR | 20100094021 | 8/2010 |
| KR | 20110017895 | 2/2011 |
| KR | 20110023293 | 3/2011 |
| KR | 20120123148 | 11/2012 |
| WO | 9617467 | 6/1996 |
| WO | 9628904 | 9/1996 |
| WO | 9641495 | 12/1996 |
| WO | 0041115 | 7/2000 |
| WO | 0152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |

(56) References Cited

FOREIGN PATENT DOCUMENTS

| WO | 2012128895 | 9/2012 |
|---|---|---|
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

United States Patent and Trademark Office, "Non-Final Office Action," issued in connection with U.S. Appl. No. 14/025,567, Aug. 6, 2015, 59 pages.
Japanese Patent Office, "Notice of Reasons for Rejection," issued in connection with Japanese Patent Application No. P2015-078539 on Jul. 14, 2015 (6 pages).
IP Australia, "Patent Examination Report No. 1," issued in connection with Australian Patent Application No. 2013204354, mailed Nov. 14, 2014, 3 pages.
United States Patent and Trademark Office, "Final Office Action," issued in connection with U.S. Appl. No. 14/025,575, Aug. 17, 2015, 78 pages.
Patent Cooperation Treaty, "International Search Report," issued in connection with Application No. PCT/US2014/068621, Feb. 27, 2015, 3 pages.
Patent Cooperation Treaty, "Written Opinion," issued in connection with Application No. PCT/US2014/068621, Feb. 27, 2015, 7 pages.
Canadian Intellectual Property Office, "Examination Search Report," issued in connection with Application No. 2,810,541 on Jan. 20, 2015, 3 pages.
The State Intellectual Property Office of China, "First Notification of Office Action," issued in connection with Application No. 201180045957.2, on Nov. 15, 2014, 20 pages.
Japanese Patent Office, "Final Rejection," issued in connection with Japanese Patent Application No. P2014-005867 on Aug. 26, 2014, 8 pages.
Japanese Patent Office, "Notice of Reasons for Rejection," issued in connection with Japanese Patent Application No. P2014-005867 on Feb. 17, 2015, 6 pages.
Japanenese Patent Office, "Notice of Reasons for Rejection," issued in connection with Japanese Patenet Application No. P2014-005867 on Apr. 15, 2014, 10 pages.
United States Patenet and Trademark Office, "Office Action," issued in connection with U.S. Appl. No. 14/500,297, on Jan. 5, 2015, 7 pages.
Australian Government, IP Australia, "Patent Examination Report No. 1," issued in connection with Australian Patent Application No. 2013203898, Nov. 27, 2014, 4 pages.
Australian Government, IP Australia, "Patent Examination Report No. 1," issued in connection with application No. 2011305429 on Apr. 17, 2014, 4 pages.
The State Intellectual Property Office of China, "First Notification of Office Action," issued in connection with Application No. 201180061437.0, on Mar. 7, 2014, 11 pages.
The State Intellectual Property Office of China, "Second Notification of Office Action," issued in connection with Application No. 201180061437.0, on Nov. 15, 2014, 6 pages.
Australian Government, IP Australia, "Patent Examination Report No. 1," issued in connection with Application No. 2011374955, on Sep. 25, 2014, 3 pages.
Canadian Intellectual Property Office, "Examination Search Report," issued in connection with Application No. 2,873,128, on Jan. 7, 2015, 3 pages.
Patent Cooperation Treaty, "International Search Report," issued by the International Searching Authority in connection with PCT Application No. PCT/US2014/068165, mailed on Feb. 25, 2015, 3 pages.
Patent Cooperation Treaty, "Written Opinion of the International Searching Authority," issued by the International Searching Authority in connection with PCT Application No. PCT/US2014/06815, mailed on Feb. 25, 2015, 5 pages.
United States Patent and Trademark Office, "Non-Final Office Action," issued in connection with U.S. Appl. No. 13/756,493, on Nov. 19, 2014, 13 pages.
Canadian Intellectual Property Office, Office Action, issued in connection with Canadian Patent Application No. 2,810,264, on Nov. 27, 2014, 5 pages.
IP Australia, "Examination Report No. 2," issued in connection with application No. AU 2012231667, on Feb. 10, 2015, 3 pages.
United States Patent and Trademark Office, "Notice of Allowance," issued in connection with U.S. Appl. No. 13/756,493, on Mar. 17, 2015, 15 pages.
Patent Cooperation Treaty, "International Search Report," issued by the International Searching Authority in connection with PCT application No. PCT/US2014/068168, mailed Mar. 2, 2015, 3 pages.
Patent Cooperation Treaty, "Written Opinion of the International Searching Authority," issued by the International Searching Authority in connection with PCT application No. PCT/US2014/068168, mailed Mar. 2, 2015, 5 pages.
Patent Cooperation Treaty, "International Search Report," issued in connection with Application No. PCT/US2014/035156, mailed Aug. 25, 2014, 5 pages.
Patent Cooperation Treaty, "Written Opinion," issued in connection with Application No. PCT/US2014/035156, mailed Aug. 25, 2014, 5 pages.
European Patent Office, "Extended European Search Report," issued in connection with application No. EP 12760524.4, on Aug. 18, 2014, 8 pages.
Japanese Patent Office, "Office Action" with English translation, issued in connection with application No. JP 2013-544887, on Aug. 12, 2014, 16 pages.
Adam et al, "Privacy Preserving Integration of Health Care Data," AMIA 2007 Symposium Proceedings, 6 pages.
Chloe Albanesius, "Facebook Issues Fix for Several Tracking Cookies," internet article, http://www.pcmag.com/article2/0,2817,2393750,00.asp, Sep. 28, 2011, 2 pages.
Emil Protalinski, "Facebook denies cookie tracking allegations," internet article, http://www.zdnet.com/blog/facebook/facebook-denies-cookie-tracking-allegations/4044, Sep. 25, 2011, 2 pages.
Emil Protalinski, "Facebook fixes cookie behavior after logging out," internet article, http://www.zdnet.com/blog/facebook/facebook-fixes-cookie-behavior-after-logging-out/4120, Sep. 27, 2011, 2 pages.
Emil Protalinski, "US congressmen ask FTC to investigate Facebook cookies," internet article, http://www.zdnet.com/blog/facebook/us-congressmen-ask-ftc-to-investigate-facebook-cookies/4218, Sep. 28, 2011, 2 pages.
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
JavaScript and AJAX Forum, Sep. 28, 2005, [retrieved from Internet at http://www.webmasterworld.com/ forum91/4465.htm on Jun. 29, 2011] 4 pages.
Launder, "Media Journal: Nielsen to Test Online-TV Viewing Tool," The Wall Street Journal, Apr. 30, 2013, 2 pages.
"Mental Poker," Wikipedia, Jan. 12, 2010, [retrieved from Internet at en.wikipedia.org/wiki/Mental_poker on Sep. 21, 2010] 5 pages.
"Nielsen Unveils New Online Advertising Measurement," The Nielsen Company, Sep. 27, 2010, [retrieved from Internet at http://nielsen.com/us/en/insights/press-room/201O/nielsen_unveils_newonlineadvertisingmeasurement.html on May 31, 2012] 3 pages.
Nik Cubrilovic, "Logging out of Facebook is not enough," internet article, www.nikcub.appspot.com, Sep. 25, 2011, 3 pages.

(56) References Cited

OTHER PUBLICATIONS

Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," All Things, Apr. 30, 2013, 3 pages.
Coffey, "Internet Audience Measurement: A Practitioner's View," Journal of Interactive Advertising, vol. 1, No. 2, Spring 2001, 8 pages.
Vega, Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
International Bureau, "International Preliminary Report on Patentability," issued in connection with PCT application Serial No. PCT/US2011/052623, issued Mar. 26, 2013, 5 pages.
International Searching Authority, "International Preliminary Report on Patentability," issued in connection with application No. PCT/US2012/026760, on Sep. 24, 2013, 4 pages.
International Searching Authority, "International Search Report," issued in connection with application No. PCT/US2011/052623, mailed on Mar. 8, 2012, 3 pages.
International Searching Authority, "International Search Report," issued in connection with application No. PCT/US2012/026760, mailed on Jan. 2, 2013, 3 pages.
International Searching Authority, "International Search Report," issued in connection with International Application No. PCT/US2013/025687 on Jun. 2, 2013, 5 pages.
International Searching Authority, "Written Opinion of the International Searching Authority," issued in issued in connection with International Application No. PCT/US2013/025687 on Jun. 2, 2013, 5 pages.
International Searching Authority, "Written Opinion," issued in connection with application No. PCT/US2011/052623, mailed on Mar. 8, 2012, 4 pages.
International Searching Authority, "Written Opinion," issued in connection with application No. PCT/US2011/065881, mailed on Jul. 9, 2012, 6 pages.
International Searching Authority, "Written Opinion," issued in connection with application No. PCT/US2012/026760, mailed on Jan. 2, 2013, 3 pages.
Patent Cooperation Treaty, "International Search Report," issued by the International Searching Authority in connection with PCT application No. PCT/US2011/065881, mailed Jul. 9, 2012, 3 pages.
Patent Cooperation Treaty, "International Search Report and Written Opinion of the International Searching Authority," issued by the International Searching Authority in connection with PCT/US2013/045211, mailed Feb. 25, 2014, 13 pages.
Australian Government, IP Australia, "Examination Report," issued in connection with application No. AU 2013205736, on Jun. 18, 2013, 2 pages.
Japan Patent Office, "Notice of Reasons for Rejection," issued in connection with Application No. 2013-529435, Aug. 20, 2013, 4 pages.
United States Patent and Trademark Office, "Final Office Action," issued in connection with U.S. Appl. No. 13/690,915, on Dec. 20, 2013, 6 pages.
United States Patent and Trademark Office, "Non-Final Office Action," issued in connection with U.S. Appl. No. 13/239,005, on Jun. 4, 2013, 28 pages.
United States Patent and Trademark Office, "Non-Final Office Action," issued in connection with U.S. Appl. No. 13/690,915, on Sep. 5, 2013, 36 pages.
United States Patent and Trademark Office, "Non-Final Office Action," issued in connection with U.S. Appl. No. 13/691,175, on Sep. 9, 2013, 35 pages.
United States Patent and Trademark Office, "Notice of Allowance," issued in connection with U.S. Appl. No. 13/239,005, on Nov. 27, 2013, 46 pages.
United States Patent and Trademark Office, "Notice of Allowance," issued in connection with U.S. Appl. No. 13/513,148, on Nov. 5, 2012, 27 pages.
United States Patent and Trademark Office, "Notice of Allowance," issued in connection with U.S. Appl. No. 13/691,175, on May 9, 2014, 6 pages.
United States Patent and Trademark Office, "Non-Final Office Action," issued in connection with U.S. Appl. No. 13/756,493, on Jan. 17, 2014, 32 pages.
United States Patent and Trademark Office, "Notice of Allowance and Fee(s) Due," issued in connection with U.S. Appl. No. 13/690,915, Apr. 9, 2014, 28 pages.
United States Patent and Trademark Office, "Notice of Allowance," issued in connection with U.S. Appl. No. 13/691,175, on Jan. 27, 2014, 15 pages.
United States Patent and Trademark Office, "Non-Final Office Action," issued in connection with U.S. Appl. No. 13/396,071, on May 9, 2014, 35 pages.
United States Patent and Trademark Office, "Non-Final Office Action," issued in connection with U.S. Appl. No. 13/209,292, on Apr. 8, 2014, 15 pages.
Patent Cooperation Treaty, "International Search Report," issued by the International Searching Authority in connection with PCT/US2013/057045, mailed Dec. 27, 2013 (3 pages).
International Searching Authority, "Written Opinion," issued in connection with application No. PCT/US2013/057045, mailed Dec. 27, 2013 (5 pages).
United States Patent and Trademark Office, "Notice of Allowance," issued in connection with U.S. Appl. No. 13/756,493, on May 20, 2014, 32 pages.
Braverman, Samantha, "Are the Online Marketing Efforts of TV Shows and Programs Worthwhile?" Mar. 30, 2011 (5 pages).
Danaher, Peter J., Journal of Marketing Research, vol. XXVIII, "A Canonical Expansion Model for Multivariate Media Exposure Distributions: A Generalization of the 'Duplication of Viewing Law,'" Aug. 1991 (7 pages).
Enoch, Glenn and Johnson, Kelly. Journal of Advertising Research, "Cracking the Cross-Media Code: How to Use Single-Source Measures to Examine Media Cannibalization and Convergence," Jun. 2010 (13 pages).
Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).
Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).
Nielsen, "How Teens Use Media: A Nielsen Report on the Myths and Realities of Teem Media Trends," Jun. 2009 (17 pages).
Arbitron Inc., Edison Research, "The Infinite Dial 2011: Navigating Digital Platforms," 2011 (83 pages).
Rust, Roland T., Klompmaker, Jay E., Journal for Advertising, vol. 10, No. 3, "A Comparative Study of Television Duplication Models," 1981 (6 pages).
Hothorn et al. "Unbiased Recursive Partitioning: A Conditional Inference Framework," Journal of Computational and Geographical Statistics, vol. 15, No. 3, 2006, pp. 651-674 (21 pages).
Edwards, Jim. "Apple Wants More Advertisers to Use Its iPhone Tracking System." Business Insider. Jun. 13, 2013. Retrieved from http://www.businessinsider.com/apples-idfa-and-ifa-tracking-system-2013-6 (2 pages).
Facebook for Business. "Measuring Conversions on Facebook, Across Devices and in Mobile Apps" Aug. 14, 2014. Retrieved from https://www.facebook.com/business/news/cross-device-measurement (3 pages).
Patent Cooperation Treaty, "International Search Report and Written Opinion of the International Searching Authority," issued in connection with Application No. PCT/US2014/031342, Jul. 28, 2014, 13 pages.

(56) References Cited

OTHER PUBLICATIONS

Patent Cooperation Treaty, "International Search Report and Written Opinion," issued in connection with Application No. PCT/US2014/035683, Sep. 12, 2014, 13 pages.
Patent Cooperation Treaty, "International Search Report and Written Opinion," issued in connection with Application No. PCT/US2014/037064, Sep. 12, 2014, 9 pages.
Patent Cooperation Treaty, "International Search Report and Written Opinion of the International Searching Authority," issued in connection with Application No. PCT/US2014/034389, Sep. 5, 2014, 15 pages.
United States Patent and Trademark Office, "Notice of Allowance," issued in connection with U.S. Appl. No. 13/396,071, Oct. 24, 2014, 31 pages.
Canadian Intellectual Property Office, "Office Action," issued in connection with Canadian Patent Application No. 2,819,268, Nov. 24, 2014 (4 pages).
United States Patent and Trademark Office, "Office Action," issued in connection with U.S. Appl. No. 14/014,050, Sep. 12, 2014, 32 pages.
Patent Cooperation Treaty, "International Search Report and Written Opinion," issued in connection with Application No. PCT/US2014/050551, Nov. 24, 2014, 11 pages.
European Patent Office, "Extended European Search Report," issued in connection with application No. EP 14004028.8, on Apr. 9, 2015, 7 pages.
United States Patent and Trademark Office, "Non-Final Office Action," issued in connection with U.S. Appl. No. 14/025,575, Apr. 16, 2015, 72 pages.
The State Intellectual Property Office of China, "First Notification of Office Action," issued in connection with application No. CN 201280003504.8, on Apr. 1, 2015, with English translation, 17 pages.
IP Australia, "Patent Examination Report No. 1," issued in connection with Application No. 2014260163, Apr. 21, 2015, 3 pages.
United States Patent and Trademark Office, "Notice of Allowance," issued in connection with U.S. Appl. No. 14/500,297, May 21, 2015, (31 pages).
United States Patent and Trademark Office, "Non-Final Office Action," issued in connection with U.S. Appl. No. 14/014,050, May 28, 2015, 20 pages.
IP Australia, "Patent Examination Report No. 1," issued in connection with Application No. 2014262739, May 29, 2015, 4 pages.
United States Patent and Trademark Office, "Notice of Allowance," issued in connection with U.S. Appl. No. 13/915,381, Jun. 8, 2015, 44 pages.
United States Patent and Trademark Office, "Non-Final Office Action," issued in connection with U.S. Appl. No. 13/404,984, May 20, 2015, (27 pages).
United States Patent and Trademark Office, "Notice of Allowance," issued in connection with U.S. Appl. No. 13/690,915, on Jun. 5, 2015, (64 pages).
IP Australia, "Patent Examination Report No. 1," issued in connection with Application No. 2011349435, Nov. 4, 2014 (3 pages).
Japanese Patent Office, "Office Action," issued in connection with Japanese Patent Application No. 2013543286, Aug. 26, 2014 (5 pages).
United States Patent and Trademark Office, "Notice of Allowance," issued in connection with U.S. Appl. No. 13/995,864, Oct. 28, 2014 (39 pages).
Goerg et al., "How Many Millenials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.
United States Patent and Trademark Office, "Non-Final Office Action," issued in connection with U.S. Appl. No. 14/014,044, Jul. 2, 2015, 69 pages.
Patent Cooperation Treaty, "International Preliminary Report on Patentability," issued in connection with Application No. PCT/US2013/057045, Mar. 3, 2015, 1 page.
Patent Cooperation Treaty, "International Search Report," issued in connection with Application No. PCT/US2014/068623, Mar. 23, 2015, 3 pages.
Patent Cooperation Treaty, "Written Opinion," issued in connection with Application No. PCT/US2014/068623, Mar. 23, 2015, 8 pages.
Patent Cooperation Treaty, "International Search Report," issued in connection with Application No. PCT/US2014/068202, Apr. 10, 2015, 3 pages.
Patent Cooperation Treaty, "Written Opinion," issued in connection with Application No. PCT/US2014/068202, Apr. 10, 2015, 7 pages.
Patent Cooperation Treaty, "International Preliminary Report on Patentability," issued in connection with Application No. PCT/US2013/045211, Dec. 16, 2014, 8 pages.
IP Australia, "Patent Examination Report No. 1," issued in connection with Application No. 2013204865, Dec. 22, 2014, 3 pages.
United States Patent and Trademark Office, "Non-Final Office Action," issued in connection with U.S. Appl. No. 13/915,381, Jan. 30, 2015, 51 pages.
United States Patent and Trademark Office, "Final Office Action," issued in connection with U.S. Appl. No. 13/963,737, Sep. 21, 2015, 14 pages.
State Intellectual Property Office of China, "Second Office Action," issued in connection with Chinese Patent Application No. 201180045957.2, on Jul. 29, 2015 (5 pages).
Japanese Patent Office, "Notice of Reasons for Rejection," issued in connection with Japanese Patent Application No. P2015-0524512 on Jun. 30, 2015 (6 pages).
Taboga, Marco. (2010) "Linear combinations of normal random variables", from "Lectures on probability and statistics," <http://www.statlect.com/normal_distribution_linear_combinations.htm> (4 pages).
Australian Government, IP Australia, "Patent Examination Report No. 1," issued in connection with Australian Application No. 2013204953, Dec. 23, 2014 (5 pages).
United States Patent and Trademark Office, "Notice of Allowance," issued in connection with U.S. Appl. No. 14/641,982, Sep. 2, 2015 (13 pages).

\* cited by examiner

400

| FREQUENCY | UUIDs (COOKIES) | IMPRESSION |
|---|---|---|
| 1 | 100,000 | 100,000 |
| 2 | 200,000 | 400,000 |
| 3 | 100,000 | 300,000 |
| 4 | 50,000 | 200,000 |
| 5 | 50,000 | 250,000 |
| TOTAL | 500,000 | 1,250,000 |

402 — FREQUENCY; 404 — UUIDs (COOKIES); 406 — IMPRESSION

RATINGS ENTITY IMPRESSIONS

| AGE/GENDER | IMPRESSIONS | FREQUENCY | IMPRESSION COMP |
|---|---|---|---|
| (SOURCE) | (DB PROPRIETOR) | (DB PROPRIETOR) | (DB PROPRIETOR) |
| M 13-18 | 1,000,000 | 4 | 33% |
| F 13-18 | 2,000,000 | 5 | 66% |
| ... | | | |
| F 50+ | 0 | 0 | 0 |
| TOTAL | 3,000,000 | 4.7 | 100% |

502 — AGE/GENDER; 504 — IMPRESSIONS; 506 — FREQUENCY; 508 — IMPRESSION COMP

DATABASE (DB) PROPRIETOR CAMPAIGN-LEVEL AGE/GENDER AND
IMPRESSION COMPOSITION TABLE

| AGE/GENDER | IMPRESSIONS | FREQUENCY | IMPRESSION COMP |
|---|---|---|---|
| (SOURCE) | (ONLINE+PC&TV) | (ONLINE+PC&TV) | (ONLINE+PC&TV) |
| <12 | 100,000 | 3 | 4% |
| M 13-18 | 750,000 | 3 | 31% |
| F 13-18 | 1,550,000 | 4 | 65% |
| ... | | | |
| F 50+ | 0 | 0 | 0 |
| TOTAL | 2,400,000 | 3.3 | 100% |

602 — AGE/GENDER; 604 — IMPRESSIONS; 606 — FREQUENCY; 608 — IMPRESSION COMP

PANELIST CAMPAIGN-LEVEL AGE/GENDER AND
IMPRESSION COMPOSITION TABLE

| AGE/GENDER | IMPRESSION COMP | IMPRESSION COMP | ERROR WEIGHTED |
|---|---|---|---|
| (SOURCE) | (RE PC&TV) | (DB PROPRIETOR) | ($\alpha IC_{(RE)} + (1-\alpha)IC_{(SN)}$) |
| <12 | 4% | 0 | 2% |
| M 13-18 | 31% | 33% | 32% |
| F 13-18 | 65% | 66% | 66% |
| ... | | | |
| F 50+ | 0 | 0 | 0 |
| TOTAL | 100% | 100% | 100% |

702

COMBINED CAMPAIGN-LEVEL AGE/GENDER AND
IMPRESSION COMPOSITION TABLE

| AGE/GENDER | IMPRESSIONS | FREQUENCY | REACH | IMPRESSION COMP |
|---|---|---|---|---|
| (SOURCE) | (RATINGS ENTITY) | (DB PROPRIETOR) | (DERIVED) | (IMP COMP TABLE) |
| <12 | 56,000 | 3 | 18,666 | 2% |
| M 13-18 | 896,000 | 4 | 224,000 | 32% |
| F 13-18 | 1,848,000 | 5 | 369,600 | 66% |
| ... | | | | |
| F 50+ | 0 | 0 | 0 | 0 |
| TOTAL | 2,800,000 | 4.6 | 612,266 | 100% |

802 · 804 · 806 · 808 · 810

AGE/GENDER IMPRESSIONS DISTRIBUTION TABLE

FIG. 8

1402 → 4dmdsgh843s66&b=4&d=GiBaqIBpYEKZvs0ud9.19j1etODmGhUJfdeDYw--&s=d7&i=yaO_ENiDiRWwiaYRDLHf
M 12-18

1404 → 4jo1omp8435sa&b=4&d=GiBaqIBpYEKZvs0ud9.19j1etODmGhUJfdeDYw--&s=gq&i=peFkl1rnB3L0LdrqRHqX
M 12-18

1406 → fki9pdd845a1I&b=4&d=GiBaqIBpYEKZvs0ud9.19j1etODmGhUJfdeDYw--&s=uo&i=9H9T9jpo9HXbpl4VnQ76
M 12-18

1408 → e531njp83us1p&b=4&d=JTmpkYZpYEKBHKGhORBK2fP28BFPD2nKwYbHug--&s=sm&i=dm5FtDRML.87TCTsAmvp
F 18-20

1410 → e531njp83us1p&b=4&d=JTmpkYZpYEKBHKGhORBK2fP28BFPD2nKwYbHug--&s=sm&i=dm5FtDRML.87TCTsAmvp
M 21-24

1412 → e531njp83us1p&b=4&d=yKFjwW1pYEIHcCqJEJYJwINP41aNmU2S.O2NGg--&s=d2&i=4OYDcj8PTJVOOoPkScrp
M 21-24

1414 → e531njp83us1p&b=4&d=yKFjwW1pYEIHcCqJEJYJwINP41aNmU2S.O2NGg--&s=d2&i=4OYDcj8PTJVOOoPkScrp
F 35-39

1416 → e531njp83us1p&b=4&d=yKFjwW1pYEIHcCqJEJYJwINP41aNmU2S.O2NGg--&s=d2&i=4OYDcj8PTJVOOoPkScrp
M 21-24

1418 → e531njp83us1p&b=4&d=yKFjwW1pYEIHcCqJEJYJwINP41aNmU2S.O2NGg--&s=d2&i=Lub.esFw0qteUaDoGsS8
M 21-24

1420 → e531njp83us1p&b=4&d=yKFjwW1pYEIHcCqJEJYJwINP41aNmU2S.O2NGg--&s=d2&i=Lub.esFw0qteUaDoGsS8
M 21-24

FIG. 14

| | - | & | . | = | 0 | 1 | 2 | 3 | 4 | 5 | 6 | 7 | 8 | 9 | a | A | b | B | c | C | d | D | e | E | f | F |
|---|---|---|---|---|---|---|---|---|---|---|---|---|---|---|---|---|---|---|---|---|---|---|---|---|---|---|
| 1 | 23 | 106 | 4 | 60 | 183 | 199 | 93 | 0 | 156 | 44 | 121 | 15 | 184 | 8 | 134 | 148 | 159 | 29 | 135 | 180 | 161 | 199 | 42 | 122 | 117 | 12 |
| 2 | 45 | 104 | 192 | 5 | 175 | 127 | 126 | 73 | 143 | 116 | 50 | 125 | 39 | 123 | 159 | 186 | 73 | 87 | 109 | 92 | 27 | 181 | 132 | 25 | 112 | 133 |
| 3 | 14 | 115 | 167 | 7 | 122 | 86 | 93 | 23 | 189 | 177 | 160 | 88 | 148 | 55 | 124 | 2 | 67 | 14 | 191 | 13 | 21 | 88 | 98 | 134 | 92 | 52 |
| 4 | 104 | 31 | 57 | 11 | 172 | 12 | 173 | 83 | 64 | 190 | 118 | 118 | 0 | 123 | 0 | 145 | 126 | 156 | 91 | 30 | 12 | 95 | 23 | 12 | 27 | 109 |
| 5 | 159 | 115 | 9 | 197 | 138 | 102 | 113 | 28 | 39 | 143 | 82 | 133 | 166 | 32 | 197 | 89 | 16 | 36 | 168 | 40 | 136 | 161 | 142 | 163 | 182 | 93 |
| 6 | 78 | 154 | 22 | 88 | 189 | 25 | 63 | 82 | 138 | 6 | 162 | 165 | 192 | 99 | 12 | 85 | 30 | 64 | 19 | 2 | 171 | 28 | 109 | 68 | 116 | 138 |
| 7 | 138 | 69 | 113 | 136 | 164 | 143 | 54 | 173 | 113 | 47 | 33 | 51 | 112 | 5 | 101 | 182 | 93 | 194 | 157 | 122 | 19 | 115 | 51 | 99 | 41 | 47 |
| 8 | 179 | 38 | 31 | 84 | 22 | 39 | 57 | 28 | 136 | 162 | 174 | 129 | 186 | 197 | 110 | 184 | 23 | 130 | 42 | 46 | 185 | 76 | 164 | 45 | 198 | 85 |
| 9 | 95 | 129 | 109 | 147 | 155 | 23 | 32 | 22 | 90 | 77 | 176 | 156 | 164 | 63 | 2 | 155 | 70 | 23 | 144 | 86 | 13 | 144 | 30 | 48 | 36 | 149 |
| 10 | 52 | 73 | 44 | 156 | 196 | 60 | 47 | 68 | 181 | 141 | 83 | 126 | 83 | 4 | 174 | 95 | 108 | 10 | 42 | 13 | 137 | 59 | 181 | 133 | 176 | 129 |
| 11 | 184 | 159 | 22 | 15 | 18 | 5 | 152 | 61 | 82 | 188 | 17 | 199 | 171 | 122 | 161 | 59 | 132 | 94 | 141 | 165 | 42 | 147 | 80 | 39 | 140 | 101 |
| 12 | 135 | 80 | 95 | 125 | 158 | 3 | 89 | 7 | 138 | 46 | 27 | 76 | 174 | 190 | 79 | 166 | 5 | 54 | 42 | 76 | 82 | 75 | 117 | 199 | 26 | 186 |
| 13 | 68 | 73 | 16 | 16 | 147 | 77 | 17 | 74 | 72 | 57 | 76 | 136 | 179 | 150 | 190 | 77 | 154 | 6 | 26 | 68 | 130 | 37 | 12 | 30 | 34 | 125 |
| 14 | 148 | 985 | 2 | 129 | 88 | 37 | 3 | 141 | 31 | 192 | 26 | 136 | 33 | 170 | 150 | 155 | 148 | 143 | 28 | 93 | 114 | 192 | 132 | 196 | 152 |
| 15 | 79 | 73 | 5 | 16 | 99 | 74 | 159 | 56 | 44 | 19 | 99 | 158 | 12 | 183 | 113 | 115 | 985 | 138 | 12 | 197 | 24 | 195 | 110 | 164 | 139 | 172 |
| 16 | 52 | 200 | 38 | 985 | 4 | 78 | 103 | 15 | 177 | 121 | 167 | 140 | 174 | 165 | 76 | 134 | 111 | 136 | 80 | 123 | 81 | 13 | 54 | 88 | 35 | 22 |
| 17 | 160 | 50 | 57 | 191 | 48 | 146 | 111 | 181 | 171 | 117 | 168 | 133 | 179 | 22 | 88 | 4 | 29 | 71 | 173 | 198 | 17 | 34 | 198 | 80 | 28 | 63 |
| 18 | 159 | 985 | 197 | 127 | 155 | 95 | 149 | 187 | 46 | 181 | 166 | 92 | 167 | 177 | 94 | 148 | 25 | 77 | 105 | 130 | 154 | 30 | 29 | 54 | 71 | 72 |
| 19 | 128 | 24 | 47 | 6 | 48 | 174 | 5 | 17 | 68 | 73 | 35 | 25 | 186 | 34 | 8 | 6 | 139 | 98 | 44 | 111 | 985 | 58 | 27 | 151 | 120 | 178 |
| 20 | 147 | 87 | 107 | 985 | 148 | 77 | 170 | 69 | 157 | 169 | 158 | 16 | 86 | 148 | 14 | 110 | 130 | 91 | 43 | 47 | 107 | 25 | 15 | 71 | 5 | 36 |
| 21 | 158 | 178 | 194 | 71 | 176 | 115 | 149 | 47 | 25 | 154 | 55 | 26 | 126 | 2 | 110 | 43 | 97 | 165 | 19 | 118 | 177 | 90 | 84 | 107 | 192 | 24 |
| 22 | 52 | 151 | 105 | 107 | 169 | 187 | 2 | 26 | 84 | 3 | 59 | 141 | 46 | 17 | 158 | 124 | 103 | 62 | 43 | 162 | 197 | 95 | 145 | 196 | 49 | 181 |
| 23 | 194 | 141 | 177 | 16 | 167 | 198 | 158 | 63 | 66 | 117 | 65 | 105 | 9 | 20 | 115 | 81 | 103 | 50 | 70 | 26 | 89 | 85 | 149 | 28 | 42 | 136 |

| 1602 | 1604 | 1606 | 1608 |
|---|---|---|---|
| 4dmdsgh843s66 | GiBaqIBpYEKZvs0ud9.19j1etODmGhUJfdeDYw-- | yaO_ENiDiRWviaYRDLHf | GiBaqIBpYE |
| 4jo1omp8435sa | GiBaqIBpYEKZvs0ud9.19j1etODmGhUJfdeDYw-- | peFkl1mB3L0LdrqRHqX | GiBaqIBpYE |
| Fki9pdd845a1l | GiBaqIBpYEKZvs0ud9.19j1etODmGhUJfdeDYw-- | 9H9T9jpo9HXbpl4VnQ76 | GiBaqIBpYE |
| E531njp83us1p | JTmpkYZpYEKBHKGhoRBK2fP28BFPD2nKwYbHug-- | dm5FtDRML.87TCTsAmvp | JTmpkYZpYE |
| E531njp83us1p | JTmpkYZpYEKBHKGhoRBK2fP28BFPD2nKwYbHug-- | dm5FtDRML.87TCTsAmvp | JTmpkYZpYE |
| E531njp83us1p | yKFjwW1pYEIHcCqJEJYJwlNP41aNmU2S.O2NGg-- | 4OYDcj8PTJVOOoPkScrp | yKFjwW1pYE |
| E531njp83us1p | yKFjwW1pYEIHcCqJEJYJwlNP41aNmU2S.O2NGg-- | 4OYDcj8PTJVOOoPkScrp | yKFjwW1pYE |
| E531njp83us1p | yKFjwW1pYEIHcCqJEJYJwlNP41aNmU2S.O2NGg-- | 4OYDcj8PTJVOOoPkScrp | yKFjwW1pYE |
| E531njp83us1p | yKFjwW1pYEIHcCqJEJYJwlNP41aNmU2S.O2NGg-- | Lub.esFw0qteUaDoGsS8 | yKFjwW1pYE |
| E531njp83us1p | yKFjwW1pYEIHcCqJEJYJwlNP41aNmU2S.O2NGg-- | Lub.esFw0qteUaDoGsS8 | yKFjwW1pYE |

FIG. 16

Table 1700

| Gender | Age Group | Error Relative to Panel Count (% overestimate) | | | | Ref. Error |
|---|---|---|---|---|---|---|
| | | 1 Day | 1 Week | 3 Weeks | 3 Months | |
| F | 2-11 | 5% | 8% | 9% | 18% | 200% |
| F | 12-17 | 14% | 16% | 29% | 33% | 431% |
| F | 18-20 | 9% | 20% | 34% | 35% | 646% |
| F | 21-24 | 18% | 25% | 35% | 36% | 844% |
| F | 25-29 | 13% | 26% | 37% | 34% | 1055% |
| F | 30-34 | 9% | 30% | 34% | 35% | 1228% |
| F | 35-39 | 10% | 25% | 29% | 34% | 1222% |
| F | 40-44 | 15% | 24% | 37% | 38% | 1298% |
| F | 45-49 | 9% | 20% | 37% | 39% | 1703% |
| F | 50-54 | 5% | 23% | 39% | 36% | 1462% |
| F | 55-64 | 8% | 16% | 25% | 30% | 1799% |
| F | 65+ | 7% | 15% | 18% | 22% | 1768% |
| M | 2-11 | 5% | 9% | 13% | 19% | 263% |
| M | 12-17 | 20% | 18% | 27% | 32% | 492% |
| M | 18-20 | 12% | 29% | 41% | 36% | 670% |
| M | 21-24 | 2% | 20% | 36% | 33% | 615% |
| M | 25-29 | 7% | 23% | 32% | 29% | 808% |
| M | 30-34 | 13% | 31% | 39% | 36% | 1211% |
| M | 35-39 | 9% | 30% | 36% | 36% | 1357% |
| M | 40-44 | 11% | 19% | 33% | 34% | 1191% |
| M | 45-49 | 7% | 22% | 33% | 33% | 1440% |
| M | 50-54 | 15% | 25% | 33% | 33% | 1600% |
| M | 55-64 | 5% | 17% | 25% | 30% | 1540% |
| M | 65+ | 4% | 11% | 16% | 23% | 1430% |
| Total | | 9% | 20% | 30% | 32% | 1143% |

Table 1702

| Total Unique Counts with Demographic Information | | | | |
|---|---|---|---|---|
| | 1 day | 1 week | 3 weeks | 3 months |
| Panel (known) | 2,231 | 5,999 | 8,418 | 13,340 |
| De-duplicated | 2,431 | 7,211 | 10,904 | 19,574 |
| Cookie only | 3,480 | 19,154 | 46,384 | 165,772 |

FIG. 17

METHODS AND APPARATUS TO DE-DUPLICATE IMPRESSION INFORMATION

RELATED APPLICATIONS

This Patent claims priority to U.S. Provisional Patent Application Ser. No. 61/864,902, filed on Aug. 12, 2013. The entirety of U.S. Provisional Patent Application Ser. No. 61/864,902 is incorporated herein by reference.

FIELD OF THE DISCLOSURE

The present disclosure relates generally to monitoring media and, more particularly, to methods and apparatus to de-duplicate impression information.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

BRIEF DESCRIPTION OF THE DRAWINGS

FIG. 4 depicts an example ratings entity impressions table showing quantities of impressions to monitored users.

FIG. 5 depicts an example campaign-level age/gender and impression composition table generated by a database proprietor.

FIG. 6 depicts another example campaign-level age/gender and impression composition table generated by a ratings entity.

FIG. 7 depicts an example combined campaign-level age/gender and impression composition table based on the composition tables of FIGS. 5 and 6.

FIG. 8 depicts an example age/gender impressions distribution table showing impressions based on the composition tables of FIGS. 5-7.

FIG. 14 shows example cookie payloads obtained from panelist computers and from which the example impression monitor system of FIG. 13 may determine one or more patterns for use in de-duplicating impression information.

FIG. 15A is a table illustrating an example character map including total numbers of characters found at locations within a set of cookies obtained from a panel.

FIG. 15B is a table illustrating an example character map mapping characters to locations in a cookie payload obtained from a panelist computer.

FIG. 16 shows example groupings of information in the example cookie payloads of FIG. 14.

FIG. 17 is a table illustrating example errors calculated based on panel information and a pattern identified by the example impression monitor system of FIG. 13.

DETAILED DESCRIPTION

Figure 1:
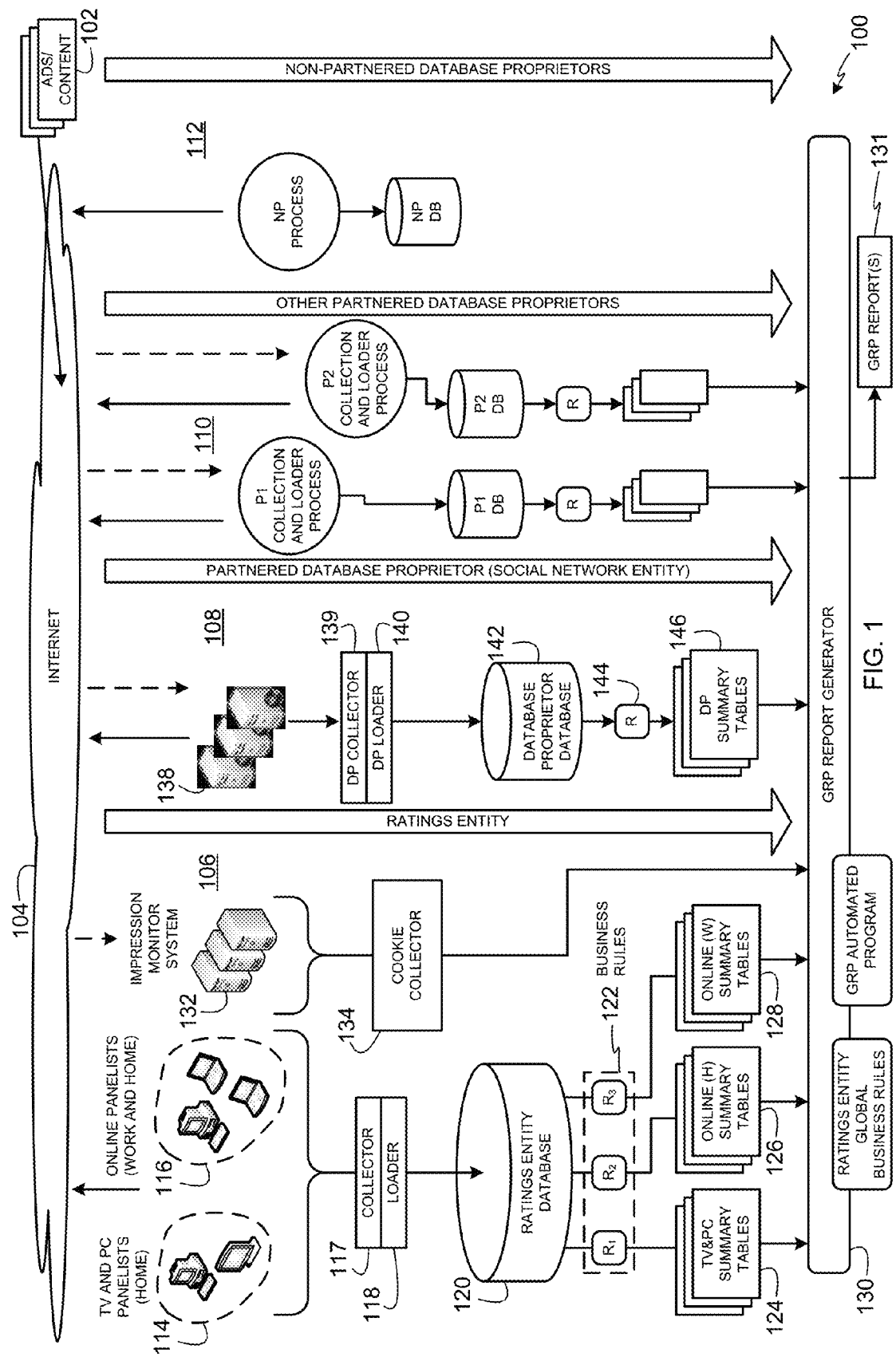
FIG. 1 depicts an example system that may be used to determine advertisement viewership using distributed demographic information.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the following describes example methods, apparatus, systems, and articles of manufacture, the examples provided are not the only ways to implement such methods, apparatus, systems, and articles of manufacture.

Techniques for monitoring user access to Internet resources such as web pages, advertisements and/or other content has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs which repeatedly request content from the server to increase the server log counts. Secondly, content is sometimes retrieved once, cached locally and then repeatedly viewed from the local cache without involving the server in the repeat viewings. Server logs cannot track these views of cached content. Thus, server logs are susceptible to both over-counting and undercounting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet content to be tracked is tagged with beacon instructions. In particular, monitoring instructions are associated with the HTML of the content to be tracked. When a client requests the content, both the content and the beacon instructions are downloaded to the client. The beacon instructions are, thus, executed whenever the content is accessed, be it from a server or from a cache.

The beacon instructions cause monitoring data reflecting information about the access to the content to be sent from the client that downloaded the content to a monitoring entity. Typically, the monitoring entity is an audience measurement entity that did not provide the content to the client and who is a trusted third party for providing accurate usage statistics (e.g., The Nielsen Company, LLC). Advantageously, because the beaconing instructions are associated with the content and executed by the client browser whenever the content is accessed, the monitoring information is provided to the audience measurement company irrespective of whether the client is a panelist of the audience measurement company.

It is important, however, to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist computer that enables the audience measurement entity to identify the panelist whenever the panelist accesses tagged content and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so.

In view of the foregoing, an audience measurement company would like to leverage the existing databases of database proprietors to collect more extensive Internet usage and demographic data. However, the audience measurement entity is faced with several problems in accomplishing this end. For example, a problem is presented as to how to access the data of the database proprietors without compromising the privacy of the subscribers, the panelists, or the proprietors of the tracked content. Another problem is how to access this data given the technical restrictions imposed by the Internet protocols that prevent the audience measurement entity from accessing cookies set by the database proprietor. Example methods, apparatus and articles of manufacture disclosed herein solve these problems by extending the beaconing process to encompass partnered database proprietors and by using such partners as interim data collectors.

Examples disclosed herein accomplish this task by responding to beacon requests from clients (who may not be a member of an audience member panel and, thus, may be unknown to the audience member entity) accessing tagged content by redirecting the client from the audience measurement entity to a database proprietor such as a social network site partnered with the audience member entity. The redirection initiates a communication session between the client accessing the tagged content and the database proprietor. The database proprietor (e.g., Facebook) can access any cookie it has set on the client to thereby identify the client based on the internal records of the database proprietor. In the event the client is a subscriber of the database proprietor, the database proprietor logs the content impression in association with the demographics data of the client and subsequently forwards the log to the audience measurement company. In the event the client is not a subscriber of the database proprietor, the database proprietor redirects the client to the audience measurement company. The audience measurement company may then redirect the client to a second, different database proprietor that is partnered with the audience measurement entity. That second proprietor may then attempt to identify the client as explained above. This process of redirecting the client from database proprietor to database proprietor can be performed any number of times until the client is identified and the content exposure logged, or until all partners have been contacted without a successful identification of the client. The redirections all occur automatically so the user of the client is not involved in the various communication sessions and may not even know they are occurring.

The partnered database proprietors provide their logs and demographic information to the audience measurement entity which then compiles the collected data into statistical reports accurately identifying the demographics of persons accessing the tagged content. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the content access being logged as well as the identity of the content itself from the database proprietors (thereby protecting the privacy of the content sources), without compromising the ability of the database proprietors to log impressions for their subscribers. Further, the Internet security cookie protocols are complied with because the only servers that access a given cookie are associated with the Internet domain (e.g., Facebook.com) that set that cookie.

Examples described herein can be used to determine content impressions, advertisement impressions, content exposure, and/or advertisement exposure using demographic information, which is distributed across different databases (e.g., different website owners, service providers, etc.) on the Internet. Not only do example methods, apparatus, and articles of manufacture disclosed herein enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social medium sites such as Facebook, Twitter, Google, etc. This extension effectively leverages the content tagging capabilities of the ratings entity and the use of databases of non-ratings entities such as social media and other websites to create an enormous, demographically accurate panel that results in accurate, reliable measurements of exposures to Internet content such as advertising and/or programming.

In illustrated examples disclosed herein, advertisement exposure is measured in terms of online Gross Rating Points. A Gross Rating Point (GRP) is a unit of measurement of audience size that has traditionally been used in the television ratings context. It is used to measure exposure to one or more programs, advertisements, or commercials, without regard to multiple exposures of the same advertising to individuals. In terms of television (TV) advertisements, one GRP is equal to 1% of TV households. While GRPs have traditionally been used as a measure of television viewership, examples disclosed herein develop online GRPs for online advertising to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements. Because examples disclosed herein associate viewership measurements with corresponding demographics of users, the information collected by examples disclosed herein may also be used by advertisers to identify segments reached by their advertisements and/or to target particular markets with future advertisements.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

Examples disclosed herein may be implemented by an audience measurement entity (e.g., any entity interested in measuring or tracking audience exposures to advertisements, content, and/or any other media) in cooperation with any number of database proprietors such as online web services providers to develop online GRPs. Such database proprietors/online web services providers may be social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

To increase the likelihood that measured viewership is accurately attributed to the correct demographics, examples disclosed herein use demographic information located in the audience measurement entity's records as well as demographic information located at one or more database proprietors (e.g., web service providers) that maintain records or profiles of users having accounts therewith. In this manner, example methods, apparatus, and/or articles of manufacture disclosed herein may be used to supplement demographic information maintained by a ratings entity (e.g., an audience measurement company such as The Nielsen Company of Schaumburg, Ill., United States of America, that collects media exposure measurements and/or demographics) with demographic information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

In some cases, a database proprietor is not willing and/or is unable to share detailed demographic information for individual impressions. Some database proprietors may, for example, provide cookie information for an impression and provide age and/or gender information corresponding to the impression. However, in some cases, the database proprietor does not indicate instances in which one individual corresponds to multiple impressions and/or does not indicate unique individuals in the impression information (e.g., provides only aggregated data). Without such indications, the unique audience and/or reach of media may be significantly overestimated because duplicated impressions for particular individuals are not detectable and are, thus, mistakenly counted as unique impressions for different, respective individuals.

Examples disclosed herein may be used to de-duplicate impression information by interpreting information in cookies. In some examples, impression information is obtained from panelists in a panel, where the impression information includes cookies associated with a database proprietor of interest. Using the known information associated with the panelists, examples disclosed herein detect pattern(s) in the cookie information. In some examples, identifying such pattern(s) enables de-duplication of impression information received from the database proprietor that are not associated with the panel.

In some cases, a cookie set by a database proprietor uniquely identifies an individual or device for subsequent visits to the database proprietor web site. However, in some examples disclosed herein, a database proprietor sets a cookie that is not always unique for an individual or computer (e.g., a semi-unique cookie such as a B4 cookie used by Yahoo!®). In some examples, the data payload of the cookie is based on the subscriber and/or the device used to log in to the database proprietor web site. For some database proprietors, the cookie (e.g., the data payload of the cookie) set by the database proprietor has a consistent pattern that does not change between cookies set at the device at different times, despite the cookies having different payload data. In other words, while the data (e.g., string of characters) in the cookie payload may change (e.g., XYXYXYXYXYX to ABABABA-BABA), the payloads conform to or include a consistent data pattern for the same device.

Examples disclosed herein obtain a set of cookies for a same database proprietor and a set of user identifiers from a panel having known characteristics. Examples disclosed herein apply a pattern matching algorithm to semi-unique cookies to derive an identifier that serves as a household or device identifier and/or an identifier that serves as an individual identifier (e.g., similar to a panelist identifier in a Nielsen online ratings panel). An example of such a semi-unique cookie (e.g., the B4 cookie set by Yahoo!) includes 5 components: (1) the first 13 characters of the cookie data payload; (2) a "&b" field; (3) a "&d" field; (4) a "&s" field; and (5) a "&i" field.

Examples disclosed herein determine a pattern for some portion of the cookie data payload (e.g., encrypted and/or unencrypted cookie data). For example, for the Yahoo! B4 cookie, the disclosed examples may determine that the last X number of bits or characters at the end of the cookie data payload identifies a specific device. Examples disclosed herein detect a pattern in the data payload of the cookies by, for example, generating character maps of the payloads. In some examples, the character maps include the characters in the data payloads as columns (A, B, C, . . . Z, a, b, c, d, e, f, . . . , z, !, @, #, . . . =) and the location of the characters in the payload as the rows (e.g., row 1 corresponds to the first character of the data payload). Disclosed examples sum the character maps to identify consistent character-to-location combinations and/or to identify groups of data (e.g., variables) in the payloads.

Examples disclosed herein combine the value of the identified pattern or set of bits or characters with a demographic characteristic (e.g., an age and gender classification) obtained from the database proprietor. Examples disclosed herein use the combination as a proxy for a person-level identifier used in audience measurement panels. For example, if a first cookie having pattern X corresponds to a first demographic group (e.g., according to the database proprietor), and a second cookie having pattern X corresponds to a second demographic group, examples disclosed herein determine that two different people in the household were responsible for the two impressions using the same device. Examples disclosed herein may perform de-duplication even when the IP address was changed between setting the different cookies, because disclosed examples are not dependent on the IP address to identify patterns.

Examples disclosed herein provide a solution to the cookie deletion problem, in which cookies at a single household can be deleted and/or new IP addresses can be assigned. Semi-unique cookies are one such cookie subject to the cookie deletion problem, because semi-unique cookies may be set based on a user who is logged in. When the user is logged out and/or another user is logged in, the semi-unique cookie may be replaced (i.e., deleted). Furthermore, when the first user logs back in, the new cookie set at the login may be different than prior cookies for that user. By identifying patterns using panelist data, examples disclosed herein enable an identification of the multiple cookies as a single user to reduce overcounting.

In operation, examples disclosed herein collect the semi-unique cookies set by the database proprietor and send the collected cookies to the database proprietor to obtain demographic information corresponding to each cookie. By sending the cookies to the database proprietor and receiving demographic data in response, de-duplication can be accomplished for individual households.

FIG. 1 depicts an example system 100 that may be used to determine media exposure (e.g., exposure to content and/or advertisements) based on demographic information collected by one or more database proprietors. "Distributed demographics information" is used herein to refer to demographics information obtained from at least two sources, at least one of which is a database proprietor such as an online web services provider. In the illustrated example, content providers and/or advertisers distribute advertisements 102 via the Internet 104 to users that access websites and/or online television services (e.g., web-based TV, Internet protocol TV (IPTV), etc.). The advertisements 102 may additionally or alternatively be distributed through broadcast television services to traditional non-Internet based (e.g., RF, terrestrial or satellite based) television sets and monitored for viewership using the techniques described herein and/or other techniques. Websites, movies, television and/or other programming is generally referred to herein as content. Advertisements are typically distributed with content. Traditionally, content is provided at little or no cost to the audience because it is subsidized by advertisers who pay to have their advertisements distributed with the content.

In the illustrated example, the advertisements 102 may form one or more ad campaigns and are encoded with identification codes (e.g., metadata) that identify the associated ad campaign (e.g., campaign ID), a creative type ID (e.g., identifying a Flash-based ad, a banner ad, a rich type ad, etc.), a source ID (e.g., identifying the ad publisher), and a placement ID (e.g., identifying the physical placement of the ad on a screen). The advertisements 102 are also tagged or encoded to include computer executable beacon instructions (e.g., Java, javascript, or any other computer language or script) that are executed by web browsers that access the advertisements 102 on, for example, the Internet. Computer executable beacon instructions may additionally or alternatively be associated with content to be monitored. Thus, although this disclosure frequently speaks in the area of tracking advertisements, it is not restricted to tracking any particular type of media. On the contrary, it can be used to track content or advertisements of any type or form in a network. Irrespective of the type of content being tracked, execution of the beacon instructions causes the web browser to send an impression request (e.g., referred to herein as beacon requests) to a specified server (e.g., the audience measurement entity). The beacon request may be implemented as an HTTP request. However, whereas a transmitted HTML request identifies a webpage or other resource to be downloaded, the beacon request includes the audience measurement information (e.g., ad campaign identification, content identifier, and/or user identification information) as its payload. The server to which the beacon request is directed is programmed to log the audience measurement data of the beacon request as an impression (e.g., an ad and/or content impressions depending on the nature of the media tagged with the beaconing instruction).

In some example implementations, advertisements tagged with such beacon instructions may be distributed with Internet-based media content including, for example, web pages, streaming video, streaming audio, IPTV content, etc. and used to collect demographics-based impression data. As noted above, methods, apparatus, and/or articles of manufacture disclosed herein are not limited to advertisement monitoring but can be adapted to any type of content monitoring (e.g., web pages, movies, television programs, etc.). Example techniques that may be used to implement such beacon instructions are disclosed in Blumenau, U.S. Pat. No. 6,108,637, which is hereby incorporated herein by reference in its entirety.

Although disclosed examples are described herein as using beacon instructions executed by web browsers to send beacon requests to specified impression collection servers, such disclosed examples may additionally collect data with on-device meter systems that locally collect web browsing information without relying on content or advertisements encoded or tagged with beacon instructions. In such examples, locally collected web browsing behavior may subsequently be correlated with user demographic data based on user IDs as disclosed herein.

The example system 100 of FIG. 1 includes a ratings entity subsystem 106, a partner database proprietor subsystem 108 (implemented in this example by a social network service provider), other partnered database proprietor (e.g., web service provider) subsystems 110, and non-partnered database proprietor (e.g., web service provider) subsystems 112. In the illustrated example, the ratings entity subsystem 106 and the partnered database proprietor subsystems 108, 110 correspond to partnered business entities that have agreed to share demographic information and to capture impressions in response to redirected beacon requests as explained below. The partnered business entities may participate to advantageously have the accuracy and/or completeness of their respective demographic information confirmed and/or increased. The partnered business entities also participate in reporting impressions that occurred on their websites. In the illustrated example, the other partnered database proprietor subsystems 110 include components, software, hardware, and/or processes similar or identical to the partnered database proprietor subsystem 108 to collect and log impressions (e.g., advertisement and/or content impressions) and associate demographic information with such logged impressions.

The non-partnered database proprietor subsystems 112 correspond to business entities that do not participate in sharing of demographic information. However, the techniques disclosed herein do track impressions (e.g., advertising impressions and/or content impressions) attributable to the non-partnered database proprietor subsystems 112, and in some instances, one or more of the non-partnered database proprietor subsystems 112 also report characteristics of demographic uniqueness attributable to different impressions. Unique user IDs can be used to identify demographics using demographics information maintained by the partnered business entities (e.g., the ratings entity subsystem 106 and/or the database proprietor subsystems 108, 110).

The database proprietor subsystem 108 of the example of FIG. 1 is implemented by a social network proprietor such as Facebook. However, the database proprietor subsystem 108 may instead be operated by any other type of entity such as a web services entity that serves desktop/stationary computer users and/or mobile device users. In the illustrated example, the database proprietor subsystem 108 is in a first internet domain, and the partnered database proprietor subsystems 110 and/or the non-partnered database proprietor subsystems 112 are in second, third, fourth, etc. internet domains.

In the illustrated example of FIG. 1, the tracked content and/or advertisements 102 are presented to TV and/or PC (computer) panelists 114 and online only panelists 116. The panelists 114 and 116 are users registered on panels maintained by a ratings entity (e.g., an audience measurement company) that owns and/or operates the ratings entity subsystem 106. In the example of FIG. 1, the TV and PC panelists 114 include users and/or homes that are monitored for exposures to the content and/or advertisements 102 on TVs and/or computers. The online only panelists 116 include users that are monitored for exposure (e.g., content exposure and/or advertisement exposure) via online sources when at work or home. In some example implementations, TV and/or PC panelists 114 may be home-centric users (e.g., home-makers, students, adolescents, children, etc.), while online only panelists 116 may be business-centric users that are commonly connected to work-provided Internet services via office computers or mobile devices (e.g., mobile phones, smartphones, laptops, tablet computers, etc.).

To collect exposure measurements (e.g., content impressions and/or advertisement impressions) generated by meters at client devices (e.g., computers, mobile phones, smartphones, laptops, tablet computers, TVs, etc.), the ratings entity subsystem 106 includes a ratings entity collector 117 and loader 118 to perform collection and loading processes. The ratings entity collector 117 and loader 118 collect and store the collected exposure measurements obtained via the panelists 114 and 116 in a ratings entity database 120. The ratings entity subsystem 106 then processes and filters the exposure measurements based on business rules 122 and organizes the processed exposure measurements into TV&PC summary tables 124, online home (H) summary tables 126, and online work (W) summary tables 128. In the illustrated example, the summary tables 124, 126, and 128 are sent to a GRP report generator 130, which generates one or more GRP report(s) 131 to sell or otherwise provide to advertisers, publishers, manufacturers, content providers, and/or any other entity interested in such market research.

In the illustrated example of FIG. 1, the ratings entity subsystem 106 is provided with an impression monitor system 132 that is configured to track exposure quantities (e.g., content impressions and/or advertisement impressions) corresponding to content and/or advertisements presented by client devices (e.g., computers, mobile phones, smartphones, laptops, tablet computers, etc.) whether received from remote web servers or retrieved from local caches of the client devices. In some example implementations, the impression monitor system 132 may be implemented using the SiteCensus system owned and operated by The Nielsen Company. In the illustrated example, identities of users associated with the exposure quantities are collected using cookies (e.g., Universally Unique Identifiers (UUIDs)) tracked by the impression monitor system 132 when client devices present content and/or advertisements. Due to Internet security protocols, the impression monitor system 132 can only collect cookies set in its domain. Thus, if, for example, the impression monitor system 132 operates in the "Nielsen.com" domain, it can only collect cookies set by a Nielsen.com server. Thus, when the impression monitor system 132 receives a beacon request from a given client, the impression monitor system 132 only has access to cookies set on that client by a server in, for example, the Nielsen.com domain. To overcome this limitation, the impression monitor system 132 of the illustrated example is structured to forward beacon requests to one or more database proprietors partnered with the audience measurement entity. Those one or more partners can recognize cookies set in their domain (e.g., Facebook.com) and therefore log impressions in association with the subscribers associated with the recognized cookies. This process is explained further below.

In the illustrated example, the ratings entity subsystem 106 includes a ratings entity cookie collector 134 to collect cookie information (e.g., user ID information) together with content IDs and/or ad IDs associated with the cookies from the impression monitor system 132 and send the collected information to the GRP report generator 130. Again, the cookies collected by the impression monitor system 132 are those set by server(s) operating in a domain of the audience measurement entity. In some examples, the ratings entity cookie collector 134 is configured to collect logged impressions (e.g., based on cookie information and ad or content IDs) from the impression monitor system 132 and provide the logged impressions to the GRP report generator 130.

Figure 2:
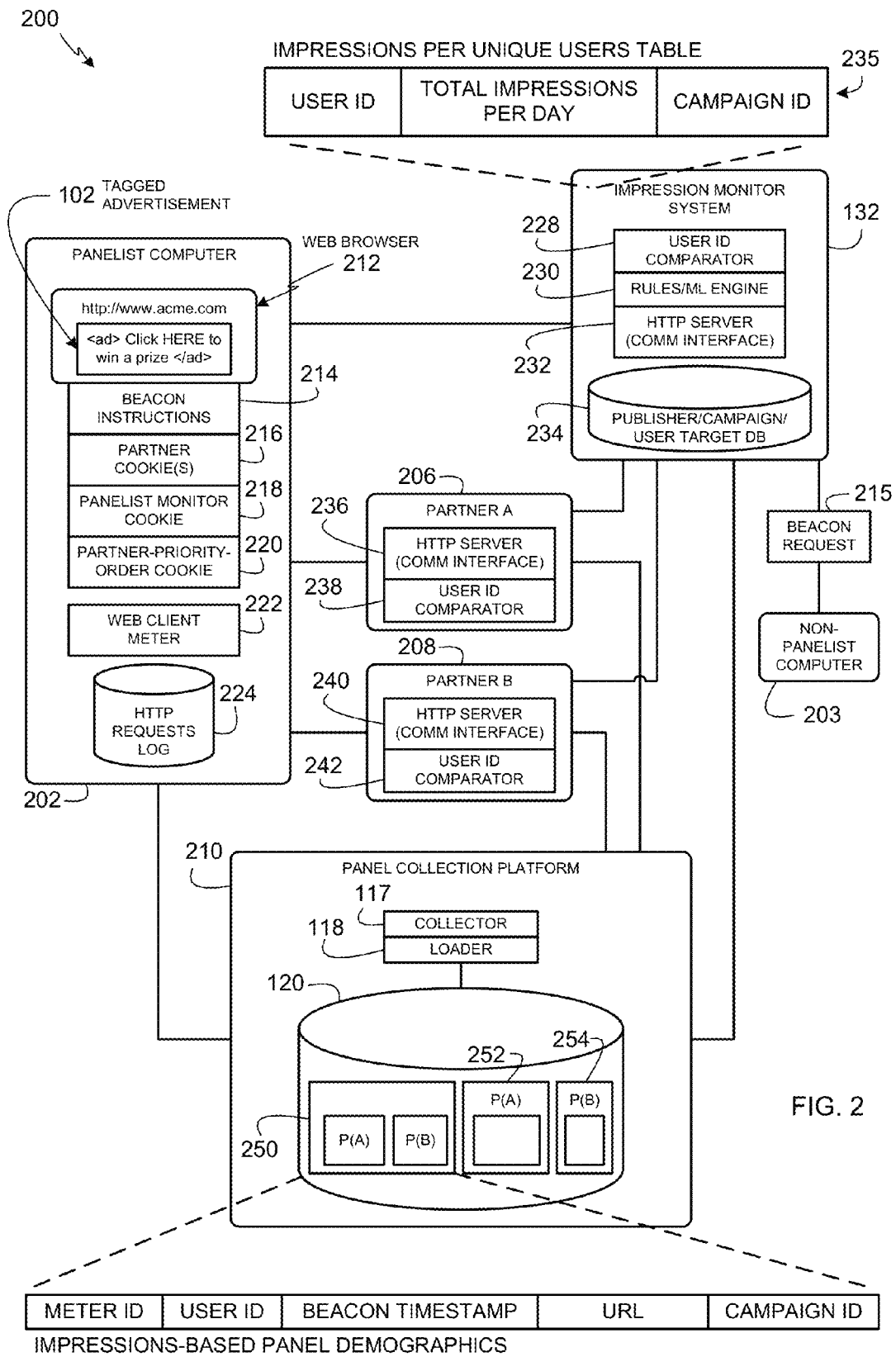
FIG. 2 depicts an example system that may be used to associate advertisement exposure measurements with user demographic information based on demographics information distributed across user account records of different web service providers.
Figure 3:
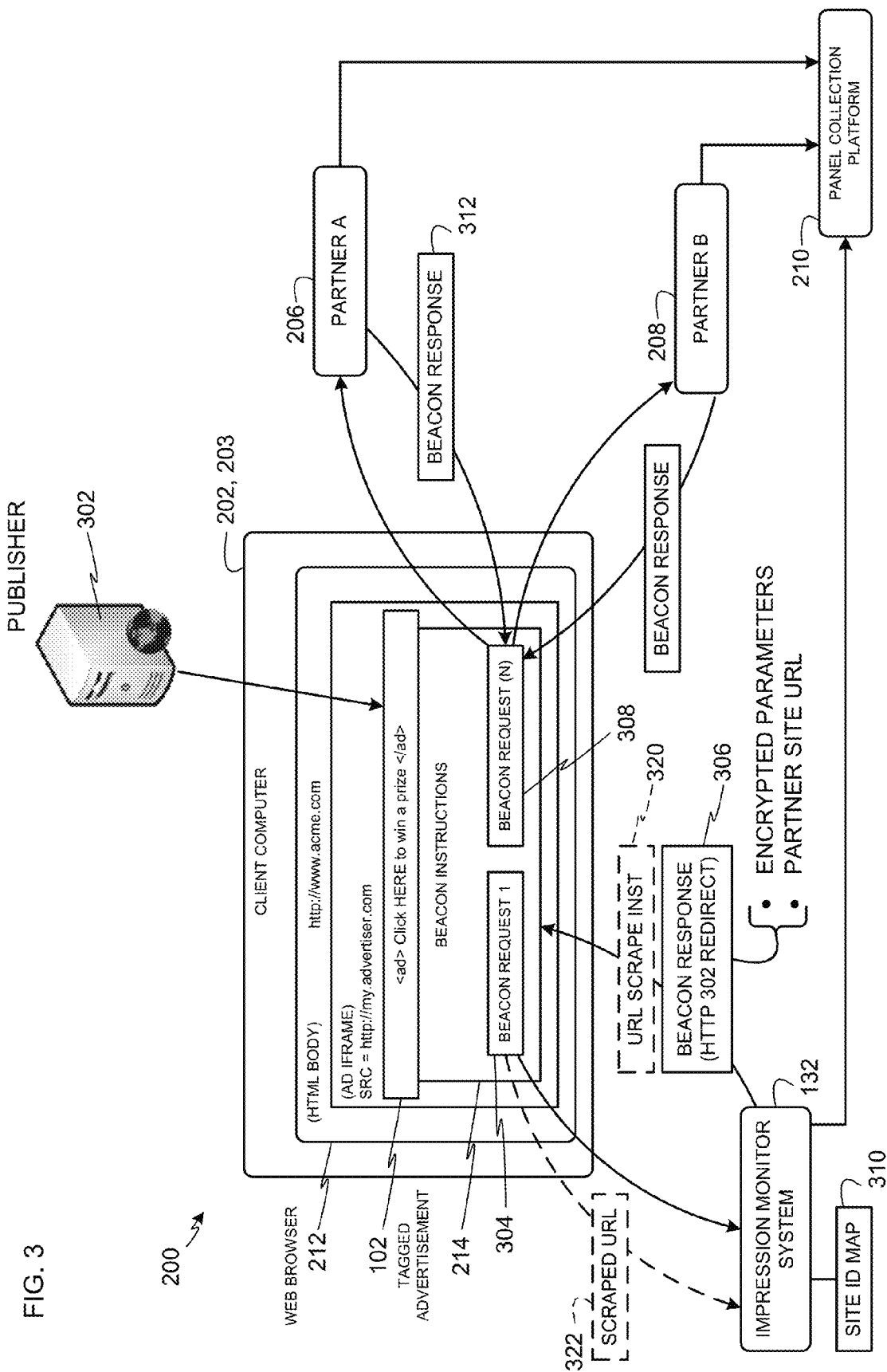
FIG. 3 is a communication flow diagram of an example manner in which a web browser can report impressions to servers having access to demographic information for a user of that web browser.

The operation of the impression monitor system 132 in connection with client devices and partner sites is described below in connection with FIGS. 2 and 3. In particular, FIGS. 2 and 3 depict how the impression monitor system 132 enables collecting user identities and tracking exposure quantities for content and/or advertisements exposed to those users. The collected data can be used to determine information about, for example, the effectiveness of advertisement campaigns.

For purposes of example, the following example involves a social network provider, such as Facebook, as the database proprietor. In the illustrated example, the database proprietor subsystem 108 includes servers 138 to store user registration information, perform web server processes to serve web pages (possibly, but not necessarily including one or more advertisements) to subscribers of the social network, to track user activity, and to track account characteristics. During account creation, the database proprietor subsystem 108 asks users to provide demographic information such as age, gender, geographic location, graduation year, quantity of group associations, and/or any other personal or demographic information. To automatically identify users on return visits to the webpage(s) of the social network entity, the servers 138 set cookies on client devices (e.g., computers and/or mobile devices of registered users, some of which may be panelists 114 and 116 of the audience measurement entity and/or may not be panelists of the audience measurement entity). The cookies may be used to identify users to track user visits to the webpages of the social network entity, to display those web pages according to the preferences of the users, etc. The cookies set by the database proprietor subsystem 108 may also be used to collect "domain specific" user activity. As used herein, "domain specific" user activity is user Internet activity occurring within the domain(s) of a single entity. Domain specific user activity may also be referred to as "intra-domain activity." The social network entity may collect intra-domain activity such as the number of web pages (e.g., web pages of the social network domain such as other social network member pages or other intra-domain pages) visited by each registered user and/or the types of devices such as mobile (e.g., smartphones) or stationary (e.g., desktop computers) devices used for such access. The servers 138 are also configured to track account characteristics such as the quantity of social connections (e.g., friends) maintained by each registered user, the quantity of pictures posted by each registered user, the quantity of messages sent or received by each registered user, and/or any other characteristic of user accounts.

The database proprietor subsystem 108 includes a database proprietor (DP) collector 139 and a DP loader 140 to collect user registration data (e.g., demographic data), intra-domain user activity data, inter-domain user activity data (as explained later) and account characteristics data. The collected information is stored in a database proprietor database 142. The database proprietor subsystem 108 processes the collected data using business rules 144 to create DP summary tables 146.

In the illustrated example, the other partnered database proprietor subsystems 110 may share with the audience measurement entity similar types of information as that shared by the database proprietor subsystem 108. In this manner, demographic information of people that are not registered users of the social network services provider may be obtained from one or more of the other partnered database proprietor subsystems 110 if they are registered users of those web service providers (e.g., Yahoo!, Google, Experian, etc.). Example methods, apparatus, and/or articles of manufacture disclosed herein advantageously use this cooperation or sharing of demographic information across website domains to increase the accuracy and/or completeness of demographic information available to the audience measurement entity. By using the shared demographic data in such a combined manner with information identifying the content and/or ads 102 to which users are exposed, example methods, apparatus, and/or articles of manufacture disclosed herein produce more accurate exposure-per-demographic results to enable a determination of meaningful and consistent GRPs for online advertisements.

As the system 100 expands, more partnered participants (e.g., like the partnered database proprietor subsystems 110)

may join to share further distributed demographic information and advertisement viewership information for generating GRPs.

To preserve user privacy, the example methods, apparatus, and/or articles of manufacture described herein use double encryption techniques by each participating partner or entity (e.g., the subsystems 106, 108, 110) so that user identities are not revealed when sharing demographic and/or viewership information between the participating partners or entities. In this manner, user privacy is not compromised by the sharing of the demographic information as the entity receiving the demographic information is unable to identify the individual associated with the received demographic information unless those individuals have already consented to allow access to their information by, for example, previously joining a panel or services of the receiving entity (e.g., the audience measurement entity). If the individual is already in the receiving party's database, the receiving party will be able to identify the individual despite the encryption. However, the individual has already agreed to be in the receiving party's database, so consent to allow access to their demographic and behavioral information has previously already been received.

FIG. 2 depicts an example system 200 that may be used to associate exposure measurements with user demographic information based on demographics information distributed across user account records of different database proprietors (e.g., web service providers). The example system 200 enables the ratings entity subsystem 106 of FIG. 1 to locate a best-fit partner (e.g., the database proprietor subsystem 108 of FIG. 1 and/or one of the other partnered database proprietor subsystems 110 of FIG. 1) for each beacon request (e.g., a request from a client executing a tag associated with tagged media such as an advertisement or content that contains data identifying the media to enable an entity to log an exposure or impression). In some examples, the example system 200 uses rules and machine learning classifiers (e.g., based on an evolving set of empirical data) to determine a relatively best-suited partner that is likely to have demographics information for a user that triggered a beacon request. The rules may be applied based on a publisher level, a campaign/publisher level, or a user level. In some examples, machine learning is not employed and instead, the partners are contacted in some ordered fashion (e.g., Facebook, Myspace, then Yahoo!, etc.) until the user associated with a beacon request is identified or all partners are exhausted without an identification.

The ratings entity subsystem 106 receives and compiles the impression data from all available partners. The ratings entity subsystem 106 may weight the impression data based on the overall reach and demographic quality of the partner sourcing the data. For example, the ratings entity subsystem 106 may refer to historical data on the accuracy of a partner's demographic data to assign a weight to the logged data provided by that partner.

For rules applied at a publisher level, a set of rules and classifiers are defined that allow the ratings entity subsystem 106 to target the most appropriate partner for a particular publisher (e.g., a publisher of one or more of the advertisements or content 102 of FIG. 1). For example, the ratings entity subsystem 106 could use the demographic composition of the publisher and partner web service providers to select the partner most likely to have an appropriate user base (e.g., registered users that are likely to access content for the corresponding publisher).

For rules applied at a campaign level, for instances in which a publisher has the ability to target an ad campaign based on user demographics, the target partner site could be defined at the publisher/campaign level. For example, if an ad campaign is targeted at males aged between the ages of 18 and 25, the ratings entity subsystem 106 could use this information to direct a request to the partner most likely to have the largest reach within that gender/age group (e.g., a database proprietor that maintains a sports website, etc.).

For rules applied at the user level (or cookie level), the ratings entity subsystem 106 can dynamically select a preferred partner to identify the client and log the impression based on, for example, (1) feedback received from partners (e.g., feedback indicating that panelist user IDs did not match registered users of the partner site or indicating that the partner site does not have a sufficient number of registered users), and/or (2) user behavior (e.g., user browsing behavior may indicate that certain users are unlikely to have registered accounts with particular partner sites). In the illustrated example of FIG. 2, rules may be used to specify when to override a user level preferred partner with a publisher (or publisher campaign) level partner target.

Turning in detail to FIG. 2, a panelist computer 202 represents a computer used by one or more of the panelists 114 and 116 of FIG. 1. As shown in the example of FIG. 2, the panelist computer 202 may exchange communications with the impression monitor system 132 of FIG. 1. In the illustrated example, a partner A 206 may be the database proprietor subsystem 108 of FIG. 1 and a partner B 208 may be one of the other partnered database proprietor subsystems 110 of FIG. 1. A panel collection platform 210 contains the ratings entity database 120 of FIG. 1 to collect ad and/or content exposure data (e.g., impression data or content impression data). Interim collection platforms are likely located at the partner A 206 and partner B 208 sites to store logged impressions, at least until the data is transferred to the audience measurement entity.

The panelist computer 202 of the illustrated example executes a web browser 212 that is directed to a host website (e.g., www.acme.com) that displays one of the advertisements and/or content 102. The advertisement and/or content 102 is tagged with identifier information (e.g., a campaign ID, a creative type ID, a placement ID, a publisher source URL, etc.) and beacon instructions 214. When the beacon instructions 214 are executed by the panelist computer 202, the beacon instructions cause the panelist computer to send a beacon request to a remote server specified in the beacon instructions 214. In the illustrated example, the specified server is a server of the audience measurement entity, namely, at the impression monitor system 132. The beacon instructions 214 may be implemented using javascript or any other types of instructions or script executable via a web browser including, for example, Java, HTML, etc. It should be noted that tagged webpages and/or advertisements are processed the same way by panelist and non-panelist computers. In both systems, the beacon instructions are received in connection with the download of the tagged content and cause a beacon request to be sent from the client that downloaded the tagged content for the audience measurement entity. A non-panelist computer is shown at reference number 203. Although the client 203 is not a panelist 114, 116, the impression monitor system 132 may interact with the client 203 in the same manner as the impression monitor system 132 interacts with the client computer 202, associated with one of the panelists 114, 116. As shown in FIG. 2, the non-panelist client 203 also sends a beacon request 215 based on tagged content downloaded and presented on the non-panelist client 203. As a result, in the following description, the panelist computer 202 and the non-panelist computer 203 are referred to generically as a "client" computer.

In the illustrated example, the web browser 212 stores one or more partner cookie(s) 216 and a panelist monitor cookie 218. Each partner cookie 216 corresponds to a respective partner (e.g., the partners A 206 and B 208) and can be used only by the respective partner to identify a user of the panelist computer 202. The panelist monitor cookie 218 is a cookie set by the impression monitor system 132 and identifies the user of the panelist computer 202 to the impression monitor system 132. Each of the partner cookies 216 is created, set, or otherwise initialized in the panelist computer 202 when a user of the computer first visits a website of a corresponding partner (e.g., one of the partners A 206 and B 208) and/or when a user of the computer registers with the partner (e.g., sets up a Facebook account). If the user has a registered account with the corresponding partner, the user ID (e.g., an email address or other value) of the user is mapped to the corresponding partner cookie 216 in the records of the corresponding partner. The panelist monitor cookie 218 is created when the client (e.g., a panelist computer or a non-panelist computer) registers for the panel and/or when the client processes a tagged advertisement. The panelist monitor cookie 218 of the panelist computer 202 may be set when the user registers as a panelist and is mapped to a user ID (e.g., an email address or other value) of the user in the records of the ratings entity. Although the non-panelist client computer 203 is not part of a panel, a panelist monitor cookie similar to the panelist monitor cookie 218 is created in the non-panelist client computer 203 when the non-panelist client computer 203 processes a tagged advertisement. In this manner, the impression monitor system 132 may collect impressions (e.g., ad impressions) associated with the non-panelist client computer 203 even though a user of the non-panelist client computer 203 is not registered in a panel and the ratings entity operating the impression monitor system 132 will not have demographics for the user of the non-panelist client computer 203.

In some examples, the web browser 212 may also include a partner-priority-order cookie 220 that is set, adjusted, and/or controlled by the impression monitor system 132 and includes a priority listing of the partners 206 and 208 (and/or other database proprietors) indicative of an order in which beacon requests should be sent to the partners 206, 208 and/or other database proprietors. For example, the impression monitor system 132 may specify that the client computer 202, 203 should first send a beacon request based on execution of the beacon instructions 214 to partner A 206 and then to partner B 208 if partner A 206 indicates that the user of the client computer 202, 203 is not a registered user of partner A 206. In this manner, the client computer 202, 203 can use the beacon instructions 214 in combination with the priority listing of the partner-priority-order cookie 220 to send an initial beacon request to an initial partner and/or other initial database proprietor and one or more redirected beacon requests to one or more secondary partners and/or other database proprietors until one of the partners 206 and 208 and/or other database proprietors confirms that the user of the panelist computer 202 is a registered user of the partner's or other database proprietor's services and is able to log an impression (e.g., an ad impression, a content impression, etc.) and provide demographic information for that user (e.g., demographic information stored in the database proprietor database 142 of FIG. 1), or until all partners have been tried without a successful match. In other examples, the partner-priority-order cookie 220 may be omitted and the beacon instructions 214 may be configured to cause the client computer 202, 203 to unconditionally send beacon requests to all available partners and/or other database proprietors so that all of the partners and/or other database proprietors have an opportunity to log an impression. In yet other examples, the beacon instructions 214 may be configured to cause the client computer 202, 203 to receive instructions from the impression monitor system 132 on an order in which to send redirected beacon requests to one or more partners and/or other database proprietors.

To monitor browsing behavior and track activity of the partner cookie(s) 216, the panelist computer 202 is provided with a web client meter 222. In addition, the panelist computer 202 is provided with an HTTP request log 224 in which the web client meter 222 may store or log HTTP requests in association with a meter ID of the web client meter 222, user IDs originating from the panelist computer 202, beacon request timestamps (e.g., timestamps indicating when the panelist computer 202 sent beacon requests such as the beacon requests 304 and 308 of FIG. 3), uniform resource locators (URLs) of websites that displayed advertisements, and ad campaign IDs. In the illustrated example, the web client meter 222 stores user IDs of the partner cookie(s) 216 and the panelist monitor cookie 218 in association with each logged HTTP request in the HTTP requests log 224. In some examples, the HTTP requests log 224 can additionally or alternatively store other types of requests such as file transfer protocol (FTP) requests and/or any other internet protocol requests. The web client meter 222 of the illustrated example can communicate such web browsing behavior or activity data in association with respective user IDs from the HTTP requests log 224 to the panel collection platform 210. In some examples, the web client meter 222 may also be advantageously used to log impressions for untagged content or advertisements. Unlike tagged advertisements and/or tagged content that include the beacon instructions 214 causing a beacon request to be sent to the impression monitor system 132 (and/or one or more of the partners 206, 208 and/or other database proprietors) identifying the exposure or impression to the tagged content to be sent to the audience measurement entity for logging, untagged advertisements and/or advertisements do not have such beacon instructions 214 to create an opportunity for the impression monitor system 132 to log an impression. In such instances, HTTP requests logged by the web client meter 222 can be used to identify any untagged content or advertisements that were rendered by the web browser 212 on the panelist computer 202.

In the illustrated example, the impression monitor system 132 is provided with a user ID comparator 228, a rules/machine learning (ML) engine 230, an HTTP server 232, and a publisher/campaign/user target database 234. The user ID comparator 228 of the illustrated example is provided to identify beacon requests from users that are panelists 114, 116. In the illustrated example, the HTTP server 232 is a communication interface via which the impression monitor system 132 exchanges information (e.g., beacon requests, beacon responses, acknowledgements, failure status messages, etc.) with the client computer 202, 203. The rules/ML engine 230 and the publisher/campaign/user target database 234 of the illustrated example enable the impression monitor system 132 to target the 'best fit' partner (e.g., one of the partners 206 or 208) for each impression request (or beacon request) received from the client computer 202, 203. The 'best fit' partner is the partner most likely to have demographic data for the user(s) of the client computer 202, 203 sending the impression request. The rules/ML engine 230 is a set of rules and machine learning classifiers generated based on evolving empirical data stored in the publisher/campaign/user target database 234. In the illustrated example, rules can be applied at the publisher level, publisher/campaign level, or user level. In addition, partners may be weighted based on their overall reach and demographic quality.

To target partners (e.g., the partners 206 and 208) at the publisher level of ad campaigns, the rules/ML engine 230 contains rules and classifiers that allow the impression monitor system 132 to target the 'best fit' partner for a particular publisher of ad campaign(s). For example, the impression monitoring system 132 could use an indication of target demographic composition(s) of publisher(s) and partner(s) (e.g., as stored in the publisher/campaign/user target database 234) to select a partner (e.g., one of the partners 206, 208) that is most likely to have demographic information for a user of the client computer 202, 203 requesting the impression.

To target partners (e.g., the partners 206 and 208) at the campaign level (e.g., a publisher has the ability to target ad campaigns based on user demographics), the rules/ML engine 230 of the illustrated example are used to specify target partners at the publisher/campaign level. For example, if the publisher/campaign/user target database 234 stores information indicating that a particular ad campaign is targeted at males aged 18 to 25, the rules/ML engine 230 uses this information to indicate a beacon request redirect to a partner most likely to have the largest reach within this gender/age group.

To target partners (e.g., the partners 206 and 208) at the cookie level, the impression monitor system 132 updates target partner sites based on feedback received from the partners. Such feedback could indicate user IDs that did not correspond or that did correspond to registered users of the partner(s). In some examples, the impression monitor system 132 could also update target partner sites based on user behavior. For example, such user behavior could be derived from analyzing cookie clickstream data corresponding to browsing activities associated with panelist monitor cookies (e.g., the panelist monitor cookie 218). In the illustrated example, the impression monitor system 132 uses such cookie clickstream data to determine age/gender bias for particular partners by determining ages and genders of which the browsing behavior is more indicative. In this manner, the impression monitor system 132 of the illustrated example can update a target or preferred partner for a particular user or client computer 202, 203. In some examples, the rules/ML engine 230 specify when to override user-level preferred target partners with publisher or publisher/campaign level preferred target partners. For example such a rule may specify an override of user-level preferred target partners when the user-level preferred target partner sends a number of indications that it does not have a registered user corresponding to the client computer 202, 203 (e.g., a different user on the client computer 202, 203 begins using a different browser having a different user ID in its partner cookie 216).

In the illustrated example, the impression monitor system 132 logs impressions (e.g., ad impressions, content impressions, etc.) in an impressions per unique users table 235 based on beacon requests (e.g., the beacon request 304 of FIG. 3) received from client computers (e.g., the client computer 202, 203). In the illustrated example, the impressions per unique users table 235 stores unique user IDs obtained from cookies (e.g., the panelist monitor cookie 218) in association with total impressions per day and campaign IDs. In this manner, for each campaign ID, the impression monitor system 132 logs the total impressions per day that are attributable to a particular user or client computer 202, 203.

Each of the partners 206 and 208 of the illustrated example employs an HTTP server 236 and 240 and a user ID comparator 238 and 242. In the illustrated example, the HTTP servers 236 and 240 are communication interfaces via which their respective partners 206 and 208 exchange information (e.g., beacon requests, beacon responses, acknowledgements, failure status messages, etc.) with the client computer 202, 203. The user ID comparators 238 and 242 are configured to compare user cookies received from a client 202, 203 against the cookie in their records to identify the client 202, 203, if possible. In this manner, the user ID comparators 238 and 242 can be used to determine whether users of the panelist computer 202 have registered accounts with the partners 206 and 208. If so, the partners 206 and 208 can log impressions attributed to those users and associate those impressions with the demographics of the identified user (e.g., demographics stored in the database proprietor database 142 of FIG. 1).

In the illustrated example, the panel collection platform 210 is used to identify registered users of the partners 206, 208 that are also panelists 114, 116. The panel collection platform 210 can then use this information to cross-reference demographic information stored by the ratings entity subsystem 106 for the panelists 114, 116 with demographic information stored by the partners 206 and 208 for their registered users. The ratings entity subsystem 106 can use such cross-referencing to determine the accuracy of the demographic information collected by the partners 206 and 208 based on the demographic information of the panelists 114 and 116 collected by the ratings entity subsystem 106.

In some examples, the example collector 117 of the panel collection platform 210 collects web-browsing activity information from the panelist computer 202. In such examples, the example collector 117 requests logged data from the HTTP requests log 224 of the panelist computer 202 and logged data collected by other panelist computers (not shown). In addition, the collector 117 collects panelist user IDs from the impression monitor system 132 that the impression monitor system 132 tracks as having set in panelist computers. Also, the collector 117 collects partner user IDs from one or more partners (e.g., the partners 206 and 208) that the partners track as having been set in panelist and non-panelist computers. In some examples, to abide by privacy agreements of the partners 206, 208, the collector 117 and/or the database proprietors 206, 208 can use a hashing technique (e.g., a double-hashing technique) to hash the database proprietor cookie IDs.

In some examples, the loader 118 of the panel collection platform 210 analyzes and sorts the received panelist user IDs and the partner user IDs. In the illustrated example, the loader 118 analyzes received logged data from panelist computers (e.g., from the HTTP requests log 224 of the panelist computer 202) to identify panelist user IDs (e.g., the panelist monitor cookie 218) associated with partner user IDs (e.g., the partner cookie(s) 216). In this manner, the loader 118 can identify which panelists (e.g., ones of the panelists 114 and 116) are also registered users of one or more of the partners 206 and 208 (e.g., the database proprietor subsystem 108 of FIG. 1 having demographic information of registered users stored in the database proprietor database 142). In some examples, the panel collection platform 210 operates to verify the accuracy of impressions collected by the impression monitor system 132. In such some examples, the loader 118 filters the logged HTTP beacon requests from the HTTP requests log 224 that correlate with impressions of panelists logged by the impression monitor system 132 and identifies HTTP beacon requests logged at the HTTP requests log 224 that do not have corresponding impressions logged by the impression monitor system 132. In this manner, the panel collection platform 210 can provide indications of inaccurate impression logging by the impression monitor system 132 and/or provide impressions logged by the web client meter 222 to fill-in impression data for panelists 114, 116 missed by the impression monitor system 132.

In the illustrated example, the loader 118 stores overlapping users in an impressions-based panel demographics table 250. In the illustrated example, overlapping users are users that are panelist members 114, 116 and registered users of partner A 206 (noted as users P(A)) and/or registered users of partner B 208 (noted as users P(B)). (Although only two partners (A and B) are shown, this is for simplicity of illustration, any number of partners may be represented in the table 250. The impressions-based panel demographics table 250 of the illustrated example is shown storing meter IDs (e.g., of the web client meter 222 and web client meters of other computers), user IDs (e.g., an alphanumeric identifier such as a user name, email address, etc. corresponding to the panelist monitor cookie 218 and panelist monitor cookies of other panelist computers), beacon request timestamps (e.g., timestamps indicating when the panelist computer 202 and/or other panelist computers sent beacon requests such as the beacon requests 304 and 308 of FIG. 3), uniform resource locators (URLs) of websites visited (e.g., websites that displayed advertisements), and ad campaign IDs. In addition, the loader 118 of the illustrated example stores partner user IDs that do not overlap with panelist user IDs in a partner A (P(A)) cookie table 252 and a partner B (P(B)) cookie table 254.

Example processes performed by the example system 200 are described below in connection with the communications flow diagram of FIG. 3 and the flow diagrams of FIGS. 10, 11, and 12.

In the illustrated example of FIGS. 1 and 2, the ratings entity subsystem 106 includes the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120. In the illustrated example of FIGS. 1 and 2, the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120 may be implemented as a single apparatus or a two or more different apparatus. While an example manner of implementing the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120 has been illustrated in FIGS. 1 and 2, one or more of the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120 may be combined, divided, re-arranged, omitted, eliminated and/or implemented in any other way. Further, the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120 and/or, more generally, the example apparatus of the example ratings entity subsystem 106 may be implemented by hardware, software, firmware and/or any combination of hardware, software and/or firmware. Thus, for example, any of the impression monitor system 132, the rules/ML engine 230, the HTTP server communication interface 232, the publisher/campaign/user target database 232, the GRP report generator 130, the panel collection platform 210, the collector 117, the loader 118, and the ratings entity database 120 and/or, more generally, the example apparatus of the ratings entity subsystem 106 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the impression monitor system 132, the rules/ML engine 230, the HTTP server communication interface 232, the publisher/campaign/user target database 232, the GRP report generator 130, the panel collection platform 210, the collector 117, the loader 118, and/or the ratings entity database 120 appearing in such claim is hereby expressly defined to include a computer readable medium such as a memory, DVD, CD, etc. storing the software and/or firmware. Further still, the example apparatus of the ratings entity subsystem 106 may include one or more elements, processes and/or devices in addition to, or instead of, those illustrated in FIGS. 1 and 2, and/or may include more than one of any or all of the illustrated elements, processes and devices.

Turning to FIG. 3, an example communication flow diagram shows an example manner in which the example system 200 of FIG. 2 logs impressions by clients (e.g., clients 202, 203). The example chain of events shown in FIG. 3 occurs when a client 202, 203 accesses a tagged advertisement or tagged content. Thus, the events of FIG. 3 begin when a client sends an HTTP request to a server for content and/or an advertisement, which, in this example, is tagged to forward an exposure request to the ratings entity. In the illustrated example of FIG. 3, the web browser of the client 202, 203 receives the requested content or advertisement (e.g., the content or advertisement 102) from a publisher (e.g., ad publisher 302). It is to be understood that the client 202, 203 often requests a webpage containing content of interest (e.g., www-.weather.com) and the requested webpage contains links to ads that are downloaded and rendered within the webpage. The ads may come from different servers than the originally requested content. Thus, the requested content may contain instructions that cause the client 202, 203 to request the ads (e.g., from the ad publisher 302) as part of the process of rendering the webpage originally requested by the client. The webpage, the ad or both may be tagged. In the illustrated example, the uniform resource locator (URL) of the ad publisher is illustratively named http://my.advertiser.com.

For purposes of the following illustration, it is assumed that the advertisement 102 is tagged with the beacon instructions 214 (FIG. 2). Initially, the beacon instructions 214 cause the web browser of the client 202 or 203 to send a beacon request 304 to the impression monitor system 132 when the tagged ad is accessed. In the illustrated example, the web browser sends the beacon request 304 using an HTTP request addressed to the URL of the impression monitor system 132 at, for example, a first internet domain. The beacon request 304 includes one or more of a campaign ID, a creative type ID, and/or a placement ID associated with the advertisement 102. In addition, the beacon request 304 includes a document referrer (e.g., www.acme.com), a timestamp of the impression, and a publisher site ID (e.g., the URL http://my.advertiser.com of the ad publisher 302). In addition, if the web browser of the client 202 or 203 contains the panelist monitor cookie 218, the beacon request 304 will include the panelist monitor cookie 218. In other example implementations, the cookie 218 may not be passed until the client 202 or 203 receives a request sent by a server of the impression monitor system 132 in response to, for example, the impression monitor system 132 receiving the beacon request 304.

In response to receiving the beacon request 304, the impression monitor system 132 logs an impression by recording the ad identification information (and any other relevant identification information) contained in the beacon request 304. In the illustrated example, the impression monitor system 132 logs the impression regardless of whether the beacon request 304 indicated a user ID (e.g., based on the panelist monitor cookie 218) that matched a user ID of a panelist member (e.g., one of the panelists 114 and 116 of FIG. 1). However, if the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor system 132. If the user ID does not correspond to a panelist of the impression monitor system 132, the impression monitor system 132 will still benefit from logging an impression even though it will not have a user ID record (and, thus, corresponding demographics) for the impression reflected in the beacon request 304.

In the illustrated example of FIG. 3, to compare or supplement panelist demographics (e.g., for accuracy or completeness) of the impression monitor system 132 with demographics at partner sites and/or to enable a partner site to attempt to identify the client and/or log the impression, the impression monitor system 132 returns a beacon response message 306 (e.g., a first beacon response) to the web browser of the client 202, 203 including an HTTP 302 redirect message and a URL of a participating partner at, for example, a second internet domain. In the illustrated example, the HTTP 302 redirect message instructs the web browser of the client 202, 203 to send a second beacon request 308 to the particular partner (e.g., one of the partners A 206 or B 208). In other examples, instead of using an HTTP 302 redirect message, redirects may instead be implemented using, for example, an iframe source instructions (e.g., <iframe src=" ">) or any other instruction that can instruct a web browser to send a subsequent beacon request (e.g., the second beacon request 308) to a partner. In the illustrated example, the impression monitor system 132 determines the partner specified in the beacon response 306 using its rules/ML engine 230 (FIG. 2) based on, for example, empirical data indicative of which partner should be preferred as being most likely to have demographic data for the user ID. In other examples, the same partner is always identified in the first redirect message and that partner always redirects the client 202, 203 to the same second partner when the first partner does not log the impression. In other words, a set hierarchy of partners is defined and followed such that the partners are "daisy chained" together in the same predetermined order rather than them trying to guess a most likely database proprietor to identify an unknown client 203.

Prior to sending the beacon response 306 to the web browser of the client 202, 203, the impression monitor system 132 of the illustrated example replaces a site ID (e.g., a URL) of the ad publisher 302 with a modified site ID (e.g., a substitute site ID) which is discernable only by the impression monitor system 132 as corresponding to the ad publisher 302. In some example implementations, the impression monitor system 132 may also replace the host website ID (e.g., www.acme.com) with another modified site ID (e.g., a substitute site ID) which is discernable only by the impression monitor system 132 as corresponding to the host website. In this way, the source(s) of the ad and/or the host content are masked from the partners. In the illustrated example, the impression monitor system 132 maintains a publisher ID mapping table 310 that maps original site IDs of ad publishers with modified (or substitute) site IDs created by the impression monitor system 132 to obfuscate or hide ad publisher identifiers from partner sites. In some examples, the impression monitor system 132 also stores the host website ID in association with a modified host website ID in a mapping table. In addition, the impression monitor system 132 encrypts all of the information received in the beacon request 304 and the modified site ID to prevent any intercepting parties from decoding the information. The impression monitor system 132 of the illustrated example sends the encrypted information in the beacon response 306 to the web browser 212. In the illustrated example, the impression monitor system 132 uses an encryption that can be decrypted by the selected partner site specified in the HTTP 302 redirect.

In some examples, the impression monitor system 132 also sends a URL scrape instruction 320 to the client computer 202, 302. In such examples, the URL scrape instruction 320 causes the client computer 202, 203 to "scrape" the URL of the webpage or website associated with the tagged advertisement 102. For example, the client computer 202, 203 may perform scraping of web page URLs by reading text rendered or displayed at a URL address bar of the web browser 212. The client computer 202, 203 then sends a scraped URL 322 to the impression monitor system 322. In the illustrated example, the scraped URL 322 indicates the host website (e.g., http://www.acme.com) that was visited by a user of the client computer 202, 203 and in which the tagged advertisement 102 was displayed. In the illustrated example, the tagged advertisement 102 is displayed via an ad iFrame having a URL 'my.advertiser.com;' which corresponds to an ad network (e.g., the publisher 302) that serves the tagged advertisement 102 on one or more host websites. However, in the illustrated example, the host website indicated in the scraped URL 322 is 'www.acme.com;' which corresponds to a website visited by a user of the client computer 202, 203.

URL scraping is particularly useful under circumstances in which the publisher is an ad network from which an advertiser bought advertisement space/time. In such instances, the ad network dynamically selects from subsets of host websites (e.g., www.caranddriver.com, www.espn.com, www.allrecipes.com, etc.) visited by users on which to display ads via ad iFrames. However, the ad network cannot foretell definitively the host websites on which the ad will be displayed at any particular time. In addition, the URL of an ad iFrame in which the tagged advertisement 102 is being rendered may not be useful to identify the topic of a host website (e.g., www.acme.com in the example of FIG. 3) rendered by the web browser 212. As such, the impression monitor system 132 may not know the host website in which the ad iFrame is displaying the tagged advertisement 102.

The URLs of host websites (e.g., www.caranddriver.com, www.espn.com, www.allrecipes.com, etc.) can be useful to determine topical interests (e.g., automobiles, sports, cooking, etc.) of user(s) of the client computer 202, 203. In some examples, audience measurement entities can use host website URLs to correlate with user/panelist demographics and interpolate logged impressions to larger populations based on demographics and topical interests of the larger populations and based on the demographics and topical interests of users/panelists for which impressions were logged. Thus, in the illustrated example, when the impression monitor system 132 does not receive a host website URL or cannot otherwise identify a host website URL based on the beacon request 304, the impression monitor system 132 sends the URL scrape instruction 320 to the client computer 202, 203 to receive the scraped URL 322. In the illustrated example, if the impression monitor system 132 can identify a host website URL based on the beacon request 304, the impression monitor system 132 does not send the URL scrape instruction 320 to the client computer 202, 203, thereby, conserving network and computer bandwidth and resources.

In response to receiving the beacon response 306, the web browser of the client 202, 203 sends the beacon request 308 to the specified partner site, which is the partner A 206 (e.g., a second internet domain) in the illustrated example. The beacon request 308 includes the encrypted parameters from the beacon response 306. The partner A 206 (e.g., Facebook) decrypts the encrypted parameters and determines whether the client matches a registered user of services offered by the partner A 206. This determination involves requesting the client 202, 203 to pass any cookie (e.g., one of the partner cookies 216 of FIG. 2) it stores that had been set by partner A 206 and attempting to match the received cookie against the cookies stored in the records of partner A 206. If a match is found, partner A 206 has positively identified a client 202, 203. Accordingly, the partner A 206 site logs an impression in association with the demographics information of the identified client. This log (which includes the undetectable source identifier) is subsequently provided to the ratings entity for processing into GRPs as discussed below. In the event partner A 206 is unable to identify the client 202, 203 in its records (e.g., no matching cookie), the partner A 206 does not log an impression.

In some example implementations, if the user ID does not match a registered user of the partner A 206, the partner A 206 may return a beacon response 312 (e.g., a second beacon response) including a failure or non-match status or may not respond at all, thereby terminating the process of FIG. 3. However, in the illustrated example, if partner A 206 cannot identify the client 202, 203, partner A 206 returns a second HTTP 302 redirect message in the beacon response 312 (e.g., the second beacon response) to the client 202, 203. For example, if the partner A site 206 has logic (e.g., similar to the rules/ml engine 230 of FIG. 2) to specify another partner (e.g., partner B 208 or any other partner) which may likely have demographics for the user ID, then the beacon response 312 may include an HTTP 302 redirect (or any other suitable instruction to cause a redirected communication) along with the URL of the other partner (e.g., at a third internet domain). Alternatively, in the daisy chain approach discussed above, the partner A site 206 may always redirect to the same next partner or database proprietor (e.g., partner B 208 at, for example, a third internet domain or a non-partnered database proprietor subsystem 110 of FIG. 1 at a third internet domain) whenever it cannot identify the client 202, 203. When redirecting, the partner A site 206 of the illustrated example encrypts the ID, timestamp, referrer, etc. parameters using an encryption that can be decoded by the next specified partner.

As a further alternative, if the partner A site 206 does not have logic to select a next best suited partner likely to have demographics for the user ID and is not effectively daisy chained to a next partner by storing instructions that redirect to a partner entity, the beacon response 312 can redirect the client 202, 203 to the impression monitor system 132 with a failure or non-match status. In this manner, the impression monitor system 132 can use its rules/ML engine 230 to select a next-best suited partner to which the web browser of the client 202, 203 should send a beacon request (or, if no such logic is provided, simply select the next partner in a hierarchical (e.g., fixed) list). In the illustrated example, the impression monitor system 132 selects the partner B site 208, and the web browser of the client 202, 203 sends a beacon request to the partner B site 208 with parameters encrypted in a manner that can be decrypted by the partner B site 208. The partner B site 208 then attempts to identify the client 202, 203 based on its own internal database. If a cookie obtained from the client 202, 203 matches a cookie in the records of partner B 208, partner B 208 has positively identified the client 202, 203 and logs the impression in association with the demographics of the client 202, 203 for later provision to the impression monitor system 132. In the event that partner B 208 cannot identify the client 202, 203, the same process of failure notification or further HTTP 302 redirects may be used by the partner B 208 to provide a next other partner site an opportunity to identify the client and so on in a similar manner until a partner site identifies the client 202, 203 and logs the impression, until all partner sites have been exhausted without the client being identified, or until a predetermined number of partner sites failed to identify the client 202, 203.

Using the process illustrated in FIG. 3, impressions (e.g., ad impressions, content impressions, etc.) can be mapped to corresponding demographics even when the impressions are not triggered by panel members associated with the audience measurement entity (e.g., ratings entity subsystem 106 of FIG. 1). That is, during an impression collection or merging process, the panel collection platform 210 of the ratings entity can collect distributed impressions logged by (1) the impression monitor system 132 and (2) any participating partners (e.g., partners 206, 208). As a result, the collected data covers a larger population with richer demographics information than has heretofore been possible. Consequently, generating accurate, consistent, and meaningful online GRPs is possible by pooling the resources of the distributed databases as described above. The example structures of FIGS. 2 and 3 generate online GRPs based on a large number of combined demographic databases distributed among unrelated parties (e.g., Nielsen and Facebook). The end result appears as if users attributable to the logged impressions were part of a large virtual panel formed of registered users of the audience measurement entity because the selection of the participating partner sites can be tracked as if they were members of the audience measurement entities panels 114, 116. This is accomplished without violating the cookie privacy protocols of the Internet.

Periodically or aperiodically, the impression data collected by the partners (e.g., partners 206, 208) is provided to the ratings entity via a panel collection platform 210. As discussed above, some user IDs may not match panel members of the impression monitor system 132, but may match registered users of one or more partner sites. During a data collecting and merging process to combine demographic and impression data from the ratings entity subsystem 106 and the partner subsystem(s) 108 and 110 of FIG. 1, user IDs of some impressions logged by one or more partners may match user IDs of impressions logged by the impression monitor system 132, while others (most likely many others) will not match. In some example implementations, the ratings entity subsystem 106 may use the demographics-based impressions from matching user ID logs provided by partner sites to assess and/or improve the accuracy of its own demographic data, if necessary. For the demographics-based impressions associated with non-matching user ID logs, the ratings entity subsystem 106 may use the impressions (e.g., advertisement impressions, content impressions, etc.) to derive demographics-based online GRPs even though such impressions are not associated with panelists of the ratings entity subsystem 106.

As briefly mentioned above, example methods, apparatus, and/or articles of manufacture disclosed herein may be configured to preserve user privacy when sharing demographic information (e.g., account records or registration information) between different entities (e.g., between the ratings entity subsystem 106 and the database proprietor subsystem 108). In some example implementations, a double encryption technique may be used based on respective secret keys for each participating partner or entity (e.g., the subsystems 106, 108, 110). For example, the ratings entity subsystem 106 can encrypt its user IDs (e.g., email addresses) using its secret key and the database proprietor subsystem 108 can encrypt its user IDs using its secret key. For each user ID, the respective demographics information is then associated with the encrypted version of the user ID. Each entity then exchanges their demographics lists with encrypted user IDs. Because neither entity knows the other's secret key, they cannot decode the user IDs, and thus, the user IDs remain private. Each entity then proceeds to perform a second encryption of each encrypted user ID using their respective keys. Each twice-encrypted (or double encrypted) user ID (UID) will be in the form of E1(E2(UID)) and E2(E1(UID)), where E1 represents the encryption using the secret key of the ratings entity subsystem 106 and E2 represents the encryption using the secret key of the database proprietor subsystem 108. Under the rule of commutative encryption, the encrypted user IDs can be compared on the basis that E1(E2(UID))=E2(E1(UID)). Thus, the encryption of user IDs present in both databases will match after the double encryption is completed. In this manner, matches between user records of the panelists and user records of the database proprietor (e.g., identifiers of registered social network users) can be compared without the partner entities needing to reveal user IDs to one another.

The ratings entity subsystem 106 performs a daily impressions and UUID (cookies) totalization based on impressions and cookie data collected by the impression monitor system 132 of FIG. 1 and the impressions logged by the partner sites. In the illustrated example, the ratings entity subsystem 106 may perform the daily impressions and UUID (cookies) totalization based on cookie information collected by the ratings entity cookie collector 134 of FIG. 1 and the logs provided to the panel collection platform 210 by the partner sites. FIG. 4 depicts an example ratings entity impressions table 400 showing quantities of impressions to monitored users. Similar tables could be compiled for one or more of advertisement impressions, content impressions, or other impressions. In the illustrated example, the ratings entity impressions table 400 is generated by the ratings entity subsystem 106 for an advertisement campaign (e.g., one or more of the advertisements 102 of FIG. 1) to determine frequencies of impressions per day for each user.

To track frequencies of impressions per unique user per day, the ratings entity impressions table 400 is provided with a frequency column 402. A frequency of 1 indicates one exposure per day of an ad in an ad campaign to a unique user, while a frequency of 4 indicates four exposures per day of one or more ads in the same ad campaign to a unique user. To track the quantity of unique users to which impressions are attributable, the ratings impressions table 400 is provided with a UUIDs column 404. A value of 100,000 in the UUIDs column 404 is indicative of 100,000 unique users. Thus, the first entry of the ratings entity impressions table 400 indicates that 100,000 unique users (i.e., UUIDs=100,000) were exposed once (i.e., frequency=1) in a single day to a particular one of the advertisements 102.

To track impressions based on exposure frequency and UUIDs, the ratings entity impressions table 400 is provided with an impressions column 406. Each impression count stored in the impressions column 406 is determined by multiplying a corresponding frequency value stored in the frequency column 402 with a corresponding UUID value stored in the UUID column 404. For example, in the second entry of the ratings entity impressions table 400, the frequency value of two is multiplied by 200,000 unique users to determine that 400,000 impressions are attributable to a particular one of the advertisements 102.

Turning to FIG. 5, in the illustrated example, each of the partnered database proprietor subsystems 108, 110 of the partners 206, 208 generates and reports a database proprietor ad campaign-level age/gender and impression composition table 500 to the GRP report generator 130 of the ratings entity subsystem 106 on a daily basis. Similar tables can be generated for content and/or other media. Additionally or alternatively, media in addition to advertisements may be added to the table 500. In the illustrated example, the partners 206, 208 tabulate the impression distribution by age and gender composition as shown in FIG. 5. For example, referring to FIG. 1, the database proprietor database 142 of the partnered database proprietor subsystem 108 stores logged impressions and corresponding demographic information of registered users of the partner A 206, and the database proprietor subsystem 108 of the illustrated example processes the impressions and corresponding demographic information using the rules 144 to generate the DP summary tables 146 including the database proprietor ad campaign-level age/gender and impression composition table 500.

The age/gender and impression composition table 500 is provided with an age/gender column 502, an impressions column 504, a frequency column 506, and an impression composition column 508. The age/gender column 502 of the illustrated example indicates the different age/gender demographic groups. The impressions column 504 of the illustrated example stores values indicative of the total impressions for a particular one of the advertisements 102 (FIG. 1) for corresponding age/gender demographic groups. The frequency column 506 of the illustrated example stores values indicative of the frequency of exposure per user for the one of the advertisements 102 that contributed to the impressions in the impressions column 504. The impressions composition column 508 of the illustrated example stores the percentage of impressions for each of the age/gender demographic groups.

In some examples, the database proprietor subsystems 108, 110 may perform demographic accuracy analyses and adjustment processes on its demographic information before tabulating final results of impression-based demographic information in the database proprietor campaign-level age/gender and impression composition table. This can be done to address a problem facing online audience measurement processes in that the manner in which registered users represent themselves to online data proprietors (e.g., the partners 206 and 208) is not necessarily veridical (e.g., truthful and/or accurate). In some instances, example approaches to online measurement that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services. The self-reporting registration processes used to collect the demographic information at the database proprietor sites (e.g., social media sites) does not facilitate determining the veracity of the self-reported demographic information. To analyze and adjust inaccurate demographic information, the ratings entity subsystem 106 and the database proprietor subsystems 108, 110 may use example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

Turning to FIG. 6, in the illustrated example, the ratings entity subsystem 106 generates a panelist ad campaign-level age/gender and impression composition table 600 on a daily basis. Similar tables can be generated for content and/or other media. Additionally or alternatively, media in addition to advertisements may be added to the table 600. The example ratings entity subsystem 106 tabulates the impression distribution by age and gender composition as shown in FIG. 6 in the same manner as described above in connection with FIG. 5. As shown in FIG. 6, the panelist ad campaign-level age/gender and impression composition table 600 also includes an age/gender column 602, an impressions column 604, a frequency column 606, and an impression composition column 608. In the illustrated example of FIG. 6, the impressions are calculated based on the PC and TV panelists 114 and online panelists 116.

After creating the campaign-level age/gender and impression composition tables 500 and 600 of FIGS. 5 and 6, the ratings entity subsystem 106 creates a combined campaign-level age/gender and impression composition table 700 shown in FIG. 7. In particular, the ratings entity subsystem 106 combines the impression composition percentages from the impression composition columns 508 and 608 of FIGS. 5 and 6 to compare the age/gender impression distribution differences between the ratings entity panelists and the social network users.

As shown in FIG. 7, the combined campaign-level age/gender and impression composition table 700 includes an error weighted column 702, which stores mean squared errors (MSEs) indicative of differences between the impression compositions of the ratings entity panelists and the users of the database proprietor (e.g., social network users). Weighted MSEs can be determined using Equation 1 below.

$$\text{Weighted MSE} = (\alpha * IC_{(RE)} + (1-\alpha) IC_{(DP)}) \quad \text{Equation 1}$$

In Equation 1 above, a weighting variable ($\alpha$) represents the ratio of MSE(SN)/MSE(RE) or some other function that weights the compositions inversely proportional to their MSE. As shown in Equation 1, the weighting variable ($\alpha$) is multiplied by the impression composition of the ratings entity ($IC_{(RE)}$) to generate a ratings entity weighted impression composition ($\alpha * IC_{(RE)}$). The impression composition of the database proprietor (e.g., a social network) ($IC_{(DP)}$) is then multiplied by a difference between one and the weighting variable ($\alpha$) to determine a database proprietor weighted impression composition (($1-\alpha$) $IC_{(DP)}$).

In the illustrated example, the ratings entity subsystem 106 can smooth or correct the differences between the impression compositions by weighting the distribution of MSE. The MSE values account for sample size variations or bounces in data caused by small sample sizes.

Turning to FIG. 8, the ratings entity subsystem 106 determines reach and error-corrected impression compositions in an age/gender impressions distribution table 800. The age/gender impressions distribution table 800 includes an age/gender column 802, an impressions column 804, a frequency column 806, a reach column 808, and an impressions composition column 810. The impressions column 804 stores error-weighted impressions values corresponding to impressions tracked by the ratings entity subsystem 106 (e.g., the impression monitor system 132 and/or the panel collection platform 210 based on impressions logged by the web client meter 222). In particular, the values in the impressions column 804 are derived by multiplying weighted MSE values from the error weighted column 702 of FIG. 7 with corresponding impressions values from the impressions column 604 of FIG. 6.

The frequency column 806 stores frequencies of impressions as tracked by the database proprietor subsystem 108. The frequencies of impressions are imported into the frequency column 806 from the frequency column 506 of the database proprietor campaign-level age/gender and impression composition table 500 of FIG. 5. For age/gender groups missing from the table 500, frequency values are taken from the ratings entity campaign-level age/gender and impression composition table 600 of FIG. 6. For example, the database proprietor campaign-level age/gender and impression composition table 500 does not have a less than 12 (<12) age/gender group. Thus, a frequency value of 3 is taken from the ratings entity campaign-level age/gender and impression composition table 600.

The reach column 808 stores reach values representing reach of one or more of the content and/or advertisements 102 (FIG. 1) for each age/gender group. The reach values are determined by dividing respective impressions values from the impressions column 804 by corresponding frequency values from the frequency column 806. The impressions composition column 810 stores values indicative of the percentage of impressions per age/gender group. In the illustrated example, the final total frequency in the frequency column 806 is equal to the total impressions divided by the total reach.

FIGS. 9, 10, 11, 12, 18, 19, and 20 are flow diagrams representative of machine readable instructions that can be executed to implement the methods and apparatus described herein. The example processes of FIGS. 9, 10, 11, 12, 18, 19, and/or 20 may be implemented using machine readable instructions that, when executed, cause a device (e.g., a programmable controller, processor, other programmable machine, integrated circuit, or logic circuit) to perform the operations shown in FIGS. 9, 10, 11, 12, 18, 19, and/or 20. For instance, the example processes of FIGS. 9, 10, 11, 12, 18, 19, and/or 20 may be performed using a processor, a controller, and/or any other suitable processing device. For example, the example process of FIGS. 9, 10, 11, 12, 18, 19, and/or 20 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 9, 10, 11, 12, 18, 19, and/or 20 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 9, 10, 11, 12, 18, 19, and/or 20 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 9, 10, 11, 12, 18, 19, and/or 20 may be implemented as any combination(s) of any of the foregoing techniques, for example, any combination of firmware, software, discrete logic and/or hardware.

Although the example processes of FIGS. 9, 10, 11, 12, 18, 19, and/or 20 are described with reference to the flow diagrams of FIGS. 9, 10, 11, 12, 18, 19, and/or 20, other methods of implementing the processes of FIGS. 9, 10, 11, 12, 18, 19, and/or 20 may be employed. For example, the order of execution of the blocks may be changed, and/or some of the blocks described may be changed, eliminated, sub-divided, or combined. Additionally, any or all of the example processes of FIGS. 9, 10, 11, 12, 18, 19, and/or 20 may be performed sequentially and/or in parallel by, for example, separate processing threads, processors, devices, discrete logic, circuits, etc.

Figure 9:
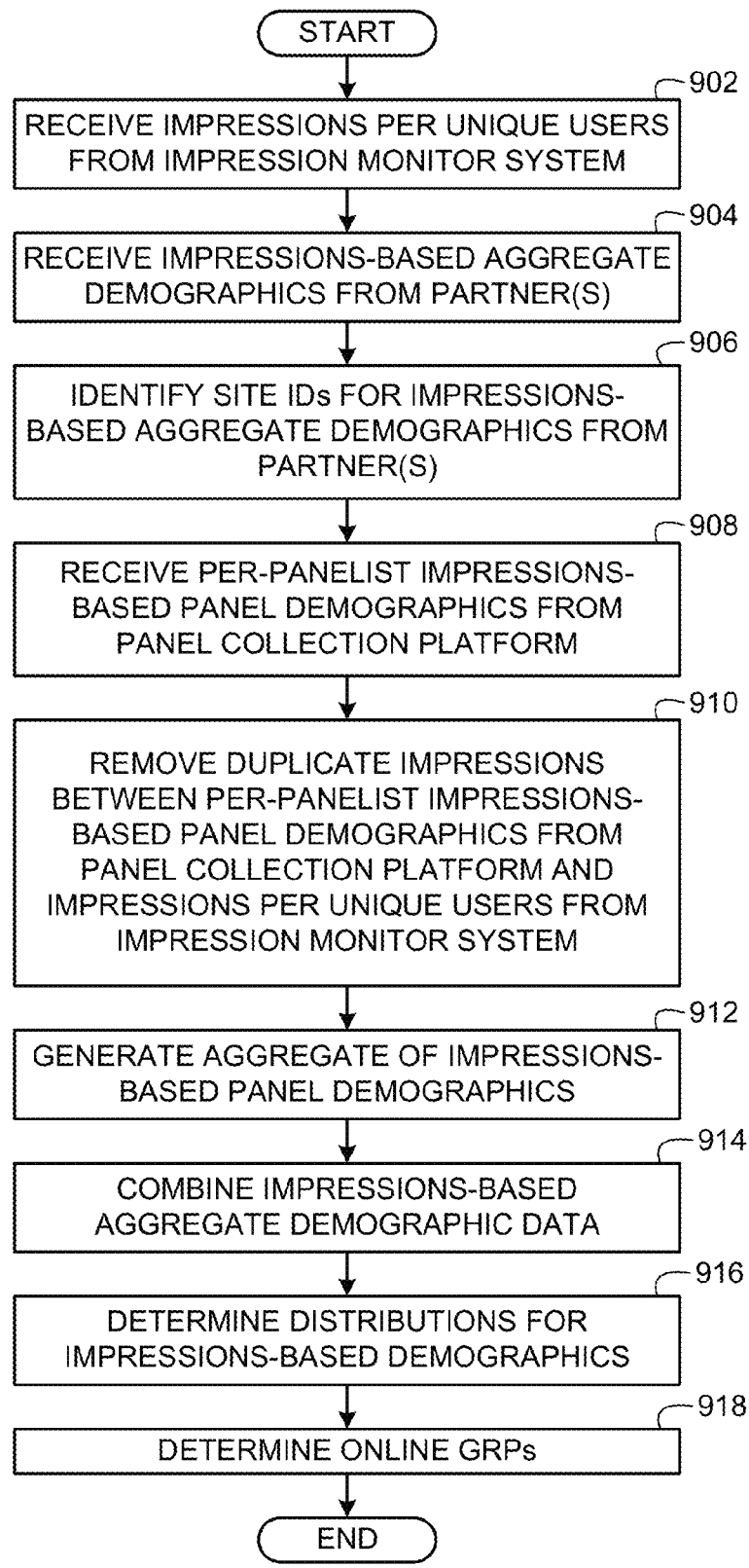
FIG. 9 is a flow diagram representative of example machine readable instructions that may be executed to identify demographics attributable to impressions.

Turning in detail to FIG. 9, the ratings entity subsystem 106 of FIG. 1 may perform the depicted process to collect demographics and impression data from partners and to assess the accuracy and/or adjust its own demographics data of its panelists 114, 116. The example process of FIG. 9 collects demographics and impression data for registered users of one or more partners (e.g., the partners 206 and 208 of FIGS. 2 and 3) that overlap with panelist members (e.g., the panelists 114 and 116 of FIG. 1) of the ratings entity subsystem 106 as well as demographics and impression data from partner sites that correspond to users that are not registered panel members of the ratings entity subsystem 106. The collected data is combined with other data collected at the ratings entity to determine online GRPs. The example process of FIG. 9 is described in connection with the example system 100 of FIG. 1 and the example system 200 of FIG. 2.

Initially, the GRP report generator 130 (FIG. 1) receives impressions per unique users 235 (FIG. 2) from the impression monitor system 132 (block 902). The GRP report generator 130 receives impressions-based aggregate demographics (e.g., the partner campaign-level age/gender and impression composition table 500 of FIG. 5) from one or more partner(s) (block 904). In the illustrated example, user IDs of registered users of the partners 206, 208 are not received by the GRP report generator 130. Instead, the partners 206, 208 remove user IDs and aggregate impressions-based demographics in the partner campaign-level age/gender and impression composition table 500 at demographic bucket levels (e.g., males aged 13-18, females aged 13-18, etc.). However, for instances in which the partners 206, 208 also send user IDs to the GRP report generator 130, such user IDs are exchanged in an encrypted format based on, for example, the double encryption technique described above.

For examples in which the impression monitor system 132 modifies site IDs and sends the modified site IDs in the beacon response 306, the partner(s) log impressions based on those modified site IDs. In such examples, the impressions collected from the partner(s) at block 904 are impressions logged by the partner(s) against the modified site IDs. When the ratings entity subsystem 106 receives the impressions with modified site IDs, GRP report generator 130 identifies site IDs for the impressions received from the partner(s) (block 906). For example, the GRP report generator 130 uses the site ID map 310 (FIG. 3) generated by the impression monitoring system 132 during the beacon receive and response process (e.g., discussed above in connection with FIG. 3) to identify the actual site IDs corresponding to the modified site IDs in the impressions received from the partner(s).

The GRP report generator 130 receives per-panelist impressions-based demographics (e.g., the impressions-based panel demographics table 250 of FIG. 2) from the panel collection platform 210 (block 908). In the illustrated example, per-panelist impressions-based demographics are impressions logged in association with respective user IDs of panelist 114, 116 (FIG. 1) as shown in the impressions-based panel demographics table 250 of FIG. 2.

The GRP report generator 130 removes duplicate impressions between the per-panelist impressions-based panel demographics 250 received at block 908 from the panel collection platform 210 and the impressions per unique users 235 received at block 902 from the impression monitor system 132 (block 910). In this manner, duplicate impressions logged by both the impression monitor system 132 and the web client meter 222 (FIG. 2) will not skew GRPs generated by the GRP generator 130. In addition, by using the per-panelist impressions-based panel demographics 250 from the panel collection platform 210 and the impressions per unique users 235 from the impression monitor system 132, the GRP generator 130 has the benefit of impressions from redundant systems (e.g., the impression monitor system 132 and the web client meter 222). In this manner, if one of the systems (e.g., one of the impression monitor system 132 or the web client meter 222) misses one or more impressions, the record(s) of such impression(s) can be obtained from the logged impressions of the other system (e.g., the other one of the impression monitor system 132 or the web client meter 222).

The GRP report generator 130 generates an aggregate of the impressions-based panel demographics 250 (block 912). For example, the GRP report generator 130 aggregates the impressions-based panel demographics 250 into demographic bucket levels (e.g., males aged 13-18, females aged 13-18, etc.) to generate the panelist ad campaign-level age/gender and impression composition table 600 of FIG. 6.

In some examples, the GRP report generator 130 does not use the per-panelist impressions-based panel demographics from the panel collection platform 210. In such instances, the ratings entity subsystem 106 does not rely on web client meters such as the web client meter 222 of FIG. 2 to determine GRP using the example process of FIG. 9. Instead in such instances, the GRP report generator 130 determines impressions of panelists based on the impressions per unique users 235 received at block 902 from the impression monitor system 132 and uses the results to aggregate the impressions-based panel demographics at block 912. For example, as discussed above in connection with FIG. 2, the impressions per unique users table 235 stores panelist user IDs in association with total impressions and campaign IDs. As such, the GRP report generator 130 may determine impressions of panelists based on the impressions per unique users 235 without using the impression-based panel demographics 250 collected by the web client meter 222.

The GRP report generator 130 combines the impressions-based aggregate demographic data from the partner(s) 206, 208 (received at block 904) and the panelists 114, 116 (generated at block 912) its demographic data with received demographic data (block 914). For example, the GRP report generator 130 of the illustrated example combines the impressions-based aggregate demographic data to form the combined campaign-level age/gender and impression composition table 700 of FIG. 7.

The GRP report generator 130 determines distributions for the impressions-based demographics of block 914 (block 916). In the illustrated example, the GRP report generator 130 stores the distributions of the impressions-based demographics in the age/gender impressions distribution table 800 of FIG. 8. In addition, the GRP report generator 130 generates online GRPs based on the impressions-based demographics (block 918). In the illustrated example, the GRP report generator 130 uses the GRPs to create one or more of the GRP report(s) 131. In some examples, the ratings entity subsystem 106 sells or otherwise provides the GRP report(s) 131 to advertisers, publishers, content providers, manufacturers, and/or any other entity interested in such market research. The example process of FIG. 9 then ends.

Figure 10:
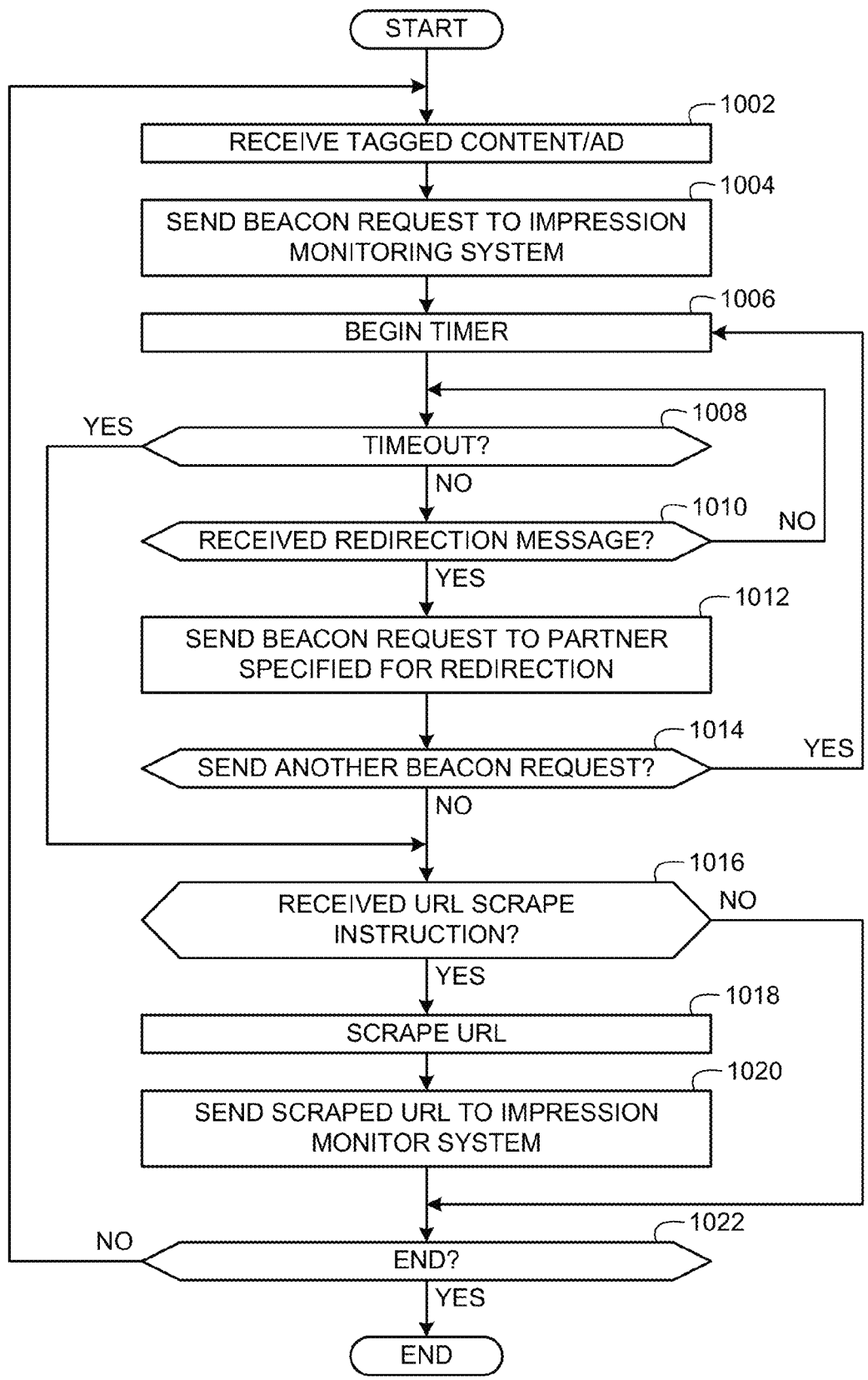
FIG. 10 is a flow diagram representative of example machine readable instructions that may be executed by a client computer to route beacon requests to web service providers to log impressions.

Turning now to FIG. 10, the depicted example flow diagram may be performed by a client computer 202, 203 (FIGS. 2 and 3) to route beacon requests (e.g., the beacon requests 304, 308 of FIG. 3) to web service providers to log demographics-based impressions. Initially, the client computer 202, 203 receives tagged content and/or a tagged advertisement 102 (block 1002) and sends the beacon request 304 to the impression monitor system 132 (block 1004) to give the impression monitor system 132 (e.g., at a first internet domain) an opportunity to log an impression for the client computer 202, 203. The client computer 202, 203 begins a timer (block 1006) based on a time for which to wait for a response from the impression monitor system 132.

If a timeout has not expired (block 1008), the client computer 202, 203 determines whether it has received a redirection message (block 1010) from the impression monitor system 132 (e.g., via the beacon response 306 of FIG. 3). If the client computer 202, 203 has not received a redirection message (block 1010), control returns to block 1008. Control remains at blocks 1008 and 1010 until either (1) a timeout has expired, in which case control advances to block 1016 or (2) the client computer 202, 203 receives a redirection message.

If the client computer 202, 203 receives a redirection message at block 1010, the client computer 202, 203 sends the beacon request 308 to a partner specified in the redirection message (block 1012) to give the partner an opportunity to log an impression for the client computer 202, 203. During a first instance of block 1012 for a particular tagged advertisement (e.g., the tagged advertisement 102), the partner (or in some examples, non-partnered database proprietor 110) specified in the redirection message corresponds to a second internet domain. During subsequent instances of block 1012 for the same tagged advertisement, as beacon requests are redirected to other partner or non-partnered database proprietors, such other partner or non-partnered database proprietors correspond to third, fourth, fifth, etc. internet domains. In some examples, the redirection message(s) may specify an intermediary(ies) (e.g., an intermediary(ies) server(s) or sub-domain server(s)) associated with a partner(s) and/or the client computer 202, 203 sends the beacon request 308 to the intermediary(ies) based on the redirection message(s) as described below in conjunction with FIG. 13.

The client computer 202, 203 determines whether to attempt to send another beacon request to another partner (block 1014). For example, the client computer 202, 203 may be configured to send a certain number of beacon requests in parallel (e.g., to send beacon requests to two or more partners at roughly the same time rather than sending one beacon request to a first partner at a second internet domain, waiting for a reply, then sending another beacon request to a second partner at a third internet domain, waiting for a reply, etc.) and/or to wait for a redirection message back from a current partner to which the client computer 202, 203 sent the beacon request at block 1012. If the client computer 202, 203 determines that it should attempt to send another beacon request to another partner (block 1014), control returns to block 1006.

If the client computer 202, 203 determines that it should not attempt to send another beacon request to another partner (block 1014) or after the timeout expires (block 1008), the client computer 202, 203 determines whether it has received the URL scrape instruction 320 (FIG. 3) (block 1016). If the client computer 202, 203 did not receive the URL scrape instruction 320 (block 1016), control advances to block 1022. Otherwise, the client computer 202, 203 scrapes the URL of the host website rendered by the web browser 212 (block 1018) in which the tagged content and/or advertisement 102 is displayed or which spawned the tagged content and/or advertisement 102 (e.g., in a pop-up window). The client computer 202, 203 sends the scraped URL 322 to the impression monitor system 132 (block 1020). Control then advances to block 1022, at which the client computer 202, 203 determines whether to end the example process of FIG. 10. For example, if the client computer 202, 203 is shut down or placed in a standby mode or if its web browser 212 (FIGS. 2 and 3) is shut down, the client computer 202, 203 ends the example process of FIG. 10. If the example process is not to be ended, control returns to block 1002 to receive another content and/or tagged ad. Otherwise, the example process of FIG. 10 ends.

In some examples, real-time redirection messages from the impression monitor system 132 may be omitted from the example process of FIG. 10, in which cases the impression monitor system 132 does not send redirect instructions to the client computer 202, 203. Instead, the client computer 202, 203 refers to its partner-priority-order cookie 220 to determine partners (e.g., the partners 206 and 208) to which it should send redirects and the ordering of such redirects. In some examples, the client computer 202, 203 sends redirects substantially simultaneously to all partners listed in the partner-priority-order cookie 220 (e.g., in seriatim, but in rapid succession, without waiting for replies). In such some examples, block 1010 is omitted and at block 1012, the client computer 202, 203 sends a next partner redirect based on the partner-priority-order cookie 220. In some such examples, blocks 1006 and 1008 may also be omitted, or blocks 1006 and 1008 may be kept to provide time for the impression monitor system 132 to provide the URL scrape instruction 320 at block 1016.

Figure 11:
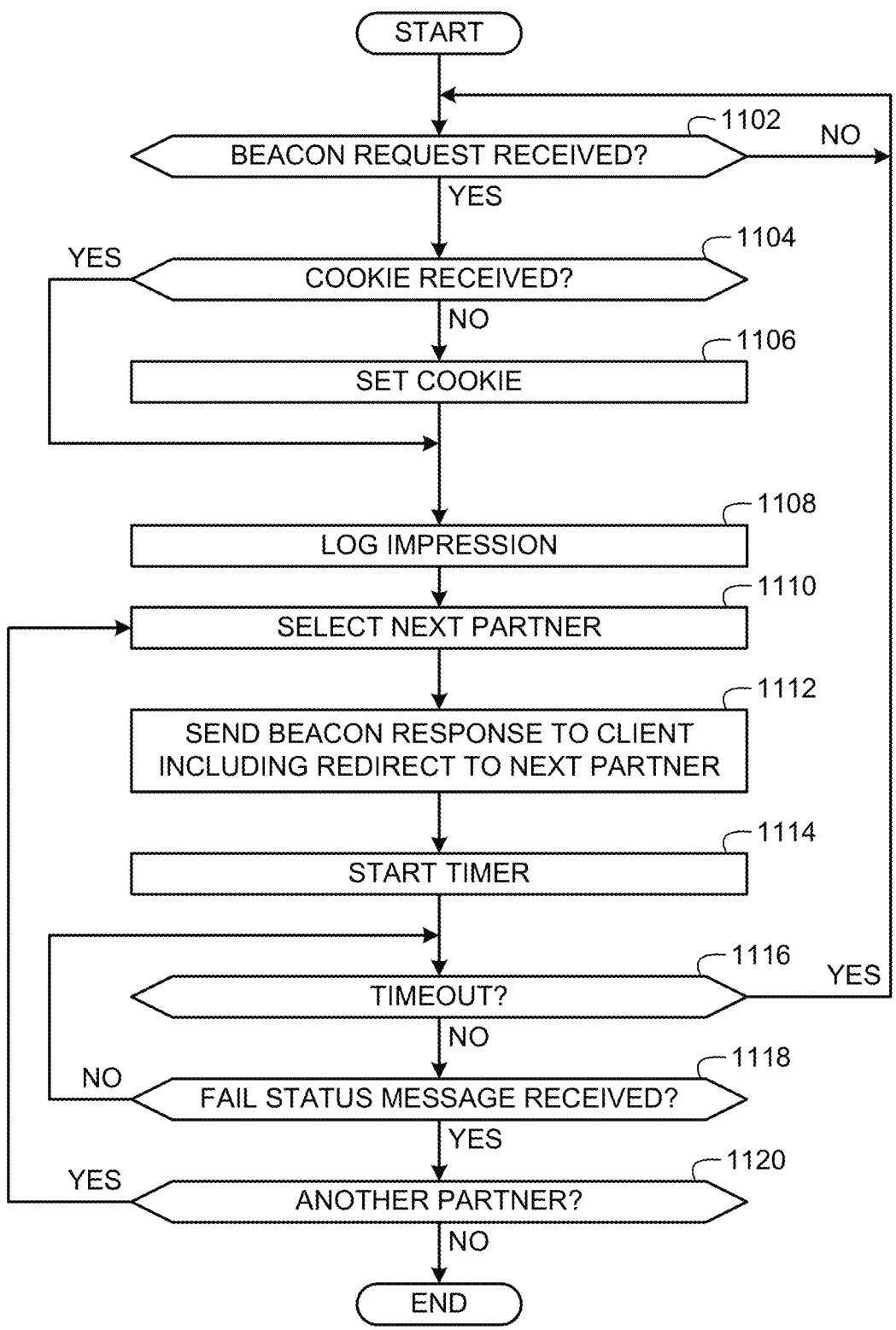
FIG. 11 is a flow diagram representative of example machine readable instructions that may be executed by a panelist monitoring system to log impressions and/or redirect beacon requests to web service providers to log impressions.

Turning to FIG. 11, the example flow diagram may be performed by the impression monitor system 132 (FIGS. 2 and 3) to log impressions and/or redirect beacon requests to web service providers (e.g., database proprietors) to log impressions. Initially, the impression monitor system 132 waits until it has received a beacon request (e.g., the beacon request 304 of FIG. 3) (block 1102). The impression monitor system 132 of the illustrated example receives beacon requests via the HTTP server 232 of FIG. 2. When the impression monitor system 132 receives a beacon request (block 1102), it determines whether a cookie (e.g., the panelist monitor cookie 218 of FIG. 2) was received from the client computer 202, 203 (block 1104). For example, if a panelist monitor cookie 218 was previously set in the client computer 202, 203, the beacon request sent by the client computer 202, 203 to the panelist monitoring system will include the cookie.

If the impression monitor system 132 determines at block 1104 that it did not receive the cookie in the beacon request (e.g., the cookie was not previously set in the client computer 202, 203, the impression monitor system 132 sets a cookie (e.g., the panelist monitor cookie 218) in the client computer 202, 203 (block 1106). For example, the impression monitor system 132 may use the HTTP server 232 to send back a response to the client computer 202, 203 to 'set' a new cookie (e.g., the panelist monitor cookie 218).

After setting the cookie (block 1106) or if the impression monitor system 132 did receive the cookie in the beacon request (block 1104), the impression monitor system 132 logs an impression (block 1108). The impression monitor system 132 of the illustrated example logs an impression in the impressions per unique users table 235 of FIG. 2. As discussed above, the impression monitor system 132 logs the impression regardless of whether the beacon request corresponds to a user ID that matches a user ID of a panelist member (e.g., one of the panelists 114 and 116 of FIG. 1). However, if the user ID comparator 228 (FIG. 2) determines that the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor system 132. For such examples in which the user ID matches a user ID of a panelist, the impression monitor system 132 of the illustrated example logs a panelist identifier with the impression in the impressions per unique users table 235 and subsequently an audience measurement entity associates the known demographics of the corresponding panelist (e.g., a corresponding one of the panelists 114, 116) with the logged impression based on the panelist identifier. Such associations between panelist demographics (e.g., the age/gender column 602 of FIG. 6) and logged impression data are shown in the panelist ad campaign-level age/gender and impression composition table 600 of FIG. 6. If the user ID comparator 228 (FIG. 2) determines that the user ID does not correspond to a panelist 114, 116, the impression monitor system 132 will still benefit from logging an impression (e.g., an ad impression or content impression) even though it will not have a user ID record (and, thus, corresponding demographics) for the impression reflected in the beacon request 304.

The impression monitor system 132 selects a next partner (block 1110). For example, the impression monitor system 132 may use the rules/ML engine 230 (FIG. 2) to select one of the partners 206 or 208 of FIGS. 2 and 3 at random or based on an ordered listing or ranking of the partners 206 and 208 for an initial redirect in accordance with the rules/ML engine 230 (FIG. 2) and to select the other one of the partners 206 or 208 for a subsequent redirect during a subsequent execution of block 1110.

The impression monitor system 132 sends a beacon response (e.g., the beacon response 306) to the client computer 202, 203 including an HTTP 302 redirect (or any other suitable instruction to cause a redirected communication) to forward a beacon request (e.g., the beacon request 308 of FIG. 3) to a next partner (e.g., the partner A 206 of FIG. 2) (block 1112) and starts a timer (block 1114). The impression monitor system 132 of the illustrated example sends the beacon response 306 using the HTTP server 232. In the illustrated example, the impression monitor system 132 sends an HTTP 302 redirect (or any other suitable instruction to cause a redirected communication) at least once to allow at least a partner site (e.g., one of the partners 206 or 208 of FIGS. 2 and 3) to also log an impression for the same advertisement (or content). However, in other example implementations, the impression monitor system 132 may include rules (e.g., as part of the rules/ML engine 230 of FIG. 2) to exclude some beacon requests from being redirected. The timer set at block 1114 is used to wait for real-time feedback from the next partner in the form of a fail status message indicating that the next partner did not find a match for the client computer 202, 203 in its records.

If the timeout has not expired (block 1116), the impression monitor system 132 determines whether it has received a fail status message (block 1118). Control remains at blocks 1116 and 1118 until either (1) a timeout has expired, in which case control returns to block 1102 to receive another beacon request or (2) the impression monitor system 132 receives a fail status message.

If the impression monitor system 132 receives a fail status message (block 1118), the impression monitor system 132 determines whether there is another partner to which a beacon request should be sent (block 1120) to provide another opportunity to log an impression. The impression monitor system 132 may select a next partner based on a smart selection process using the rules/ML engine 230 of FIG. 2 or based on a fixed hierarchy of partners. If the impression monitor system 132 determines that there is another partner to which a beacon request should be sent, control returns to block 1110. Otherwise, the example process of FIG. 11 ends.

In some examples, real-time feedback from partners may be omitted from the example process of FIG. 11 and the impression monitor system 132 does not send redirect instructions to the client computer 202, 203. Instead, the client computer 202, 203 refers to its partner-priority-order cookie 220 to determine partners (e.g., the partners 206 and 208) to which it should send redirects and the ordering of such redirects. In some examples, the client computer 202, 203 sends redirects simultaneously to all partners listed in the partner-priority-order cookie 220. In such some examples, blocks 1110, 1114, 1116, 1118, and 1120 are omitted and at block 1112, the impression monitor system 132 sends the client computer 202, 203 an acknowledgement response without sending a next partner redirect.

Figure 12:
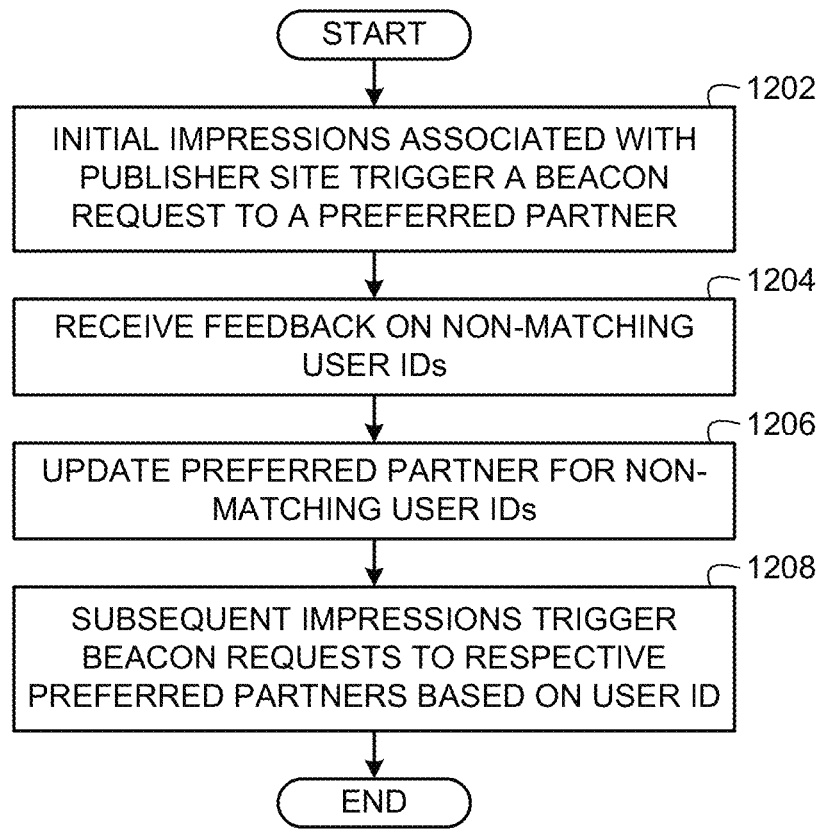
FIG. 12 is a flow diagram representative of example machine readable instructions that may be executed to dynamically designate preferred web service providers from which to request demographics attributable to impressions.

Turning now to FIG. 12, the example flow diagram may be executed to dynamically designate preferred web service providers (or preferred partners) from which to request logging of impressions using the example redirection beacon request processes of FIGS. 10 and 11. The example process of FIG. 12 is described in connection with the example system 200 of FIG. 2. Initial impressions associated with content and/or ads delivered by a particular publisher site (e.g., the publisher 302 of FIG. 3) trigger the beacon instructions 214 (FIG. 2) (and/or beacon instructions at other computers) to request logging of impressions at a preferred partner (block 1202). In this illustrated example, the preferred partner is initially the partner A site 206 (FIGS. 2 and 3). The impression monitor system 132 (FIGS. 1, 2, and 3) receives feedback on non-matching user IDs from the preferred partner 206 (block 1204). The rules/ML engine 230 (FIG. 2) updates the preferred partner for the non-matching user IDs (block 1206) based on the feedback received at block 1204. In some examples, during the operation of block 1206, the impression monitor system 132 also updates a partner-priority-order of preferred partners in the partner-priority-order cookie 220 of FIG. 2. Subsequent impressions trigger the beacon instructions 214 (and/or beacon instructions at other computers 202, 203) to send requests for logging of impressions to different respective preferred partners specifically based on each user ID (block 1208). That is, some user IDs in the panelist monitor cookie 218 and/or the partner cookie(s) 216 may be associated with one preferred partner, while others of the user IDs are now associated with a different preferred partner as a result of the operation at block 1206. The example process of FIG. 12 then ends.

Figure 13:
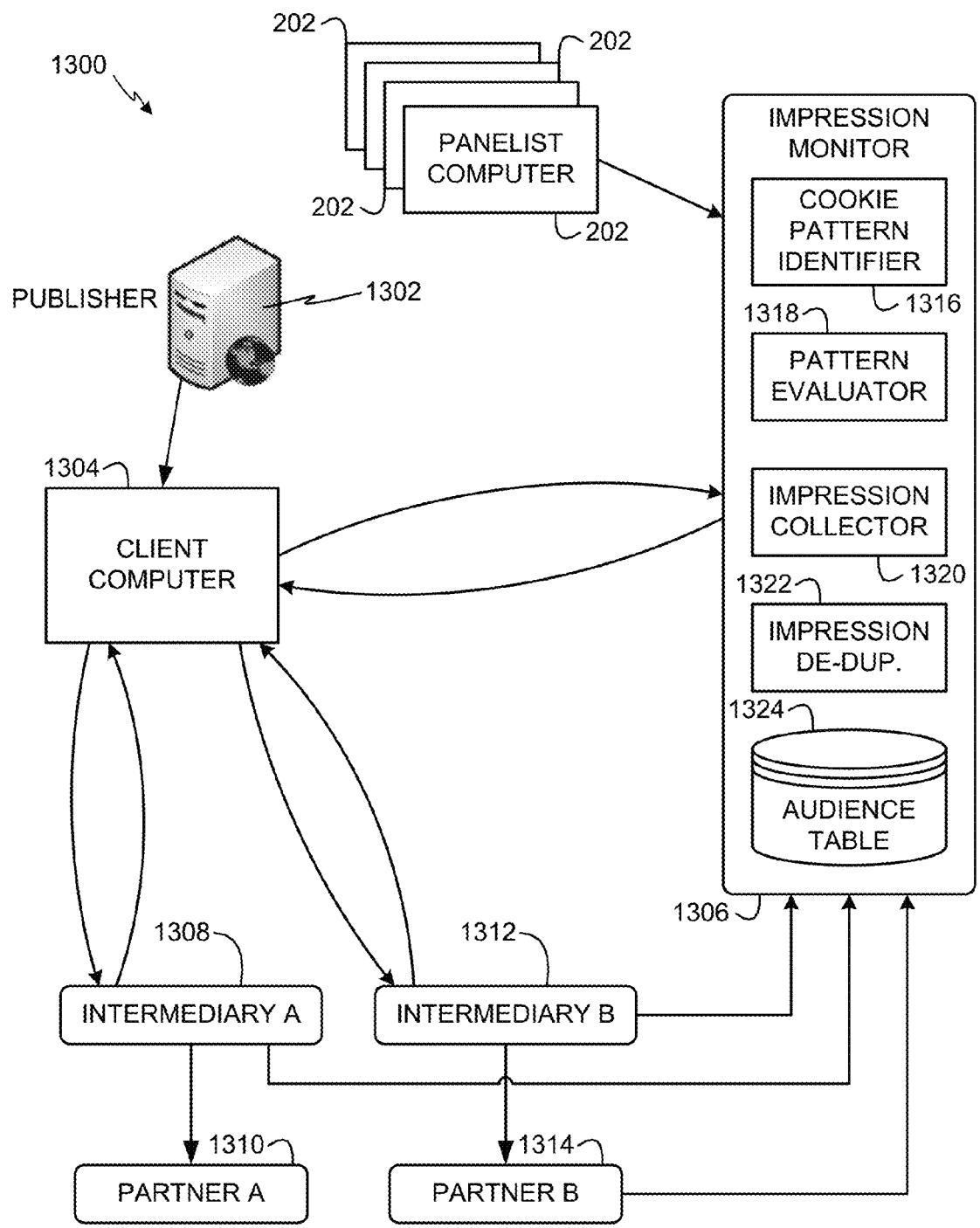
FIG. 13 depicts an example system that may be used to determine advertising exposure based on demographic information collected by one or more database proprietors.

FIG. 13 depicts an example system 1300 that may be used to determine media (e.g., content and/or advertising) exposure based on information collected by one or more database proprietors. The example system 1300 is another example of the systems 200 and 300 illustrated in FIGS. 2 and 3 in which an intermediary 1308, 1312 is provided between a client computer 1304 and a partner 1310, 1314. Persons of ordinary skill in the art will understand that the description of FIGS. 2 and 3 and the corresponding flow diagrams of FIGS. 8-12 are applicable to the system 1300 with the inclusion of the intermediary 1308, 1312.

According to the illustrated example, a publisher 1302 transmits media (e.g., an advertisement and/or content) to the client computer 1304 in response to a request from a client computer (e.g., an HTTP request). The publisher 1302 may be the publisher 302 described in conjunction with FIG. 3. The client computer 1304 may be the panelist client computer 202 or the non-panelist computer 203 described in conjunction with FIGS. 2 and 3 or any other client computer. The example client computer 1304 also provides a cookie supplied by the publisher 1302 to the publisher 1302 with the request (if the client computer 1304 has such a cookie). If the client computer does not have a cookie, the example publisher 1302 places a cookie on the client computer 1304. The example cookie provides a unique identifier that enables the publisher 1302 to know when the client computer 1304 sends requests and enables the example publisher 1302 to provide media (e.g., advertising and/or content) more likely to be of interest to the example client computer 1304. The media includes a beacon that instructs the client computer to send a request to an impression monitor 1306 as explained above.

The impression monitor 1306 may be the impression monitor system 132 described in conjunction with FIGS. 1-3. The impression monitor 1306 of the illustrated example receives beacon requests from the client computer 1304 and transmits redirection messages to the client computer 1304 to instruct the client to send a request to one or more of the intermediary A 1308, the intermediary B 1312, or any other system such as another intermediary, a partner, etc. The impression monitor 1306 also receives information about partner cookies from one or more of the intermediary A 1308 and the intermediary B 1312.

In some examples, the impression monitor 1306 may insert into a redirection message an identifier of a client that is established by the impression monitor 1306 and identifies the client computer 1304 and/or a user thereof. For example, the identifier of the client may be an identifier stored in a cookie that has been set at the client by the impression monitor 1306 or any other entity, an identifier assigned by the impression monitor 1306 or any other entity, etc. The identifier of the client may be a unique identifier, a semi-unique identifier, etc. In some examples, the identifier of the client may be encrypted, obfuscated, or varied to prevent tracking of the identifier by the intermediary 1308, 1312 or the partner 1310, 1314. According to the illustrated example, the identifier of the client is included in the redirection message to the client computer 1304 to cause the client computer 1304 to transmit the identifier of the client to the intermediary 1308, 1312 when the client computer 1304 follows the redirection message. For example, the identifier of the client may be included in a URL included in the redirection message to cause the client computer 1304 to transmit the identifier of the client to the intermediary 1308, 1312 as a parameter of the request that is sent in response to the redirection message.

The intermediaries 1308, 1312 of the illustrated example receive redirected beacon requests from the client computer 1304 and transmit information about the requests to the partners 1310, 1314. The example intermediaries 1308, 1312 are made available on a content delivery network (e.g., one or more servers of a content delivery network) to ensure that clients can quickly send the requests without causing substantial interruption in the access of content from the publisher 1302.

In examples disclosed herein, a cookie set in a domain (e.g., "partnerA.com") is accessible by a server of a sub-domain (e.g., "intermediary.partnerA.com") corresponding to the domain (e.g., the root domain "partnerA.com") in which the cookie was set. In some examples, the reverse is also true such that a cookie set in a sub-domain (e.g., "intermediary.partnerA.com") is accessible by a server of a root domain (e.g., the root domain "partnerA.com") corresponding to the sub-domain (e.g., "intermediary.partnerA.com") in which the cookie was set. As used herein, the term domain (e.g., Internet domain, domain name, etc.) is generic to (i.e., includes) the root domain (e.g., "domain.com") and sub-domains (e.g., "a.domain.com," "b.domain.com," "c.d.domain.com," etc.).

To enable the example intermediaries 1308, 1312 to receive cookie information associated with the partners 1310, 1314 respectively, sub-domains of the partners 1310, 1314 are assigned to the intermediaries 1308, 1312. For example, the partner A 1310 may register an internet address associated with the intermediary A 1308 with the sub-domain in a domain name system associated with a domain for the partner A 1310. Alternatively, the sub-domain may be associated with the intermediary in any other manner. In such examples, cookies set for the domain name of partner A 1310 are transmitted from the client computer 1304 to the intermediary A 1308 that has been assigned a sub-domain name associated with the domain of partner A 1310 when the client 1304 transmits a request to the intermediary A 1308.

The example intermediaries 1308, 1312 transmit the beacon request information including a campaign ID and received cookie information to the partners 1310, 1314 respectively. This information may be stored at the intermediaries 1308, 1312 so that it can be sent to the partners 1310, 1314 in a batch. For example, the received information could be transmitted near the end of the day, near the end of the week, after a threshold amount of information is received, etc. Alternatively, the information may be transmitted immediately upon receipt. The campaign ID may be encrypted, obfuscated, varied, etc. to prevent the partners 1310, 1314 from recognizing the content to which the campaign ID corresponds or to otherwise protect the identity of the media. A lookup table of campaign ID information may be stored at the impression monitor 1306 so that impression information received from the partners 1310, 1314 can be correlated with the media.

The intermediaries 1308, 1312 of the illustrated example also transmit an indication of the availability of a partner cookie to the impression monitor 1306. For example, when a redirected beacon request is received at the intermediary A 1308, the intermediary A 1308 determines if the redirected beacon request includes a cookie for partner A 1310. The intermediary A 1308 sends the notification to the impression monitor 1306 when the cookie for partner A 1310 was received. Alternatively, intermediaries 1308, 1312 may transmit information about the availability of the partner cookie regardless of whether a cookie is received. Where the impression monitor 1306 has included an identifier of the client in the redirection message and the identifier of the client is received at the intermediaries 1308, 1312, the intermediaries 1308, 1312 may include the identifier of the client with the information about the partner cookie transmitted to the impression monitor 1306. The impression monitor 1306 may use the information about the existence of a partner cookie to determine how to redirect future beacon requests. For example, the impression monitor 1306 may elect not to redirect a client to an intermediary 1308, 1312 that is associated with a partner 1310, 1314 with which it has been determined that a client does not have a cookie. In some examples, the information about whether a particular client has a cookie associated with a partner may be refreshed periodically or aperiodically to account for cookies expiring and new cookies being set (e.g., a recent login or registration at one of the partners).

The intermediaries 1308, 1312 may be implemented by a server associated with a metering entity (e.g., an audience measurement entity that provides the impression monitor 1306). Alternatively, intermediaries 1308, 1312 may be implemented by servers associated with the partners 1310, 1314 respectively. In other examples, the intermediaries may be provided by a third-party such as a content delivery network.

In some examples, the intermediaries 1308, 1312 are provided to prevent a direct connection between the partners 1310, 1314 and the client computer 1304, to prevent some information from the redirected beacon request from being transmitted to the partners 1310, 1314 (e.g., to prevent a REFERRER_URL from being transmitted to the partners 1310, 1314), to reduce the amount of network traffic at the partners 1310, 1314 associated with redirected beacon requests, and/or to transmit to the impression monitor 1306 real-time or near real-time indications of whether a partner cookie is provided by the client computer 1304.

In some examples, the intermediaries 1308, 1312 are trusted by the partners 1310, 1314 to prevent confidential data from being transmitted to the impression monitor 1306. For example, the intermediary 1308, 1312 may remove identifiers stored in partner cookies before transmitting information to the impression monitor 1306.

The partners 1310, 1314 receive beacon request information including the campaign ID and cookie information from the intermediaries 1308, 1312. The partners 1310, 1314 determine identity and demographics for a user of the client computer 1304 based on the cookie information. The example partners 1310, 1314 track impressions for the campaign ID based on the determined demographics associated with the impression. Based on the tracked impressions, the example partners 1310, 1314 generate reports such as those previously described above. The reports may be sent to the impression monitor 1306, the publisher 1302, an advertiser that supplied an ad provided by the publisher 1302, a media hub, and/or other persons or entities interested in the reports.

In the illustrated example of FIG. 13, the partner 1314 provides impression information including a set of cookies and associated demographic information (e.g., age and gender group) to the impression monitor 1306. In the example of FIG. 13, each cookie and associated demographic group corresponds to an impression identified by the partner 1314. However, the provided cookie information does not include explicit associations of cookies with unique users and may be encoded such that unique users are not distinguishable solely from the cookie information and demographic information. As a result, multiple different cookies may be received for a same user, causing the user to appear as multiple (e.g., duplicate) users in an audience report or when calculating reach of a media campaign.

To de-duplicate or partially de-duplicate the cookie information from the partner 1314 (and to thereby increase the accuracy and reduce overcounting of unique audience) and/or reach information, the example impression monitor 1306 of FIG. 13 uses panelist information to identify patterns present in the encoded payload of the cookies. The example impression monitor 1306 obtains cookie information and user identifiers and/or demographic information from a known set of unique users of panelist computers 202. The cookie information from the panelist computers 202 includes cookies for the web site of the partner 1314.

Based on the known panel information, the example impression monitor 1306 performs pattern identification on the payloads of the cookies to determine data patterns indicating cookies associated with a same user. The example impression monitor 1306 may then apply the identified data pattern(s) to cookies received from the example partner 1314 to identify cookies belonging to same respective users and, thus, de-duplicating audience members.

To identify patterns and/or de-duplicate impression information, the example impression monitor 1306 of FIG. 13 includes a cookie pattern identifier 1316, a pattern evaluator 1318, an impression collector 1320, an impression de-duplicator 1322, and an audience table 1324.

The example cookie pattern identifier 1316 of FIG. 13 accesses cookies and user identifiers from the example panelists 202. The cookies and/or user identifiers may be requested from and provided by the example web client meter 222 and/or the HTTP requests log 224 described above with reference to FIG. 2. The cookies obtained from the panelist computer 202 include the data payloads of the cookies, such as the partner cookies 216 of FIG. 2. In the example of FIG. 13, the cookie pattern identifier 1316 obtains multiple cookies associated with the partner 1314 per user and/or per panelist computer 202.

Using the cookies and the user identifiers, the example cookie pattern identifier 1316 of FIG. 13 identifies a pattern in the cookies that indicates which cookies are associated with a same user. Example patterns include designated sets of data group(s), sets of character(s) and/or sets of character location(s) within a data payload of a cookie. The example cookie pattern identifier 1316 identifies a pattern (e.g., sets of data group(s), sets of character(s) and/or sets of character location(s)) in the example cookies by identifying test patterns, estimating a unique audience based on a set of test impressions and/or cookies obtained from a panel, and comparing the resulting unique audience to a known unique audience determined using the panel. As described below, estimating the unique audience and/or comparing the estimated unique audience to the known unique audience may be performed by the pattern evaluator 1318 based on a test pattern.

To assist the cookie pattern identifier 1316 in evaluating identified patterns in the cookies, the example pattern evaluator 1318 of FIG. 13 determines error rates between a demographic estimate based on an identified potential pattern (e.g., a test pattern) and a second demographic estimate or known demographic count based on the panelist information. For example, when the cookie pattern identifier 1316 identifies a potential pattern in the cookies, the example pattern evaluator 1318 compares a count of unique users estimated using the pattern with the known number of unique users providing the panel data. The resulting overcounting ratio may be used as the error. When the pattern evaluator 1318 determines that the error associated with the identified pattern is less than a threshold, the pattern evaluator 1318 determines the identified pattern to be an acceptable pattern and provides the pattern to the impression de-duplicator 1322.

The threshold used by the pattern evaluator 1318 may be, for example, a lowest error determined from other potential patterns. Alternatively, the threshold may be an overcounting ratio determined to be within an acceptable error range. In some examples, the pattern evaluator 1318 avoids providing patterns to the impression de-duplicator 1322 which result in undercounting of the unique audience relative to the known unique audience.

The example impression collector 1320 of FIG. 13 obtains impression information from the partner 1314. The example impression information obtained from the partner 1314 includes a set of cookies and corresponding demographic characteristics, such as an age and gender classification, for the users associated with each of the impressions. The partner 1314 provides the demographic characteristic based on its knowledge of the person associated with the impression (e.g., from the person being registered with the partner 1314 and having voluntarily provided demographic information).

The example impression de-duplicator 1322 of FIG. 13 identifies cookies included in the impression information that are associated with a same person based on the impressions being associated with a same demographic group by the partner 1314 and based on the pattern identified by the cookie pattern identifier 1316 and/or the pattern evaluator 1318. The example impression de-duplicator 1322 associates impressions determined to match based on matching the pattern and having a same demographic classification as a unique user. The example impression de-duplicator 1322 reduces the count of unique audience members to reflect the identified impressions being associated with a single user.

In the example of FIG. 13, the impression de-duplicator 1322 uses the audience table 1324 to store unique audience members in association with unique combinations of identified patterns and demographic characteristic(s). For example, when the impression de-duplicator 1322 identifies a combination of a cookie payload having a set of characters (e.g., characters identified based on an identified pattern) and a demographic characteristic that has not already been identified, the example impression de-duplicator 1322 caches the combination as a unique audience member in the table 1324. However, when the impression de-duplicator 1322 identifies a combination of a cookie payload having a set of characters (e.g., characters identified based on an identified pattern) and a demographic characteristic that is present in the audience table 1324, the example impression de-duplicator 1322 determines that the identified combination corresponds to an already-identified unique audience member and does not count the impression as a new unique audience member.

The example cookie pattern identifier 1316, the example pattern evaluator 1318, the example impression collector 1320, the example impression de-duplicator 1322, and the example audience table 1324 are described in more detail below with reference to FIGS. 14-20.

FIG. 14 shows example cookie payloads 1402-1420 obtained from panelist computers (e.g., the panelist computers 202 of FIG. 13). The example impression monitor 1306 of FIG. 13 (e.g., the cookie pattern identifier 1316) may determine one or more patterns based on the cookies 1402-1420 for use in de-duplicating impression information and/or determining media audience data. While the example cookie pattern identifier 1316 uses the cookie payloads 1402-1420, the cookie pattern identifier 1316 may additionally or alternatively use any other portion(s) and/or data of the cookies, and/or may use any other type of data unit to identify a pattern.

FIG. 15A is a table illustrating an example character map 1500 including total numbers of characters (e.g., "-", "&", "0", "a", "A", "b", etc.) found at locations within a set of cookies (e.g., the cookie payloads 1402-1420 of FIG. 14). The example cookie pattern identifier 1316 of FIG. 13 generates the character map 1500 and uses the map 1500 to identify patterns present in the cookie payloads 1402-1420.

Figure 15B:
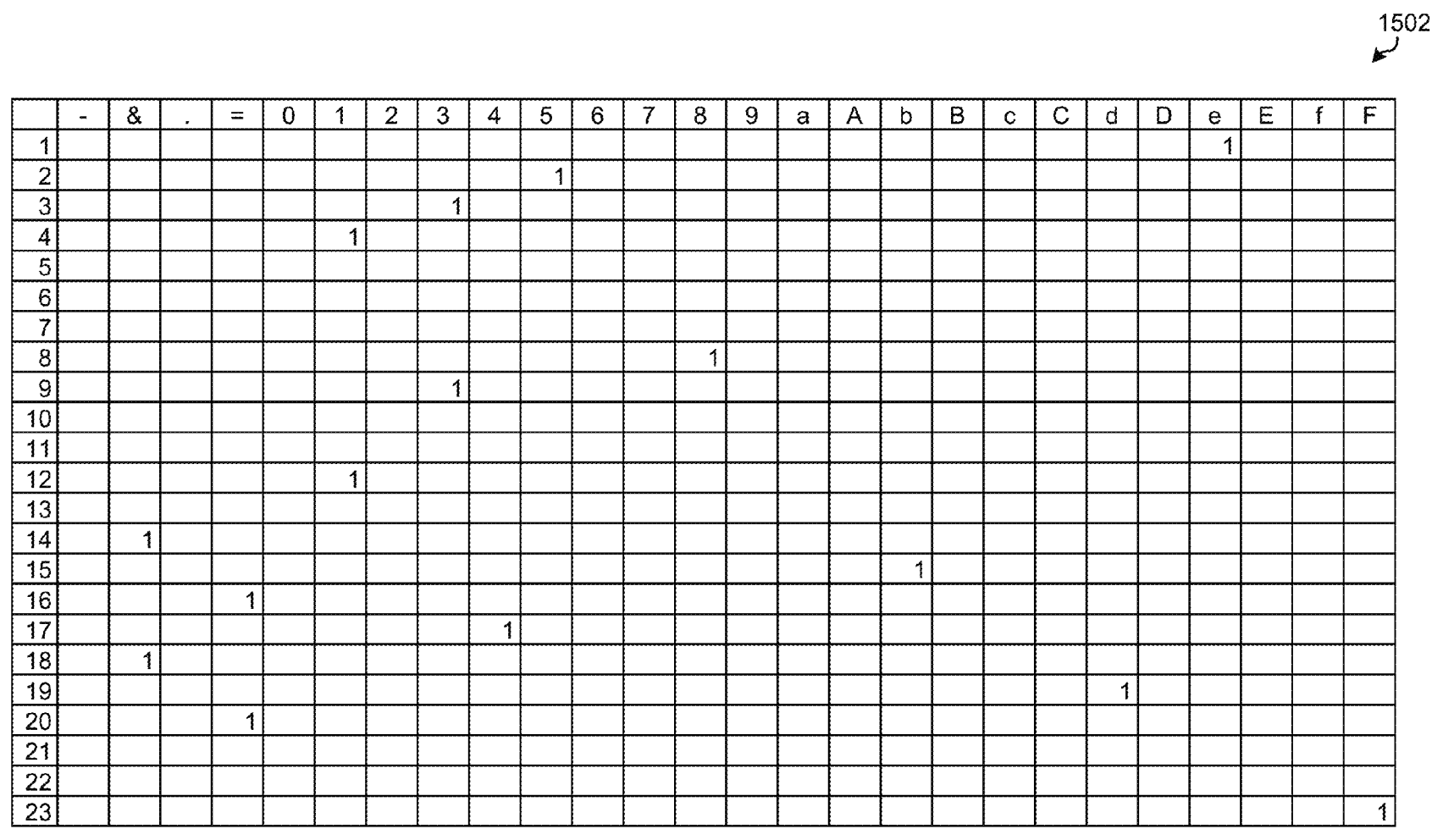

To generate the example map 1500, the cookie pattern identifier 1316 of FIG. 13 determines, for each cookie payload 1402-1420, the character present at each position in the cookie payload 1402-1420. For example, the cookie pattern identifier 1316 may generate a character map 1502 as illustrated in FIG. 15B. FIG. 15B shows a partial character map for the data payload 1412. The example character map 1502 maps the example cookie payload 1412 by marking the columns (e.g., characters) and rows (e.g., positions) matching characters in the cookie payload 1412. For example, in the cookie payload 1412, the first character is an 'e.' Accordingly, the first row of the column corresponding to the character 'e' is populated with a mark (e.g., a count of 1). Similarly, the second character in the cookie payload 1412 is the character '5.' Accordingly, the second row of the column corresponding to the character '5' is populated with a mark. The example impression monitor 1306 maps each character in the example cookie payload 1412 into the character map 1502. Furthermore, the cookie pattern identifier 1316 generates additional mappings for the other cookie payloads 1402-1410, 1414-1420.

Returning to FIG. 15A, the example cookie pattern identifier 1316 totals the character maps for each of the cookie payloads 1402-1420 (and additional cookie payloads) to generate the total character map 1500. For example, for each row and column combination (e.g., character and position combination), the cookie pattern identifier 1316 totals the number of marks (e.g., counts) present in the individual cookie payload character maps (such as the character map 1502). After summing the tables to generate the total character map 1500, the example cookie pattern identifier 1316 determines whether data consistencies and/or breaks are present. An example data consistency may be one or more characters being present at same locations for a large proportion of the cookie payloads (e.g., column/row combinations having high counts relative to the remainder of the table, column/row combinations having counts higher than a threshold, etc.). In the example of FIG. 15A, the combinations of characters '&b=' at positions 14-16 and '&d=' at positions 18-20 have a high number of occurrences relative to other combinations.

In some examples, data consistencies may be detected based on particular character(s) being the only character(s) located at a particular position(s) in the cookie payloads 1402-1420. Such consistencies may be used to separate or split portions of data within the cookie payloads 1402-1420, because the data in the consistencies may not themselves provide much information (due to their unchanging nature).

Other example methods of pattern identification include identifying combinations or sequences of characters, even if the combinations or sequences are not consistently in a particular location in the cookie payloads 1402-1420. Because many possible patterns or encryption are possible, the example cookie pattern identifier 1316 may attempt different pattern recognition algorithms to identify pattern(s) in the cookie payloads 1402-1420. In some examples, the cookie pattern identifier 1316 stops identifying patterns when an error threshold has been reached (e.g., overcounting audience is less than an upper acceptable error using an identified pattern).

FIG. 16 shows example groupings 1602-1608 of information in the example cookie payloads 1402-1420 of FIG. 14 that may be identified by the cookie pattern identifier 1316 of FIG. 13. The example cookie pattern identifier 1316 generates the groupings 1602-1608 based on the pattern information identified using the character maps 1500, 1502 of FIGS. 15A and 15B. For example, the cookie pattern identifier 1316 determines the character combinations '&b=', '&d=', '&s=', '&i=' separate different variables present in the cookie payloads 1402-1420, but do not themselves provide any information.

In the example of FIG. 16, the cookie pattern identifier 1316 drops a variable (e.g., the characters following the combination '&s=') because the cookie pattern identifier 1316 and/or the pattern evaluator 1318 determine that the character(s) do not provide information (e.g., because one or more sets of characters following the combination '&s=' have a limited number of values and/or have a known or derivable meaning not related to audience de-duplication). The example cookie pattern identifier 1316 and/or the pattern evaluator 1318 further determines that the character '4' following the characters '&b=' does not provide any information that may be used to de-duplicate the unique audience (e.g., because it is consistently present). Accordingly, the example cookie pattern identifier 1316 and/or the pattern evaluator 1318 determines that the data from the cookie payloads 1402-1420 may be divided into three primary groups 1602-1606. The example group 1608 is derived from the groups 1602-1606 as discussed below.

To identify a pattern from the data groups 1602-1608, the example pattern evaluator 1318 calculates a unique audience using the data in the first group 1602. For example, the pattern evaluator 1318 may use each unique combination of data value and age/gender group (e.g., obtained from the panelist computer 202 in association with the cookie from which the data value is derived) as a unique audience member. Based on the unique combinations, the pattern evaluator 1318 calculates the error.

The example cookie pattern identifier 1316 iteratively reduces the size of the data value in the group 1602 by 1 character. For example, the cookie pattern identifier 1316 may remove the first character (e.g., resulting in 531njp83us1p in the first cookie payload of FIG. 16), the last character (e.g., resulting in E531njp83us1 in the first cookie payload of FIG. 16), or any intermediate character from the data values in the group 1602. Because the example data values in the group 1602 have 14 characters, the cookie pattern identifier 1316 creates a first subgroup containing 13 characters of the group 1602. The example cookie pattern identifier 1316 then calculates the error with reference to the unique audience known from the panel as described above. The example cookie pattern identifier 1316 iterates subtracting character(s) from the data value of the group 1602 (e.g., subtracting a character from the previous iteration) and the pattern evaluator 1318 responsively calculates the unique audience error with reference to the known unique audience from the panel. For example, the pattern evaluator 1318 may calculate the error using the first 13 characters in the data values of the data group 1602, such as E531njp83us1, then the first 12 characters in the data values of the data group, such as E531njp83us, and so on.

In some examples, the cookie pattern identifier 1316 and/or the pattern evaluator 1318 may stop iterating if the error for an iteration is not reduced relative to the previous iteration (e.g., a subgroup having one additional character). In some examples, the cookie pattern identifier 1316 and/or the pattern evaluator 1318 tests multiple subgroups having a same number of characters (e.g., a subgroup having the first character removed and a subgroup having the last character removed, a subgroup having the first two characters removed and a subgroup having the last two characters removed, etc.).

If a pattern is not identified from the data values in the group 1602, the example cookie pattern identifier 1316 attempts to identify a pattern from the data values in the group 1604. In the example of FIG. 16, the cookie pattern identifier 1316 performs the same process of selecting the data values and/or a subgroup of the data values, calculating an error in the unique audience using the pattern, and comparing the error to a threshold to determine whether the error is acceptable. Similarly, if an acceptable pattern is not identified from the group 1604, the example cookie pattern identifier 1316 attempts to identify a pattern from the data values in the group 1606 and/or from combinations of the groups 1602-1606.

In the example of FIG. 16, the cookie pattern identifier 1316 and/or the pattern evaluator 1318 determine that the first 10 characters of the data values in the group 1604 (e.g., represented in group 1608) most closely represent unique audience and/or households based on the cookies and unique audience information received from the panelist computers 202. In particular, the example characters in group 1608 represent unique households or unique panelist computers 202 and, when combined with demographic information from the panelist computers 202, provide a most representative proxy for unique audience.

In some examples, the pattern evaluator 1318 determines the calculated error as the unique audience determined based on the unique combination (data values and age/gender group) as a percentage of the unique audience known from the panel data. For example, when the pattern to be evaluated is identified, the pattern evaluator 1318 determines the number of unique combinations of the identified pattern (e.g., a unique combination of characters in the designated location in the cookie payload) and demographic group from the cookie payloads 1402-1420 and demographic information. As an example, the pattern evaluator 1318 determines a first cookie payload associated with a first demographic group (e.g., male, 21-24) in which the selected characters have a first sequence (e.g., the first 10 characters of the group 1604 for the first cookie payload 1414 are 'yKFjwW1pYE') and a second cookie payload associated with the first demographic group (e.g., male, 21-24) in which the selected characters have the same sequence (e.g., the first 10 characters of the group 1604 for the first cookie payload 1416 of FIG. 14 are 'yKFjwW1pYE') to be the same audience member and are counted as one unique audience member.

In contrast, the pattern evaluator 1318 determines a third cookie payload in which the selected characters have the same sequence (e.g., the first 10 characters of the group 1604 for the first cookie payload 1412 are 'yKFjwW1pYE'), but associated with a different demographic group (e.g., female, 35-39) to be a different audience member despite having a same data value for the identified characters. Similarly, the pattern evaluator 1318 determines a fourth cookie payload associated with the first demographic group (e.g., male, 21-24) but in which the selected characters have a second sequence (e.g., the first 10 characters of the group 1604 for the first cookie payload 1410 are 'JTmpkYZpYE') to be a different audience member despite having a same demographic group. By identifying the combinations of unique data values and demographic groups, the pattern evaluator 1318 calculates an estimated audience according to the selected pattern.

FIG. 17 is a table 1700 illustrating example test errors determined based on panel information and a pattern identified by the example impression monitor 1306 of FIG. 13. The example table 1700 may be generated using the example pattern discovered by the cookie pattern identifier 1316 and the pattern evaluator 1318 from the cookie payloads 1402-1420 via the character maps 1500, 1502 of FIGS. 15A and 15B and analyzing the data groups 1602-1606 of FIG. 16.

In the example of FIG. 17, the example table 1700 is divided into demographic groups (e.g., gender and age groups). The percentage errors represent the unique audience determined based on the pattern identified by the impression monitor 1306 compared to the unique audience known from the panel data. For example, if the pattern evaluator 1318 calculates a unique audience of 1090 based on the pattern and the unique audience is known to be 1000 based on the information collected from the panel, the error is (1090−1000)/

1000=9%. The example pattern evaluator 1318 calculates the errors for each of the demographic groups and in total, for each of a one day period, a one week period, a three week period, and a three month period. However, any demographic group(s) and/or time periods may be used to determine whether a pattern may be used for suitable de-duplication.

As shown in FIG. 17, the error is improved substantially from the reference error, which is determined using only cookie counts. An example table 1702 of FIG. 17 shows total unique audience members using demographic information for 1 day, 1 week, 3 week, and 3 month time periods. The total unique audience counts are determined using the panel information (e.g., the known audience member count), a de-duplicated count using the methods and apparatus disclosed herein, and a count using only the cookie information provided by the database proprietor (e.g., partner 1310, 1314).

In the illustrated example of FIGS. 13, 14, 15A, 15B, 16, and/or 17, the example panelist computers 202, the example publisher 1302, the example client computer 1304, the example impression monitor 1306, the example intermediaries 1308, 1312, the example partners 1310, 1314, the example cookie pattern identifier 1316, the example pattern evaluator 1318, the example impression collector 1320, the example impression de-duplicator 1322, and the example audience table 1324 may be implemented as a single apparatus or a two or more different apparatus. While an example manner of implementing the example panelist computers 202, the example publisher 1302, the example client computer 1304, the example impression monitor 1306, the example intermediaries 1308, 1312, the example partners 1310, 1314, the example cookie pattern identifier 1316, the example pattern evaluator 1318, the example impression collector 1320, the example impression de-duplicator 1322, and the example audience table 1324 has been illustrated in FIGS. 13-17, one or more of the example panelist computers 202, the example publisher 1302, the example client computer 1304, the example impression monitor 1306, the example intermediaries 1308, 1312, the example partners 1310, 1314, the example cookie pattern identifier 1316, the example pattern evaluator 1318, the example impression collector 1320, the example impression de-duplicator 1322, and the example audience table 1324 may be combined, divided, re-arranged, omitted, eliminated and/or implemented in any other way.

Further, the example panelist computers 202, the example publisher 1302, the example client computer 1304, the example impression monitor 1306, the example intermediaries 1308, 1312, the example partners 1310, 1314, the example cookie pattern identifier 1316, the example pattern evaluator 1318, the example impression collector 1320, the example impression de-duplicator 1322, and the example audience table 1324 and/or, more generally, the example system 1300 of FIG. 13 may be implemented by hardware, software, firmware and/or any combination of hardware, software and/or firmware. Thus, for example, any of example cookie pattern identifier 1316, the example pattern evaluator 1318, the example impression collector 1320, the example impression de-duplicator 1322, and the example audience table 1324 and/or, more generally, the example system 1300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example panelist computers 202, the example publisher 1302, the example client computer 1304, the example impression monitor 1306, the example intermediaries 1308, 1312, the example partners 1310, 1314, the example cookie pattern identifier 1316, the example pattern evaluator 1318, the example impression collector 1320, the example impression de-duplicator 1322, and the example audience table 1324 appearing in such claim is hereby expressly defined to include a computer readable medium such as a memory, DVD, CD, etc. storing the software and/or firmware. Further still, the example system 1300 may include one or more elements, processes and/or devices in addition to, or instead of, those illustrated in FIGS. 13-17, and/or may include more than one of any or all of the illustrated elements, processes and devices.

Figure 18:
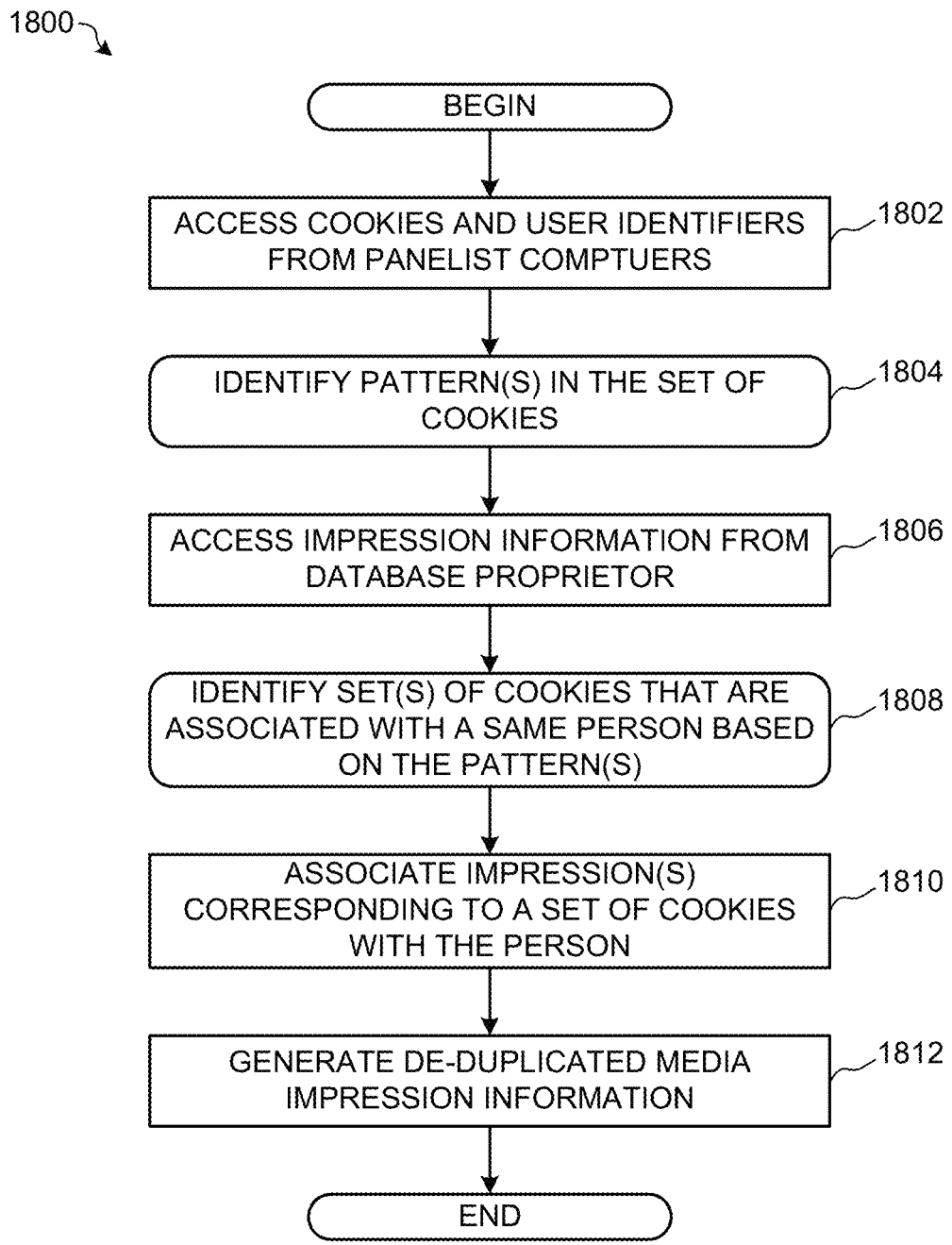
FIG. 18 is a flowchart representative of example computer readable instructions which may be executed to implement the example impression monitor system of FIG. 13 to de-duplicate impression information received from a database proprietor.

FIG. 18 is a flowchart representative of example computer readable instructions 1800 which may be executed to implement the example impression monitor 1306 of FIG. 13 to de-duplicate impression information. The example instructions 1800 may be implemented to reduce error in calculating audiences for online media campaigns by de-duplicating aggregated impression information.

The example instructions 1800 begin by accessing (e.g., via the cookie pattern identifier 1316 of FIG. 13) a set of cookies and user identifiers from panelist computers (e.g., the panelist computers 202 of FIG. 13) (block 1802). For example, the cookie pattern identifier 1316 may request and receive cookies associated with a designated database proprietor (e.g., the partner 1314 of FIG. 13). Respective metering modules and/or other agent(s) installed on the panelist computers 202 provides the requested cookie(s) and user identifiers associated with use of the cookies. Based on the user identifiers, the example cookie pattern identifier 1316 of FIG. 13 determines a demographic characteristic of the user.

The example cookie pattern identifier 1316 and/or the pattern evaluator 1318 of FIG. 13 identify one or more pattern(s) present in the set of cookies (block 1804). For example, the cookie pattern identifier 1316 may identify one or more sets of data in the payloads of the cookies that uniquely identify a user, either alone or in combination with additional data (e.g., a demographic characteristic). Example instructions to implement block 1804 are described below with reference to FIG. 19.

When a pattern (e.g., a set of characters or data of interest in the cookie payload) is identified, the example impression collector 1320 of FIG. 13 accesses impression information obtained from the database proprietor (e.g., the partner 1314) (block 1806). For example, the partner 1314 may provide a set of cookies associated with impressions observed by the partner 1314 during a designated time period, and demographic information (e.g., age and gender group classifications) associated with the cookies. The accessed cookies and impression information are associated with the same database proprietor 1314 as the cookies used to identify the pattern(s) in block 1804.

Using the identified pattern(s), the example impression de-duplicator 1322 identifies set(s) of cookies that are associated with a same person (block 1808). For example, the impression de-duplicator 1322 identifies cookies that match the pattern(s) and are associated with a same demographic characteristic. The example impression de-duplicator 1322 iterates or repeats block 1808 to identify all set(s) of cookies that are associated with a same person based on the identified pattern(s). Example instructions to identify the sets of cookies associated with a same person are described below with reference to FIG. 20.

The example impression de-duplicator 1322 associates the impressions in each identified set(s) of cookies associated with a unique audience member (block 1810). In the example of FIG. 13, the associated unique audience member is distinguishable from other unique audience members but is not personally identified (e.g., due to lack of personally identifiable information being provided by the partner 1314 or collected by the impression monitor 1306). When the impressions have been associated with unique audience members, the impression de-duplicator 1322 generates the de-duplicated media impression information (block 1812). For example, the impression de-duplicator 1322 generates de-duplicated unique audience information, impressions, reach, and/or frequency using the de-duplicated impression information.

The example instructions 1800 of FIG. 18 then end. In some examples, subsequent iterations of the instructions 1800 skip or omit blocks 1802 and 1804 because the pattern for the cookie is known. However, in some other examples one or more subsequent iterations of the instructions 1800 included blocks 1802 and/or 1804 to verify and/or re-identify the pattern based on the panel information.

Figure 19:
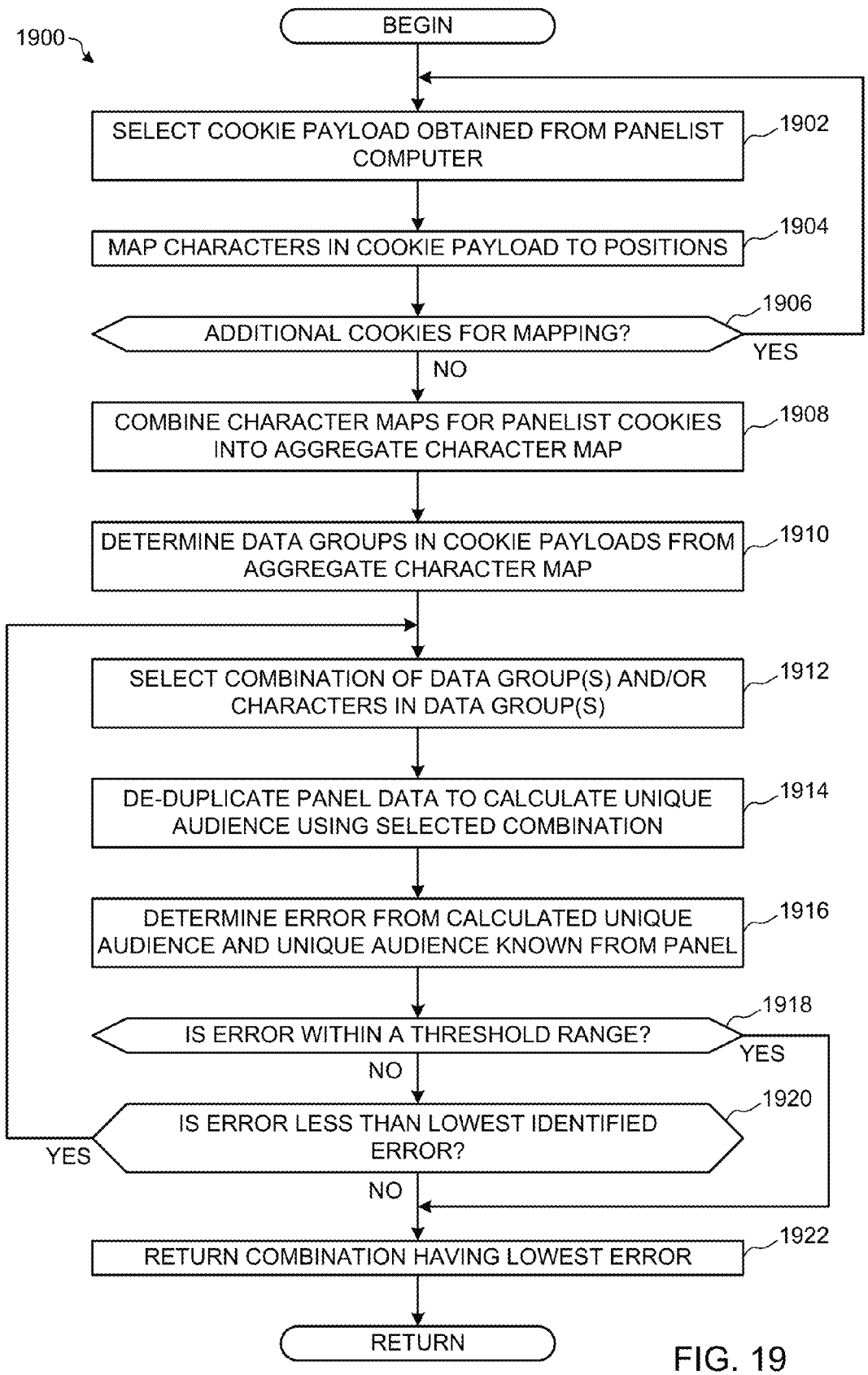
FIG. 19 is a flowchart representative of example computer readable instructions which may be executed to implement the example impression monitor system of FIG. 13 to identify patterns in a set of cookies.

FIG. 19 is a flowchart representative of example computer readable instructions 1900 which may be executed to implement the example impression monitor 1306 of FIG. 13 to identify patterns in a set of cookies. The example instructions 1900 of FIG. 19 may be executed to implement block 1804 of FIG. 18, and begin when the panel information is received (e.g., cookies associated with the partner 1314 of interest from the panelist computers 202, user identifiers associated with the cookies).

The example cookie pattern identifier 1316 of FIG. 13 selects a cookie payload obtained from the panelist computers 202 (block 1902). For example, the cookie pattern identifier 1316 may select the cookie payload 1410 of FIG. 14. The example cookie pattern identifier 1316 maps the characters in the cookie payload to positions of the respective characters (block 1904). For example, the cookie pattern identifier 1316 may generate a character map of the selected cookie payload 1410 similar to the character map 1502 of FIG. 15B. The example cookie pattern identifier 1316 determines whether there are additional cookies for mapping (e.g., via character maps) (block 1906). If there are additional cookies (block 1906), control returns to block 1902 to select another cookie.

When the cookies have been mapped (block 1906), the example cookie pattern identifier 1316 combines the character maps for the panelist cookies into an aggregate character map (block 1908). For example, the cookie pattern identifier 1316 sums the counts from the individual cookie character maps for each of the row and column (e.g., character and position) combinations to generate a character map similar to the map 1500 of FIG. 15A. The example cookie pattern identifier 1316 determines data groups in the cookie payloads from the aggregate character map 1500 (block 1910). For example, the cookie pattern identifier 1316 may identify groups of data, identify data values, and/or remove data in the cookie payload from consideration to form groups similar to the data groups 1602-1606 of FIG. 16.

The example pattern evaluator 1318 of FIG. 13 selects a combination of data group(s) and/or character(s) in the data group(s) (block 1912). For example, the pattern evaluator 1318 may select a full data group 1602-1606, a designated set of characters in a data group 1602-1606 (e.g., the first X characters, the last X characters, etc.), and/or a combination of data groups 1602-1606 and/or subsets of characters from the data groups 1602-1606).

The example pattern evaluator 1318 de-duplicates the panel data to calculate a unique audience using the selected combination of data group(s) and/or character(s) (block 1914). For example, the pattern evaluator 1318 determines the number of unique combinations of the selected combination of data group(s) and/or character(s) (e.g., pattern) and corresponding demographic group associated with the cookie payloads 1402-1420 obtained from the panelist computers 202. The example pattern evaluator 1318 determines or calculates an error from the calculated unique audience and the unique audience known from the panel (block 1916). To calculate the error, the example pattern evaluator 1318 determines the known unique audience from the panel as, for example, the number of unique user identifiers obtained from the panelist computers 202. The example pattern evaluator 1318 then determines the unique audience based on the selected pattern (e.g., combination of data group(s) and/or character(s)) relative to (e.g., as a percentage of) the known unique audience from the panel. The error may be framed in terms of, for example, a percentage overcounting relative to the known unique audience.

The example pattern evaluator 1318 determines whether the calculated error (e.g., calculated overcounting) is within a threshold error range (block 1918). For example, the error range may be defined based on an upper acceptable overcounting limit. The range may additionally or alternatively be defined based on avoiding undercounting of the unique audience. If the calculated error is not within a threshold range (block 1918), the example pattern evaluator 1318 determines whether the error is less than a lowest identified error (e.g., an error associated with another selected pattern) (block 1920). If the calculated error is less than the lowest identified error (block 1920), control returns to block 1912 to select another pattern or combination of data group(s) and/or character(s) (e.g., to attempt to identify a pattern having an even lower error).

If the calculated error is not less than the current lowest identified error (block 1920) (e.g., the lowest error has probably been identified), or if the calculated error is within a threshold error range (block 1918), the example pattern evaluator 1318 returns (e.g., to the impression monitor 1306) the pattern or combination of data group(s) and/or character(s) associated with the lowest error (block 1922). For example, if the calculated error is within the threshold range (block 1918), the pattern evaluator 1318 returns the pattern associated with the lowest identified error to, for example, the impression monitor 1306. The example instructions 1900 end and return to block 1806 of FIG. 18.

While an example pattern identification method is shown and described in FIG. 19, any other pattern identification method(s) or algorithm(s) may be used to implement block 1804 of FIG. 18. The example instructions 1900 may be modified to return a pattern or combination determined using such an alternative pattern identification method and having a lowest error and/or an error within a threshold range.

Figure 20:
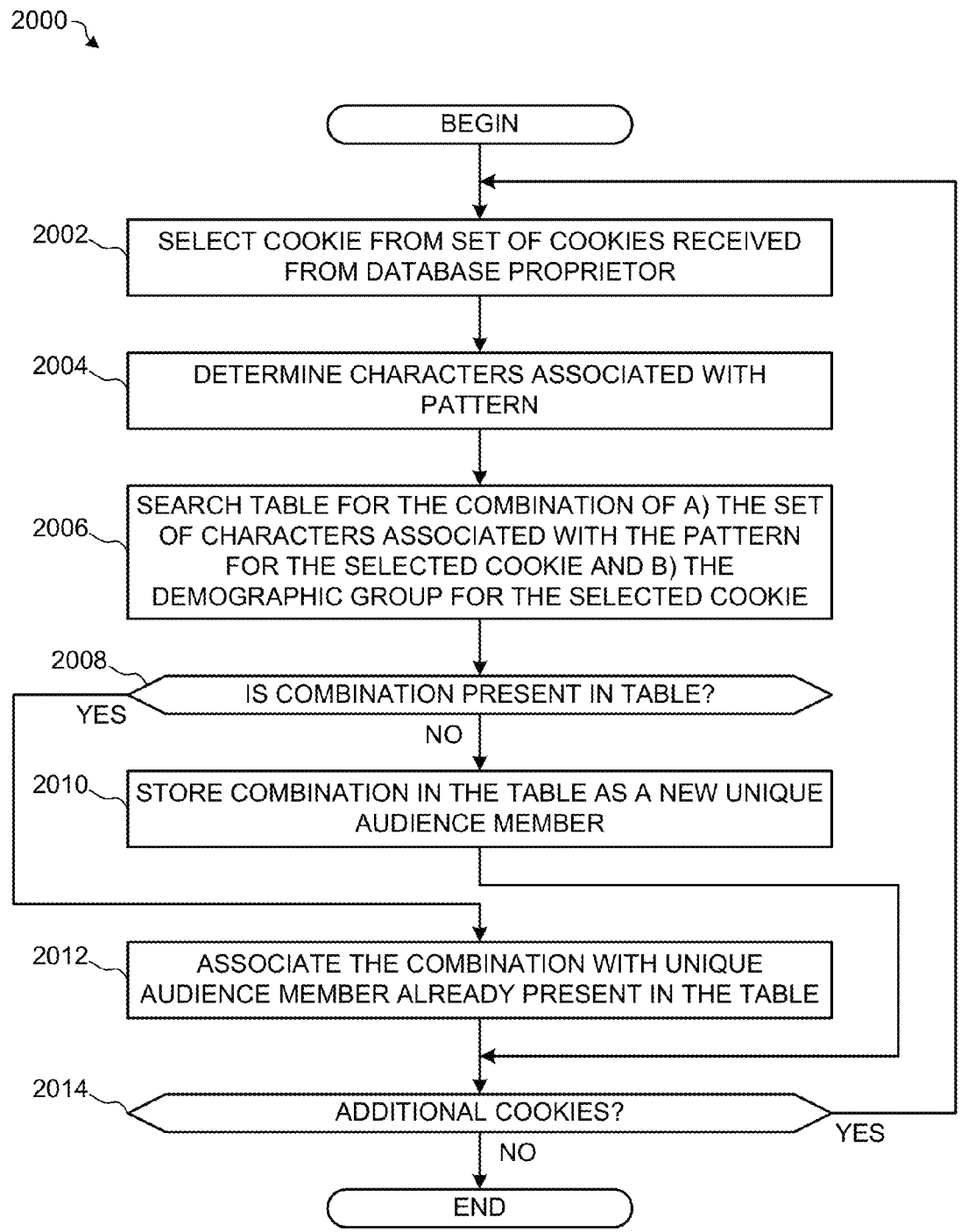
FIG. 20 is a flowchart representative of example computer readable instructions which may be executed to implement the example impression monitor system of FIG. 13 to identify set(s) of cookies for de-duplication.

FIG. 20 is a flowchart representative of example computer readable instructions 2000 which may be executed to implement the example impression monitor 1306 of FIG. 13 to identify set(s) of cookies for de-duplication. The example instructions 2000 of FIG. 20 may be executed to implement block 1808 of FIG. 18, and begin when impression information including a set of cookies and corresponding demographic information for the cookies is obtained from a database proprietor (e.g., the partner 1314 of FIG. 13).

The example impression de-duplicator 1322 of FIG. 13 selects a cookie from the set of cookies received from the partner 1314 (block 2002). For example, the impression de-duplicator 1322 accesses a cookie payload of a selected cookie, which is associated with a corresponding demographic characteristic (e.g., an age and gender classification) by the partner 1314. The example impression de-duplicator 1322 determines characters associated with a pattern (block 2004). For example, the impression de-duplicator 1322 may determine a set of characters in the cookie payload of the selected cookie that correspond to a pattern provided by the cookie pattern identifier 1316 and/or the pattern evaluator 1318.

The example impression de-duplicator 1322 searches a table (e.g., the audience table 1324 of FIG. 13) or other database for the combination of a) the set of characters in the selected cookie that are associated with the pattern, and b) the demographic characteristic (e.g., age and gender group) for the selected cookie (block 2006). The example combination is a proxy or representation of a unique audience member and is stored in the example audience table 1324.

If the combination is not present in the table 1324 (block 2008), the example impression de-duplicator 1322 stores the combination in the table 1324 as a new unique audience member (block 2010). On the other hand, if the combination is already present in the table 1324 (block 2008), the example impression de-duplicator 1322 associates the combination with the unique audience member that is already present in the table 1324 (block 2012). Thus, if the example impression de-duplicator 1322 identifies multiple impressions having the same combination of a cookie data pattern and demographic characteristic, the impression de-duplicator 1322 determines that the impressions are associated with the same audience member. As a result, multiple impressions associated with the same audience member are not attributed to multiple unique audience members.

After storing the combination as a new unique audience member (block 2010), or associating the combination with an audience member in the table 1324 (block 2012), the example impression de-duplicator 1322 determines whether there are additional cookies to be processed (block 2014). If there are additional cookies (block 2014), control returns to block 2002 to select another one of the cookies. When each of the cookies has been processed (block 2014), the impression information from the partner 2014 has been de-duplicated, the example instructions 2000 end, and control returns to block 1810 of FIG. 18.

Figure 21:
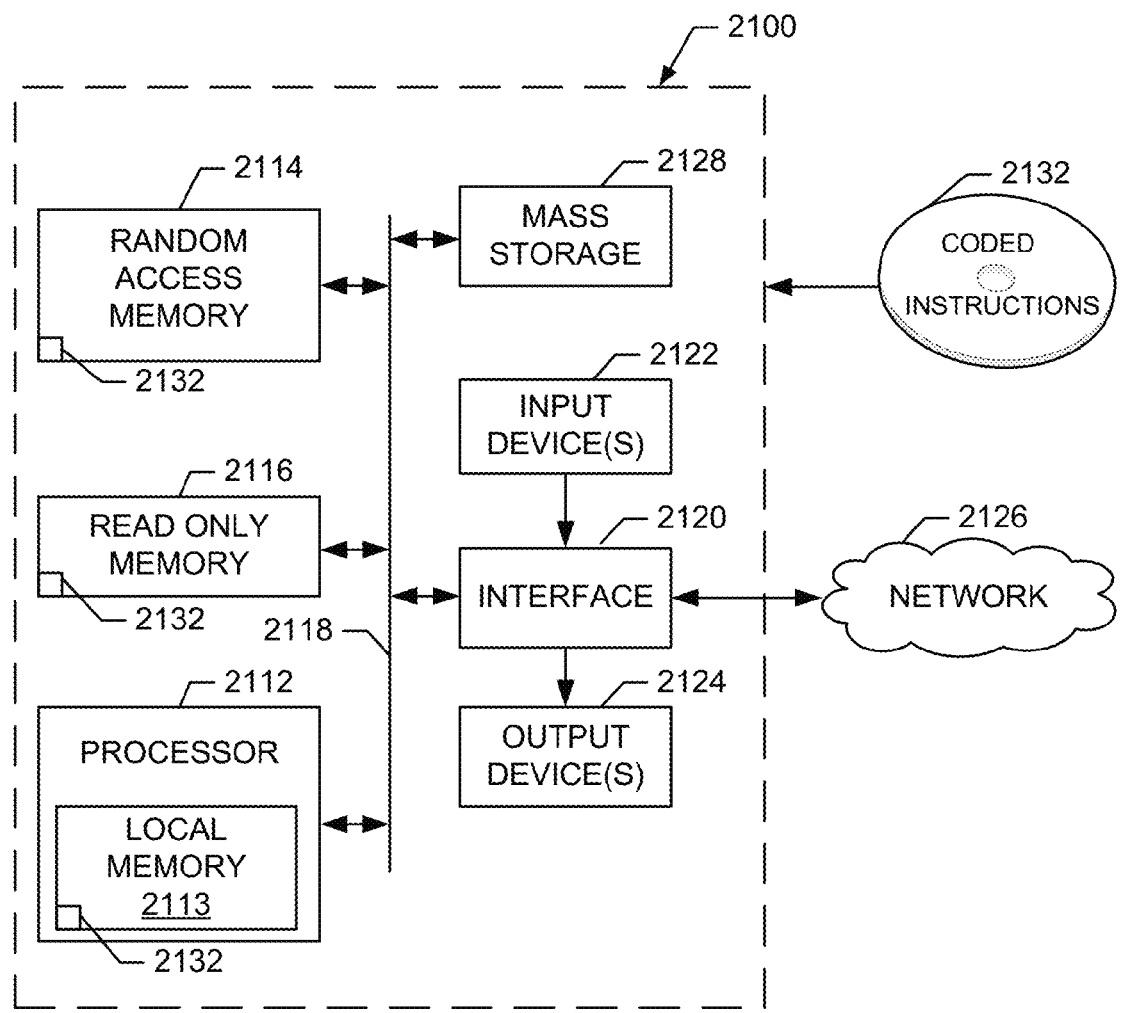
FIG. 21 is an example processor system that can be used to execute the example instructions of FIGS. 9, 10, 11, 12, 18, 19, and/or 20 to implement the example methods and apparatus described herein.

FIG. 21 is a block diagram of an example processor platform 2100 capable of executing the instructions of FIGS. 9, 10, 11, 12, 18, 19, and/or 20 to implement the apparatus of FIGS. 1, 2, 3, and/or 13. The processor platform 2100 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input device(s) 2122 permit(s) a user to enter data and commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 9, 10, 11, 12, 18, 19, and/or 20 may be stored in the mass storage device 2128, in the volatile memory 2114, in the non-volatile memory 2116, and/or on a removable tangible computer readable storage medium such as a CD or DVD.

Although the foregoing discloses the use of cookies for transmitting identification information from clients to servers, any other system for transmitting identification information from clients to servers or other computers may be used. For example, identification information or any other information provided by any of the cookies disclosed herein may be provided by an Adobe Flash® client identifier, identification information stored in an HTML5 datastore, an identifier used specifically for tracking advertising or other media (e.g., an AdID), etc. The methods and apparatus described herein are not limited to implementations that employ cookies.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   accessing, by executing a first instruction with a processor, a first set of cookies and a set of user identifiers received via the Internet and stored in a storage device, the cookies and the user identifiers corresponding to devices accessing media via the Internet;
   identifying, by executing second instructions with the processor, a pattern in the first set of cookies by:

identifying a potential pattern in the first set of cookies;
determining a first error between a first demographic estimate based on the potential pattern in the first set of cookies and a second demographic estimate based on the user identifiers; and
when the first error is less than a threshold, determining the potential pattern to be the pattern;
obtaining, at the processor, impression information from a database proprietor via the Internet, the impression information including a second set of cookies;
identifying, by executing a third instruction with the processor, a subset of the second set of cookies that are associated with a same person based on the pattern; and
associating, by executing a fourth instruction with the processor, impressions corresponding to the identified subset with the same person.

2. The method as defined in claim 1, wherein the threshold is a lowest error associated with another potential pattern in the second set of cookies.

3. A method, comprising:
accessing, by executing a first instruction with a processor, a first set of cookies and a set of user identifiers received via the Internet and stored in a storage device, the cookies and the user identifiers corresponding to respective devices accessing media via the Internet;
identifying, by executing a second instruction with the processor, a pattern in the first set of cookies, identifying the pattern including iteratively determining an error based on patterns identified from different portions of data payloads of the cookies;
obtaining, at the processor, impression information from a database proprietor, the impression information including a second set of cookies;
identifying, by executing a third instruction with the processor, a subset of the second set of cookies that are associated with a same person based on the pattern; and
associating, by executing a fourth instruction with the processor, impressions corresponding to the identified subset with the same person.

4. The method as defined in claim 3, wherein each iteration corresponds to a different portion of the data payloads of the cookies.

5. The method as defined in claim 1, wherein the cookies in the second set of cookies are not uniquely associated with individual persons.

6. The method as defined in claim 1, wherein the first set of cookies are associated with the database proprietor.

7. The method as defined in claim 1, wherein the first set of cookies and the set of user identifiers are collected from an audience measurement panel.

8. The method as defined in claim 1, wherein associating impressions corresponding to the identified subset with the same person includes reducing a number of unique users associated with the identified subset to be one unique user.

9. An apparatus, comprising:
a cookie pattern identifier to access a first set of cookies and a set of user identifiers and to identify a pattern in the first set of cookies, the cookies and the user identifiers being received via the Internet and stored in a storage device and corresponding to devices accessing media via the Internet;
a pattern evaluator to determine a first error between a first demographic estimate based on a potential pattern in the first set of cookies and a second demographic estimate based on the user identifiers, the cookie pattern identifier to identify the potential pattern in the first set of cookies and, when the first error is less than a threshold, determine the potential pattern to be the pattern;
an impression collector to access impression information received from a database proprietor via the Internet, the impression information including a second set of cookies; and
an impression de-duplicator to identify a subset of the second set of cookies that are associated with a same person based on the pattern, and associate impressions corresponding to the identified subset with the same person, at least one of the cookie pattern identifier, the pattern evaluator, the impression collector, or the impression de-duplicator being implemented with a processor.

10. The apparatus as defined in claim 9, wherein the pattern evaluator is to determine the first error as an overcount of the first demographic estimate relative to a count of users based on the user identifiers.

11. An apparatus, comprising:
a cookie pattern identifier to access a first set of cookies and a set of user identifiers received via the Internet and stored in a storage device and to identify a pattern in the first set of cookies by iteratively determining an error based on patterns identified from different portions of data payloads of the cookies, the cookies and the user identifiers corresponding to devices accessing media via the Internet;
an impression collector to access impression information received from a database proprietor via the Internet, the impression information including a second set of cookies; and
an impression de-duplicator to identify a subset of the second set of cookies that are associated with a same person based on the pattern, and associate impressions corresponding to the identified subset with the same person, at least one of the cookie pattern identifier, the impression collector, or the impression de-duplicator being implemented with a processor.

12. The apparatus as defined in claim 11, wherein each iteration corresponds to a different portion of the data payloads of the cookies.

13. The apparatus as defined in claim 9, wherein the cookies in the second set of cookies are not uniquely associated with individual persons.

14. The apparatus as defined in claim 9, wherein the impression de-duplicator is to associate impressions corresponding to the identified subset with the same person by reducing a number of unique users associated with the identified subset to be one unique user.

15. A tangible computer readable storage device comprising computer readable instructions which, when executed, cause a processor to at least:
access a first set of cookies and a set of user identifiers received via the Internet and stored in a second storage device, the cookies and the user identifiers corresponding to accessing media via the Internet;
identify a pattern in the first set of cookies by:
identifying a potential pattern in the first set of cookies;
determining a first error between a first demographic estimate based on the potential pattern in the first set of cookies and a second demographic estimate based on the user identifiers; and
when the first error is less than a threshold, determining the potential pattern to be the pattern;
access impression information from a database proprietor received via the Internet, the impression information including a second set of cookies;

identify a subset of the second set of cookies that are associated with a same person based on the pattern; and associate impressions corresponding to the subset with the same person.

16. The storage device as defined in claim 15, wherein the threshold is a lowest error associated with another potential pattern in the second set of cookies.

17. A tangible computer readable storage device comprising computer readable instructions which, when executed, cause a processor to at least:
   access a first set of cookies and a set of user identifiers received via the Internet and stored in a second storage device, the cookies and the user identifiers corresponding to accessing media via the Internet;
   identify a pattern in the first set of cookies by iteratively determining an error based on patterns identified from portions of a data payload of the cookies;
   access impression information from a database proprietor received via the Internet, the impression information including a second set of cookies;
   identify a subset of the second set of cookies that are associated with a same person based on the pattern; and
   associate impressions corresponding to the subset with the same person.

18. The storage device as defined in claim 17, wherein each iteration corresponds to a different portion of the data payload of the cookies.

19. The storage device as defined in claim 15, wherein the second set of cookies are not uniquely associated with individual persons.

20. The storage device as defined in claim 15, wherein the first set of cookies are associated with the database proprietor.

21. The storage device as defined in claim 15, wherein the first set of cookies and the set of user identifiers are collected from an audience measurement panel.

* * * * *